(12) United States Patent
McFall et al.

(10) Patent No.: US 11,698,990 B2
(45) Date of Patent: Jul. 11, 2023

(54) COMPUTER-IMPLEMENTED PRIVACY ENGINEERING SYSTEM AND METHOD

(71) Applicant: PRIVITAR LIMITED, Cambridge (GB)

(72) Inventors: Jason Derek McFall, Cambridge (GB); Charles Codman Cabot, Cambridge (GB); Timothy James Moran, Cambridge (GB); Kieron Francois Pascal Guinamard, Cambridge (GB); Vladimir Michael Eatwell, Cambridge (GB); Benjamin Thomas Pickering, Cambridge (GB); Paul David Mellor, Cambridge (GB); Theresa Stadler, Cambridge (GB); Andrei Petre, Cambridge (GB); Christopher Andrew Smith, Cambridge (GB); Anthony Jason Du Preez, Cambridge (GB); Igor Vujosevic, Cambridge (GB); George Danezis, Cambridge (GB)

(73) Assignee: PRIVITAR LIMITED, Cambridge (GB)

( * ) Notice: Subject to any disclaimer, the term of this patent is extended or adjusted under 35 U.S.C. 154(b) by 229 days.

(21) Appl. No.: 16/097,482

(22) PCT Filed: May 2, 2017

(86) PCT No.: PCT/GB2017/051227
§ 371 (c)(1),
(2) Date: Oct. 29, 2018

(87) PCT Pub. No.: WO2017/187207
PCT Pub. Date: Nov. 2, 2017

(65) Prior Publication Data
US 2020/0327252 A1   Oct. 15, 2020

(30) Foreign Application Priority Data

Apr. 29, 2016 (GB) .................................. 1607591
Jul. 27, 2016 (GB) .................................. 1612991
(Continued)

(51) Int. Cl.
*G06F 21/62* (2013.01)
*G06F 21/60* (2013.01)
(Continued)

(52) U.S. Cl.
CPC ........ *G06F 21/6254* (2013.01); *G06F 21/602* (2013.01); *G06F 21/78* (2013.01);
(Continued)

(58) Field of Classification Search
CPC .......... G06F 21/6209; G06F 2212/402; G06F 2211/007; G06F 21/6254; G06F 21/602;
(Continued)

(56) References Cited

U.S. PATENT DOCUMENTS 6,341,164 B1 * 1/2002 Dilkie ................... H04L 9/0825
380/278
8,627,107 B1 * 1/2014 Kennedy ................. G06F 21/62
713/189

(Continued)

OTHER PUBLICATIONS

NSTC (Biometrics Frequently Asked Questions, 2005, 25 pages) (Year: 2005).*
(Continued)

*Primary Examiner* — Oleg Korsak
(74) *Attorney, Agent, or Firm* — Saul Ewing LLP

(57) ABSTRACT

A system allows the identification and protection of sensitive data in a multiple ways, which can be combined for different workflows, data situations or use cases. The system scans datasets to identify sensitive data or identifying datasets, and
(Continued)

US 11,698,990 B2

Page 2 to enable the anonymisation of sensitive or identifying datasets by processing that data to produce a safe copy. Furthermore, the system prevents access to a raw dataset. The system enables privacy preserving aggregate queries and computations. The system uses differentially private algorithms to reduce or prevent the risk of identification or disclosure of sensitive information. The system scales to big data and is implemented in a way that supports parallel execution on a distributed compute cluster.

32 Claims, 41 Drawing Sheets

(30) Foreign Application Priority Data

Nov. 22, 2016 (GB) ...................................... 1619733
Feb. 14, 2017 (GB) ...................................... 1702357

(51) Int. Cl.
G06F 21/78 (2013.01)
H04L 9/00 (2022.01)
H04L 9/08 (2006.01)
H04L 9/32 (2006.01)

(52) U.S. Cl.
CPC ............ H04L 9/008 (2013.01); H04L 9/0825 (2013.01); H04L 9/0844 (2013.01); H04L 9/0866 (2013.01); H04L 9/3247 (2013.01)

(58) Field of Classification Search
CPC ....... G06F 21/78; H04L 9/008; H04L 9/0825; H04L 9/0844; H04L 9/0866; H04L 9/3247
See application file for complete search history.

(56) References Cited

U.S. PATENT DOCUMENTS

| | | | | | |
|---|---|---|---|---|---|
| 8,670,563 | B2* | 3/2014 | Natarajan | ............. | H04L 9/0841 380/44 |
| 2003/0033168 | A1* | 2/2003 | Califano | ................ | G16H 10/40 705/3 |
| 2003/0039362 | A1* | 2/2003 | Califano | ................... | H04L 9/32 380/283 |
| 2004/0049687 | A1* | 3/2004 | Orsini | ................ | G06Q 20/3823 713/189 |
| 2009/0136033 | A1* | 5/2009 | Sy | ........................... | H04L 9/008 380/255 |
| 2012/0297198 | A1* | 11/2012 | Danezis | ................ | H04L 9/3218 713/179 |
| 2013/0138676 | A1* | 5/2013 | Bezzi | .................. | G06F 21/6245 707/758 |
| 2014/0281572 | A1* | 9/2014 | Wang | .................. | G06F 21/6254 713/189 |
| 2014/0289536 | A1* | 9/2014 | MacCarthy | ............. | G06F 21/62 713/189 |
| 2014/0304825 | A1* | 10/2014 | Gianniotis | .......... | G06F 21/6254 726/26 |
| 2014/0380489 | A1* | 12/2014 | Hacid | ................. | G06F 21/6254 726/26 |
| 2015/0074409 | A1* | 3/2015 | Reid | ...................... | G16H 10/60 713/171 |
| 2015/0222434 | A1* | 8/2015 | Kim | ........................ | H04L 9/302 380/28 |
| 2015/0236849 | A1* | 8/2015 | Ayday | .................... | G16B 50/00 713/193 |
| 2015/0333905 | A1* | 11/2015 | Parann-Nissany | ...... | H04L 9/008 380/44 |
| 2016/0224735 | A1* | 8/2016 | Ayday | .................... | G16B 50/30 |
| 2017/0005787 | A1* | 1/2017 | Weaver | .................. | G16B 30/10 |
| 2018/0096166 | A1* | 4/2018 | Rogers | .................. | H04W 12/02 |
| 2018/0117446 | A1* | 5/2018 | Tran | ..................... | A42B 3/0433 |
| 2020/0250338 | A1* | 8/2020 | McFall | ................. | H04L 9/0869 |
| 2020/0402625 | A1* | 12/2020 | Aravamudan | ........ | G06F 21/602 |
| 2021/0012028 | A1* | 1/2021 | Cabot | ..................... | G06F 17/12 |
| 2021/0118579 | A1* | 4/2021 | Morris | ................... | G16H 80/00 |

OTHER PUBLICATIONS

Ivan_D (XSLT: How to generate unique id for node based on value only, 2013, 5 pages) (Year: 2013).*
Kern et al. (Anonymity: A Formalization of Privacy—I-Diversity, ACN SS2013, pp. 49-56, 2013) (Year: 2013).*
Pornin et al. (Encryption using two keys, Oct. 31, 2014, 3 pages) (Year: 2014).*
Renjith et al. (Verifiable El-Gamal Re-encryption with Authenticity in Cloud, IEEE, 4th ICCCNT—2013, 5 pages) (Year: 2013).*
Beunardeau et al. (Fully Homomorphic Encryption: Computations with a Blindfold, IEEE, Jan./Feb. 2016, pp. 63-67) (Year: 2016).*
International Search Report, dated Aug. 1, 2017, issued in International Application No. PCT/GB2017/051227.

* cited by examiner

| grade \ location | Boston | Bucharest | Dusseldorf | Frankfurt | London | San Jose |
|---|---|---|---|---|---|---|
| analyst | 72,000 – 77,000 | 72,000 – 76,000 | 49,000 – 113,000 | 71,000 – 76,000 | 74,000 – 75,000 | 73,000 – 77,000 |
| associate | 105,000 – 110,000 | 105,000 – 110,000 | imprecise value | 103,000 – 109,000 | 108,000 – 110,000 | 108,000 – 113,000 |
| junior-exec | 142,000 – 149,000 | 131,000 – 163,000 | 75,000 – 232,000 | 140,000 – 161,000 | 146,000 – 152,000 | 132,000 – 154,000 |
| manager | 119,000 – 134,000 | 118,000 – 128,000 | imprecise value | 105,000 – 123,000 | 122,000 – 125,000 | 125,000 – 135,000 |
| senior-exec | 223,000 – 267,000 | 196,000 – 244,000 | imprecise value | imprecise value | 217,000 – 229,000 | 223,000 – 244,000 |

Thu, 16 Mar 2017, 17:50

FIGURE 4

Budget spent by analyst
1

AVG salary
WHERE location = Dusseldorf
AND gender != Female

Released result
104,273.39 (+1.93%)

95% confidence interval
89,000 – 114,000

Raw result
102,300.00

Thu, 2 Feb 2017, 14:48

FIGURE 9

Import Data

Input Location    /ec2-user/input/customers.avro

Detected Columns

| | Define Missing Policy Rule... |
|---|---|
| Forename | ▶ Choose Policy Rule |
| Surname | |
| credit_card | Mandatory Rule   Show |
| email | Mandatory Rule   Show |

Save

Cancel

FIGURE 17

| Column | Rule | Distortion |
|---|---|---|
| Data | | |
| Location | Categorical Generalisation | 0.00% |
| RepaymentDate | Numeric Date Generalisation | 5 years, 38 days |
| DOB | Numeric Date Generalisation | 7 years, 320 days |
| Value | Continuous Interval Generalisation | 258679.43 |

FIGURE 30

COMPUTER-IMPLEMENTED PRIVACY ENGINEERING SYSTEM AND METHOD

CROSS REFERENCE TO RELATED APPLICATIONS

This application claims the priority of PCT/GB2017/051227, filed on May 2, 2017, which claims priority to GB Applications Nos. GB1607591.3, filed Apr. 29, 2016; GB1612991.8, filed Jul. 27, 2016; GB1619733.7, filed Nov. 22, 2016; and GB1702357.3, filed Feb. 14, 2017, the entire contents of each of which being fully incorporated herein by reference.

BACKGROUND OF THE INVENTION

1. Field of the Invention

The field of the invention relates to a computer implemented process of managing and controlling the privacy and utility of dataset(s) that contain information of a sensitive or identifying nature. More particularly, but not exclusively, it relates to a computer-implemented process for anonymising sensitive or identifying datasets, a differential privacy system, and a computer-implemented method for securely sharing sensitive datasets.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

The specification of the present disclosure is broad and deep. We will now describe in turns the prior art in relation to key aspects of the present disclosure.

Differential Privacy

Data analysts commonly want to use sensitive or confidential data sources. Existing practices in industry for sensitive data analytics are insufficient because they do not provide adequate privacy while still being useful. For instance, one common solution is to rely on access control and secure enclaves for providing access to sensitive data. This approach does not protect privacy because the people conducting the analytics can still learn sensitive information about the individuals in the dataset. In general, all approaches that rely on security technologies will suffer from this problem: those that need to use the data will be able to breach individuals' privacy.

The family of approaches called privacy-enhancing technologies offers fundamentally better privacy protection than the security approaches discussed above. Data privacy methods use statistical and cryptographic techniques to enable analysts to extract information about groups without being able to learn significant amounts about individuals. For cases where group analysis is the desired goal—a wide class of cases that includes business intelligence, reporting, independence testing, cohort analyses, and randomized controlled trials—privacy-enhancing technologies allow the person performing the analysis to achieve their goal without being able to learn sensitive information about an individual.

One subset of privacy-enhancing technologies, privacy-preserving query interfaces, relates to systems that respond to aggregate queries and release the requested statistics in a way that preserves individual privacy. These systems are of academic interest due to their potential for strong guarantees of privacy: for instance, they can guarantee differential privacy, a strong privacy guarantee for individuals that has recently been adopted in Google Chrome and Apple's iOS.

One industry attempt worth noting is query interfaces that use a technique called query set size restriction. Query set size restriction is the practice of suppressing an aggregate result if it is over a population of less than t people for some threshold t (commonly 5, 10, or 100). Many industry query interfaces advertise that they employ this approach and allege that it preserves privacy. However, this approach is not enough to make a query interface preserve privacy. Query set size restriction is vulnerable to a family of attacks called tracker attacks, which can be used to successfully circumvent nearly any query set size restriction and recover information about individual data subjects. Tracker attacks are combinations of aggregate queries that can be used to determine the information of a single record. An example of a tracker attack can be found in Appendix 1.

Despite the academic popularity of privacy-preserving query interfaces, there is no widely available software system that offers a privacy-preserving query interface with sufficient flexibility and usability for industry usage. There are several challenges in bringing theory into practice, such as but not limited to: including a way to orient data analysts without their eyeballing the data, a system for controlling and reporting on the accuracy of query results, a system for detecting when attack attempts occur and interfacing with the data holder, and a method for extending the core techniques of academia to a wider set of realistic data types—that are addressed by the invention.

Managing and Sharing Sensitive Datasets that Include an Original Unique ID

People often use multiple banks for their finances, multiple hospitals and doctors for their medical treatments, multiple phones for their calls, and so on. It can be a challenge to assemble a complete set of information about an individual because it is segmented across these different organisations.

If an organisation desires to piece together this segmented information, they will need to gather the data from all parties and join it on a common unique identifier, such as a national identification number.

However, such unique identifiers make privacy breaches trivial—any target whose national identification number is known can simply be looked up in the data.

One trivial way share datasets from contributing organisations would be for the contributing organisations to agree on a shared secret key without the knowledge of the central party, and then encrypt all of the ID numbers with this key. However, this is practically difficult because they often do not have the ability to independently organise and safeguard a secret key.

Processing Sensitive Datasets and Publishing a Derivative Safe Copy of the Datasets Data analysts and software testers commonly want to use sensitive or confidential data sources. Existing practices in industry for sensitive data use are insufficient because they do not provide adequate privacy while still being useful.

One of the most common workflows for using sensitive data is to create a desensitized or deidentified copy that can be used in place of the original. This workflow involves producing a set of tables that resemble the original tables, but certain fields have been altered or suppressed. The alteration or suppression of fields is intended to prevent people from learning sensitive attributes about individuals by looking at the dataset.

A number of techniques have been used to create a deidentified copy for an original dataset, such as for example: tokenisation and k-anonymisation.

Tokenisation relates to the practice of replacing identifiers (such as ID numbers or full names) with randomly generated values. Tokenisation technologies exist for a variety of applications, however, processing large, distributed datasets, such as those stored in HDFS (Hadoop Distributed File System), with these technologies is difficult.

K-anonymisation is the process of accounting for available background information and ensuring that that background information cannot be used to re-identify masked data. In the k-anonymity model, attributes that can be learned via background information—such as gender, age, or place of residence—are called quasi-identifiers. A dataset is k-anonymous if every record in the dataset shares their combination of quasi-identifier values with k−1 other records. This poses a significant obstacle to an attacker who tries to re-identify the data, because they cannot use the background information to tell which out of k records corresponds to any target individual.

K-anonymisation is an established technique, but has some aspects with significant room for innovation, such as but not limited to: guiding a non-expert user toward proper configuration of k-anonymisation, and measuring and minimising k-anonymisation's impact on data utility.

The present invention addresses the above vulnerabilities and also other problems not described above.

Reference may also be made to PCT/GB2016/053776, the contents of which are hereby incorporated by reference.

SUMMARY OF THE INVENTION

One aspect of the invention is a system allowing the identification and protection of sensitive data in a multiple ways, which can be combined for different workflows, data situations or use cases.

Another aspect is a method in which a computer-based system scans datasets to identify sensitive data or identifying datasets, and enables the anonymisation of sensitive or identifying datasets by processing that data to produce a safe copy. This discovery and anonymisation may scale to big data and may be implemented in a way that supports parallel execution on a distributed compute cluster. A user may configure and control how data is anonymised, may view what privacy risks exist and how to mitigate them and/or may record and inspect an audit trail of all classification and anonymisation activity. Anonymisation may consist of tokenisation, masking, and/or k-anonymisation to protect against the risks of reidentification through background information or linkage to external datasets. Tokenisation processes may use a token vault, which can reside on the distributed compute cluster or on an external database.

Another aspect is a system for preventing access to a raw dataset. The system may enable privacy preserving aggregate queries and computations. The system may use differentially private algorithms to reduce or prevent the risk of identification or disclosure of sensitive information. Data access may be controlled and all usage may be logged, and analysed for malicious behaviour. The system may be used to query data in a relational database, in flat files, or in a non-relational distributed system such as Hadoop. The system may be used to manage and audit all data access, and to classify what data is sensitive and should be processed via differentially private algorithms.

Another aspect is a computer-implemented method for managing and sharing sensitive data consisting of a combination of sensitive datasets, joined together. Data may be joined against a common identifier (such as a social security number), while protecting that common identifier and ensuring that it is not revealed in the matching process or the resulting joined dataset. The joined dataset may then be anonymised using one or more of the methods, systems defined above.

Other key aspects include any one or more of the features defined above.

BRIEF DESCRIPTION OF THE FIGURES

Aspects of the invention will now be described, by way of example(s), with reference to the followings, in which:

FIG. 4 shows a contingency table.

FIG. 9 shows a screenshot of the information displayed to a data holder.

FIG. 17 shows a screenshot of a user interface allowing a user to verify, choose from a set of alternatives, and define new Rules per column.

FIG. 30 shows a table displayed by Publisher, which contains the rule and distortion corresponding to a specific data column.

DETAILED DESCRIPTION

We will now describe an implementation of the invention in the following sections:
Section A: Overview of some key components in the system
Section B: Lens
Section C: SecureLink
Section D: Publisher Note that each innovation listed above, and the related, optional implementation features for each innovation, can be combined with any other innovation and related optional implementation.

In this document, we shall use the term 'node' in the following different contexts:
(1) A node in a computing cluster. In this instance a node means a single computer that is a member of a computing cluster.
(2) A node in a graph structure, which may have edges connecting it to other nodes. We use the term node in this sense when discussing tree structures. The terms root node, leaf node, child node, and parent node relate to this context.

We also shall use the term 'cluster' in the following different contexts:
(1) A computing cluster. A computing cluster is a set of computers that work together to store large files and do distributed computing.
(2) A set of rows in a table that have the same quasi-identifying values, also known as an anonymity set. For instance, if there are four and only four rows that have the quasi-identifying values "hair=brown", "age=92", "nationality=Canadian", then these four records are a cluster.

Section A: Overview of Some Key Components in the System

Privitar aims to provide a platform solution to enable organisations to use, share and trade data containing personal or private information.

Figure 1:
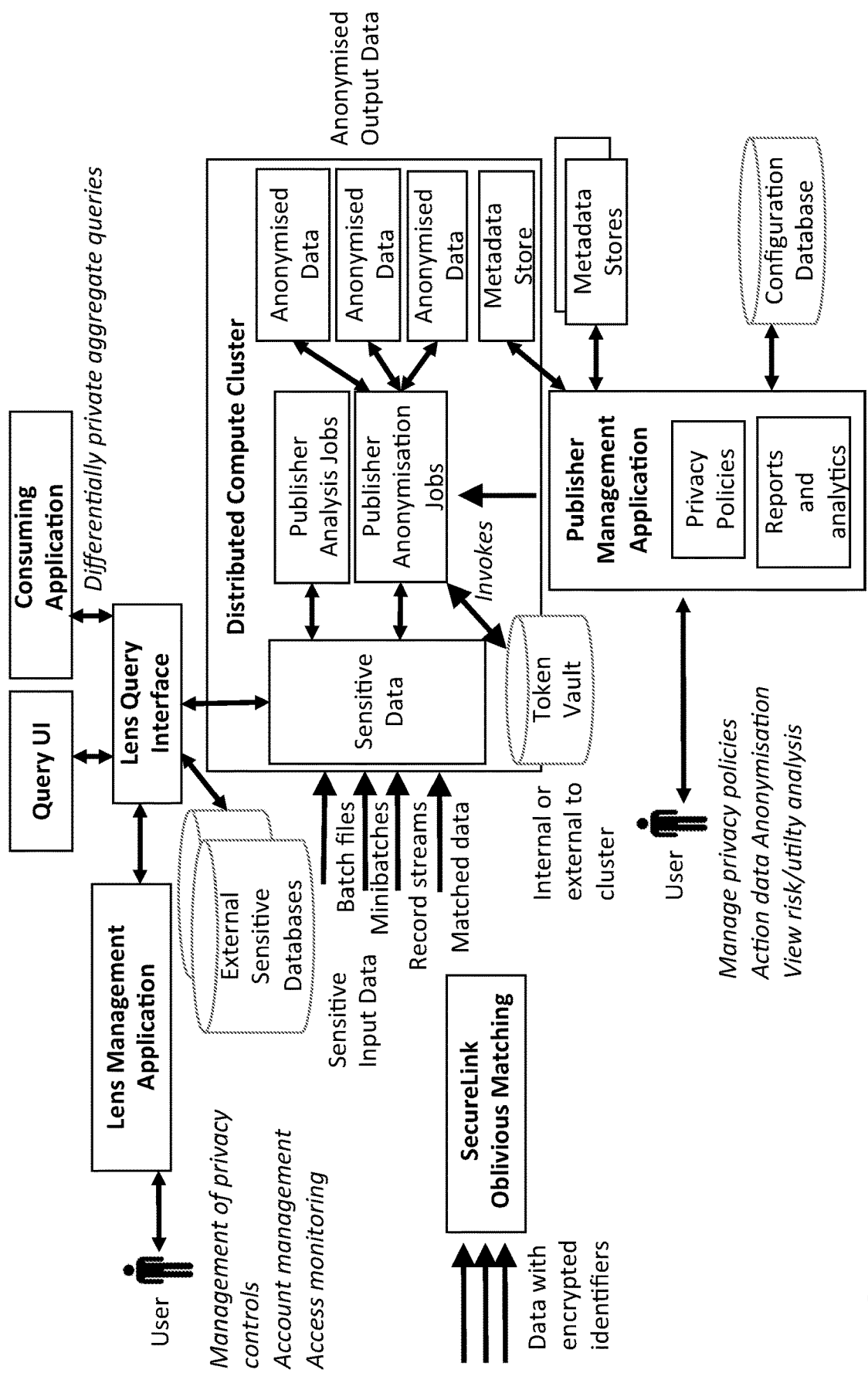
FIG. 1 shows a diagram illustrating the key aspects of the system.

FIG. 1 shows an example of the overall system architecture. The system allows the identification and protection of sensitive data in a multiple ways, which can be combined for different workflows, data situations or use cases.

Privitar Publisher scans datasets to identify sensitive data or identifying datasets, and enables the anonymisation of sensitive or identifying datasets by processing that data to produce a safe copy. This discovery and anonymisation scales to big data and is implemented in a way that supports parallel execution on a distributed compute cluster. Tokenisation processes may use a token vault, which can reside on the distributed compute cluster or on an external database.

The Publisher Management Application allows the user to configure and control how data is anonymised, to view what privacy risks exist and how to mitigate them, to record and inspect an audit trail of all classification and anonymisation activity. Anonymisation can consist of tokenisation and masking, and also of k-anonymisation to protect against the risks of reidentification through background information or linkage to external datasets.

Privitar Lens takes a complementary and alternative approach to privacy protection. Lens prevents access to the raw dataset, but enables privacy preserving aggregate queries and computations, and uses differentially private algorithms to reduce or prevent the risk of identification or disclosure of sensitive information. Data access is controlled, all usage is logged, and analysed for malicious behaviour. Lens may be used to query data in a relational database, in flat files, or in a non-relational distributed system such as Hadoop.

The Lens Management Application is used to manage and audit all data access, and to classify what data is sensitive and should be processed via differentially private algorithms.

Sometimes sensitive data consists of a combination of sensitive datasets, joined together. SecureLink Oblivious Matching offers a way for data to be joined against a common identifier (such as a social security number), while protecting that common identifier and ensuring that it is not revealed in the matching process or the resulting joined dataset. The joined dataset may then be anonymised using Privitar Publisher, or made available for privacy preserving analysis using Privitar Lens.

Section B: Lens

Lens relates to a computer-implemented process for running computations and queries over datasets such that privacy is preserved; access control methods, noise addition, generalisation, rate limiting (i.e. throttling), visualization, and monitoring techniques are applied.

Figure 2:
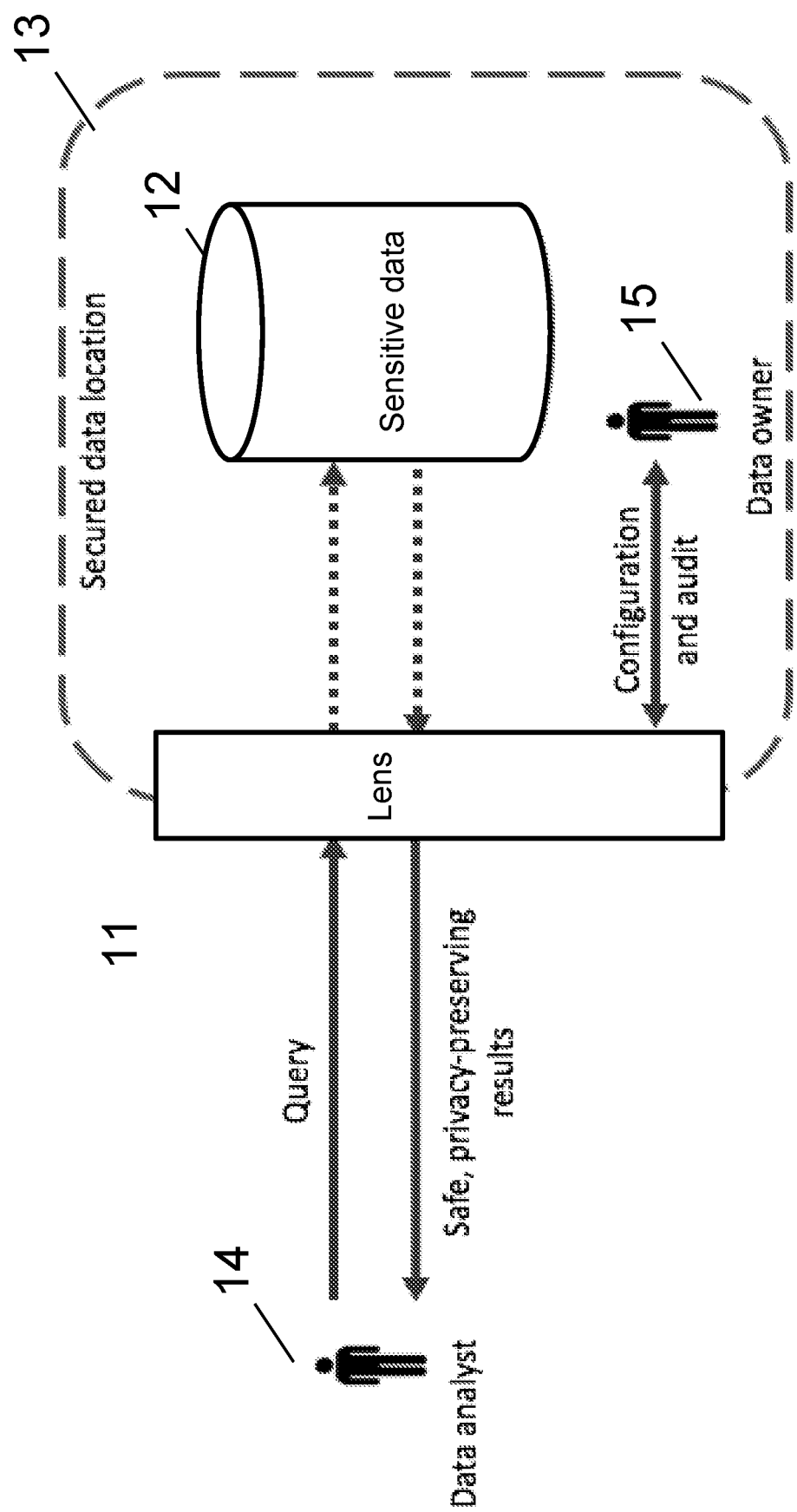
FIG. 2 shows a diagram illustrating the key components of Lens.

Lens is a system for answering queries on datasets while preserving privacy. It is applicable for conducting analytics on any datasets that contain sensitive information about a person, company, or other entity whose privacy must be preserved. For instance, it could be used to conduct analytics on hospital visit data, credit card transaction data, mobile phone location data, or smart meter data. As shown in FIG. 2 Lens (11) is typically the only gateway through which a data analyst (14) can retrieve information about a dataset (12). The dataset itself is protected in a secure location (13). The data owner or holder (15) (e.g. the bank or health company) can configure Lens and audit analysts' activity through Lens. Lens restricts access for configuration of the query system to a single channel, with a restricted set of ways to retrieve information and types of information that may be retrieved.

Lens differs from previous efforts to implement privacy-preserving query interfaces. The two most notable previous attempts are PINQ (McSherry, Frank D. "Privacy integrated queries: an extensible platform for privacy-preserving data analysis." *Proceedings of the* 2009 *ACM SIGMOD International Conference on Management of data*. ACM, 2009) and GUPT (Mohan, Prashanth, et al. "GUPT: privacy preserving data analysis made easy." *Proceedings of the* 2012 *ACM SIGMOD International Conference on Management of Data*. ACM, 2012), both of which were academic projects that have been published. One broad difference is that the previous attempts were narrowly scoped software libraries, while Lens is a comprehensive application with a number of novel usability features and privacy optimizations. Some differences are described in more detail here. The first difference is that Lens is a web service, while the previous attempts were software libraries (PINQ in C #, GUPT in Python). The second difference is that Lens—because it is a live service with logins and user authentication—has separate interfaces for the data analyst and the data holder, while Lens does not have such a separation of interfaces. The third difference is that the functionality provided to both data analysts and data holders far outstrips the functionality provided by the previous attempts—particularly in the ability for the data holder to control the service as it is running, and to audit all activity in the system, and additionally in the ability of the data analyst to browse datasets and get a sense of their look and feel. The fourth difference is that Lens has several usability features, such as reporting noise on results and allowing the user to specify privacy parameters in novel, intuitive ways. The fifth difference is that Lens has several privacy optimizations, such as the ability to designate columns as public or private and automatically decide whether to add noise to queries based on whether they concern private columns.

The remainder of this section is structured as follows. Lens is a query interface service, and section 1 defines what we mean by query and describes the scope of queries that are handled. Section 2 defines what types of datasets Lens handles. Section 3 defines the architectural setup of Lens. Section 4 defines the general steps that Lens follows for handling a query. Section 5 describes the features of Lens that preserve the privacy of individuals by making sure that outputs of Lens do not leak information about individuals. Section 6 describes how to configure Lens. Section 7 outlines some examples of use cases.

1. Scope of Queries

Figure 3:
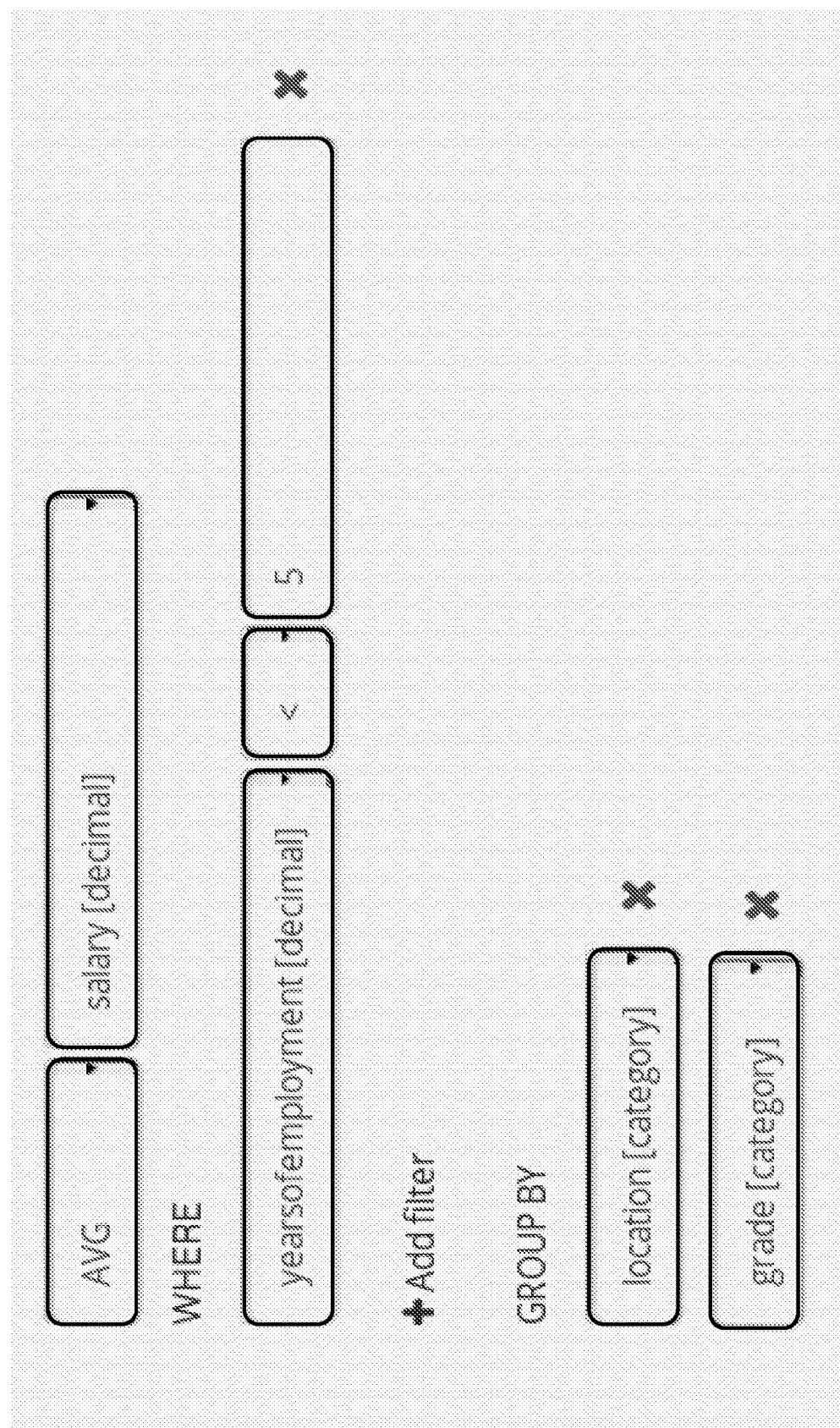
FIG. 3 shows a screenshot with a query interface.

Lens may answer any query that is aggregate in nature. Aggregate queries are queries that give statistical information about a group of people rather than an individual. FIG. 3 shows a screenshot with an example of a query interface. Examples of aggregate queries range from sums, counts, and means to clusterings and linear regressions. The supported types of queries may include, but are not limited to:

1.1 SQL-Like Aggregate Queries

These are queries that are equivalent to SELECT COUNT (*), SELECT SUM(variable), and SELECT AVG(variable) in the SQL language. In these queries, a number of filters are applied to the dataset to get a subset of records, and then either the records are counted or the sum or average is found of a certain column within the subset. Lens expresses these queries as an abstract syntax tree in which there are two parts: an aggregate and a list of filters. The aggregate has two parts: a function (e.g. SUM, MEAN, or COUNT) and a column name (which can be missing if the function does not need a column name, for instance if it is COUNT). The filters each have three parts: a column name, a comparison operator, and a value. The comparison operator may be less than, greater than, less than or equal to, greater than or equal to, equal to, or not equal to. However, if the column designated is a categorical column, the comparison operator is restricted to the smaller list of equal to or not equal to. These queries are passed into Lens through the user interface, which may be a REST API or a web page (see screenshot below). The REST API accepts a JSON object which specifies each of the data fields listed above. Lens has a number of connectors which use the abstract syntax tree to construct a query for a certain underlying database. For instance, for a PostgreSQL query, the aggregate function is turned into a "SELECT <function> (<column name>)", the filters are constructed as "<column name> <comparison operator> <value>", and the full query is assembled as "SELECT <function> (<column name>) FROM <table name> WHERE <filter1> AND <filter2> AND . . . AND <filterN>".

This family of queries can be extended to contingency tables (which is one aggregate query for each cell in the contingency table). An image of a contingency table is shown in FIG. 4—the example is salary broken down by location and employee grade. For contingency tables, the same inputs as a normal aggregate query are passed in addition to a list of categorical columns to "group by". Lens first queries the underlying database to determine each value present in each categorical column. It expresses these in lists, henceforth referred to as COL1VALS, COL2VALS, . . . COLNVALS. Lens then iteratively selects each unique combination of (col1val, col2val, . . . colnval) where col1val is chosen from COL1VALS, col2val is chosen from COL2VALS, . . . colnval is chosen from COLNVALS. Lens constructs a query for each resulting tuple (col1val, col2val, . . . colnval) that is the base query with N additional filters where for filter i in $\{1 \ldots N\}$, the column name is the column name of the ith group by column name, the comparison operator is equals to, and the value is col1val. Lens then constructs queries for the underlying database for each of these queries, and then returns the results for each query. Each result is a cell in a logical contingency table. The GUI can represent a contingency with up to 2 group by variables as a straightforward two-dimensional table, where the values of col1 are the column headers, the values of col2 are the row headers, and each entry at column i and row j is the query result for the tuple (colheaderi, rowheaderj).

1.2 Parametrized Models

Certain supervised and unsupervised learning models, such as linear regressions or k-means clustering, have well known training algorithms. This query type takes as input the parameters for the training algorithm, trains the model on the dataset, and returns as output the parameters of the trained model. Lens may use a language such as Predictive Model Markup Language (PMML) to specify model type and parameters (https://en.wikipedia.org/wiki/Predictive_Model_Markup_Language). PMML is a well-defined way to describe a predictive model in XML. Parameters will vary based on the algorithm. For instance, for decision trees, the number levels of the tree is required, as well as the columns to use, and the column to be predicted. Outputs also vary based on model type. For instance, the decision tree algorithm outputs a decision tree—a tree of nodes where each node has a variable name and a threshold value, except for leaf nodes, which have a prediction. The outputs may also be expressed in a model description language such as PMML.

Optionally, this query type may take as additional input an explicit set of columns to be used by the model training algorithm.

1.3 Frequentist Statistical Tests

These are commonly known tests such as the chi-squared independence test, the Student's t-test, the analysis of variance (ANOVA) models, and the Cramer's V measure. In this case, the query takes as input the variables of interest, and returns as output the relevant measure of strength of association, probability (e.g. p-value), or whatever the output of the statistical test may be. For instance, for the chi-squared independence test, Lens takes as input the pair of variables to test the independence of, and returns the p-value of the null hypothesis (that they are independent) being false. Note: The reason that the interface sits at this position is that, in some cases, the p-value must be calculated in a non-standard way if artificial noise has been added to the underlying data. For instance, the paper "Differentially private chi-squared hypothesis testing" outlines techniques for measuring independence in contingency tables that have been perturbed with the privacy-preserving noise addition, and they are different methods from the standard ones of measuring independence with the chi-squared method (Gaboardi, Marco, et al. "Differentially private chi-squared hypothesis testing: Goodness of fit and independence testing." arXiv preprint arXiv: 1602.03090 (2016)). However, the p-value reached by the calculation on the privacy-preserving outputs is equivalent in meaning to the normal case, so p-values are a clean thing for the interface to output.

1.4 Arbitrary Code for a Custom Aggregate Query

In this mode, Lens takes as input custom code that runs on the dataset and returns a small number of aggregate statistics. Code may be expressed in the Python scripting language. Lens assumes that the Python function will take a whole dataset (expressed as an iterator of rows as CSV strings) as input, and return a small number of numerical outputs. Lens must also be given as input the number of numerical outputs and the decimal range of each output to expect. Lens accepts the script as a string, and assembles an executable Python script file from the user-provided function, and hard-coded section of Python that loads the file, executes the script on the file, and prints the outputs to stdout. Lens then executes this script file in a subprocess and captures the output to stdout, whereupon it can postprocess or return the results as appropriate. See the Architecture section for more information about the security of this method. Optionally, this query type may take as additional input an explicit set of columns used. Appendix 1 (Section B) gives an example of an arbitrary aggregate query in Python. This example query calculates the coefficients of a linear regression model that models salary as a function of employee grade and employee gender. After one-hot encoding of the employee grade and employee gender variables, there are six variables for grade and gender, so the function will return 6 outputs. The analyst must thus provide the number 6 and expected ranges for the 6 linear regression coefficients in addition to the query script. The six coefficients will then be returned as the query result.

1.5 Feature Extraction Query

Feature extraction is often not a problem for privacy since no information needs to be returned. For example, a data analyst may wish to transform a dataset before querying over it. Lens supports a feature extraction query, which differs from the other queries in that it does not return any information about the data, but rather creates a new dataset from an existing dataset within Lens. Hence, Lens provides a feature extraction process "being the veil" e.g. without providing any information about the data to the analyst and thus taking no privacy risks. The data analyst may then be able to query both the new and the existing dataset.

Similar in format to the code for an arbitrary query, the feature extraction feature takes as input the code for an arbitrary row transformation. A row transformation is a function that takes in a row and outputs a row—the output row need not be the same length as the input row, and may contain transformations, combinations, or arbitrary functions of one or more values in the input row. The values in this output row are called features, a term from machine learning. The code is expressed as a string and executed in the same way as the code for an arbitrary query. In the Python language, the function must be a function that accepts as argument a row (e.g. as a CSV string) and returns a row (e.g. as a CSV string). Lens then runs this function on every row on the dataset, creating a new dataset. This newly created dataset is then available for querying like other datasets in Lens. Note that this new dataset is viewed as an extension of the dataset it came from (logically, just a set of new columns added), and it shares all privacy properties with that dataset. The same noise addition rules apply, and the same caps on querying apply. Note that the caps on querying are cumulative—the original dataset and the newly created dataset share the same privacy budget (if privacy budgets are being used. See definition of privacy budget in the differential privacy background section below). Last, the access controls of the new dataset are set such that only the user who created it has access to it, and all columns are marked as private.

If the data is time series data, meaning that there can be more than one row per person, then Lens supports feature extraction in a slightly different way. The differences are as follows: the feature extraction function takes as input the list of every row for a specific individual, and outputs one row of features. This can be implemented if the data holder provides the name of the column that is an identifier of the person in the dataset (e.g. the "user_id" column). Lens then iterates through the distinct identifiers, selects the rows which pertain to that identifier, and runs the feature extraction function on these rows to get an output row.

2. Scope of Datasets

Lens supports structured datasets, but does not support other types of data (free text, audio, video, semi-structured, etc.). Lens supports structured datasets held in many database systems (e.g. PostgreSQL, MySQL, Hive, Teradata). The data holder can make a dataset available in Lens by posting sufficient information to query the dataset. For instance, in PostgreSQL databases, the data holder must upload the URL of the database and the name of the table. Lens then connects to the database and uses the table name in each query.

2.1 Supported Variable Types

Lens supports querying over two families of variables: continuous and categorical. Categorical variables are often implemented as strings, while continuous variables are often implemented as floating point types. Dates can also be handled as continuous variables. Integers may be categorical or continuous depending on the context they are used. The data holder may designate columns as continuous or categorical on upload; otherwise, floats, doubles, and dates will be mapped to continuous and the rest will be mapped to categorical. In Lens's SQL-like querying features, categorical and continuous variables play different roles. For instance, only a continuous variable can be the subject of a SUM or AVERAGE query. Meanwhile, only categorical variables can be the subject of group bys. A typical dataset will have anywhere from two to several dozen columns, with a mix of continuous and categorical columns. One special case worth mentioning is that of location variables. These are often expressed as two continuous variables, one for latitude and one for longitude. Lens can run on location variables by treating the latitude and longitude as separate continuous variables.

2.2 Joined Tables

In databases that support joins, the data holder may upload a joined table, by supplying the names of both tables and the join statement (e.g. "Orders INNER JOIN Customers ON Orders.CustomerID=Customers.CustomerID;"). Lens then will use this join statement in each query ensuring that it always queries the joined table.

2.3 Rectangular Vs. Time-Series Data

Lens supports datasets where there is one row per data subject. This is referred to as rectangular data. Lens also supports datasets where there can be many rows per data subject. This is referred to as time-series data.

3. Architecture

The following section lists information about the architecture of Lens.

3.1 Basic

Lens runs as a web server (for instance using the Tomcat framework). The server must have read access to the database(s) where the sensitive data is stored. The server must also be accessible to users through a network. Access to the web server is controlled by login with user accounts and access can also be limited using standard network techniques such as firewalls.

3.2 Secure Code Execution

Lens supports sandboxing in order to reduce the security risks of executing user-provided code (e.g. Python code for arbitrary queries and feature extraction). The sandboxing works by spinning up an isolated environment (i.e. virtual machine or Docker container) from an image that explicitly limits the resources available to programs, for instance disabling Internet access, privilege escalation, and access to all but a small area of the file system. Lens then loads the data and code into this isolated environment, and extracts only the result (through methods such as shared folders or a network interface between the virtual machine and the host). Lens is not innovative in this area but rather uses the established practices of the massive open online course (MOOC) providers, which have designed secure systems to automatically evaluate and grade code submissions from students. A list of security measures is presented in the talk "Amazon ECS at Coursera: Powering a General-purpose Near-line Execution Microservice, while Defending against Untrusted Code" by Coursera at AWS re:Invent in October 2015 (https://www.youtube.com/watch?v=a45J6xAGUvA).

3.3 High Availability Service

Lens can run in high availability mode to be resistant to the failure of the host machine. This may be implemented by running two copies of the webapp service (e.g. Tomcat) on different machines, and using a load balancer which can automatically redirect traffic to the machines that are running. The duplicate copies of the webapp service point at a consistent database backend. In the event of a machine failure, the load balancer will automatically redirect traffic to the other machine. Users may then continue to use the service in the same way. Lens deducts privacy budget (see noise addition section below) and/or conducts malicious query detection rules prior to executing queries to ensure that there is no point in time such that a failure of the host machine allows the analyst to see the result of a query without it having been subject to adequate privacy protections.

3.4 REST API

Lens uses a REST API both as a user interface and the interface for the web frontend. The REST API allows other systems to programmatically query Lens. The REST API supports all operations on the system including exploring the datasets and running queries.

3.5 Pluggable DB Connection

Lens can connect to several databases through an extensible system of connector modules. The connectors convert the abstract query syntax of Lens to language appropriate for the database system.

3.6 Configuration Database

Lens uses a relational database (e.g., PostgreSQL) to store configuration information, the audit log, and metadata about the loaded datasets. As configuration information, Lens stores the permitted users, metadata about each user, privacy parameters for each user, as well as the access control information for each (user, column) pair where the user has access to the column. As audit log, Lens stores every query that is asked, as well as the results and the privacy budget spent (if applicable). Lens also stores any alerts that have been triggered. As metadata about the loaded datasets, Lens stores the names of all the tables and columns, as well as the types of columns, and certain other metadata such as the column ranges and the options for categorical columns. Lens captures this dataset metadata when the dataset is uploaded.

4. Query Workflow

Figure 5:
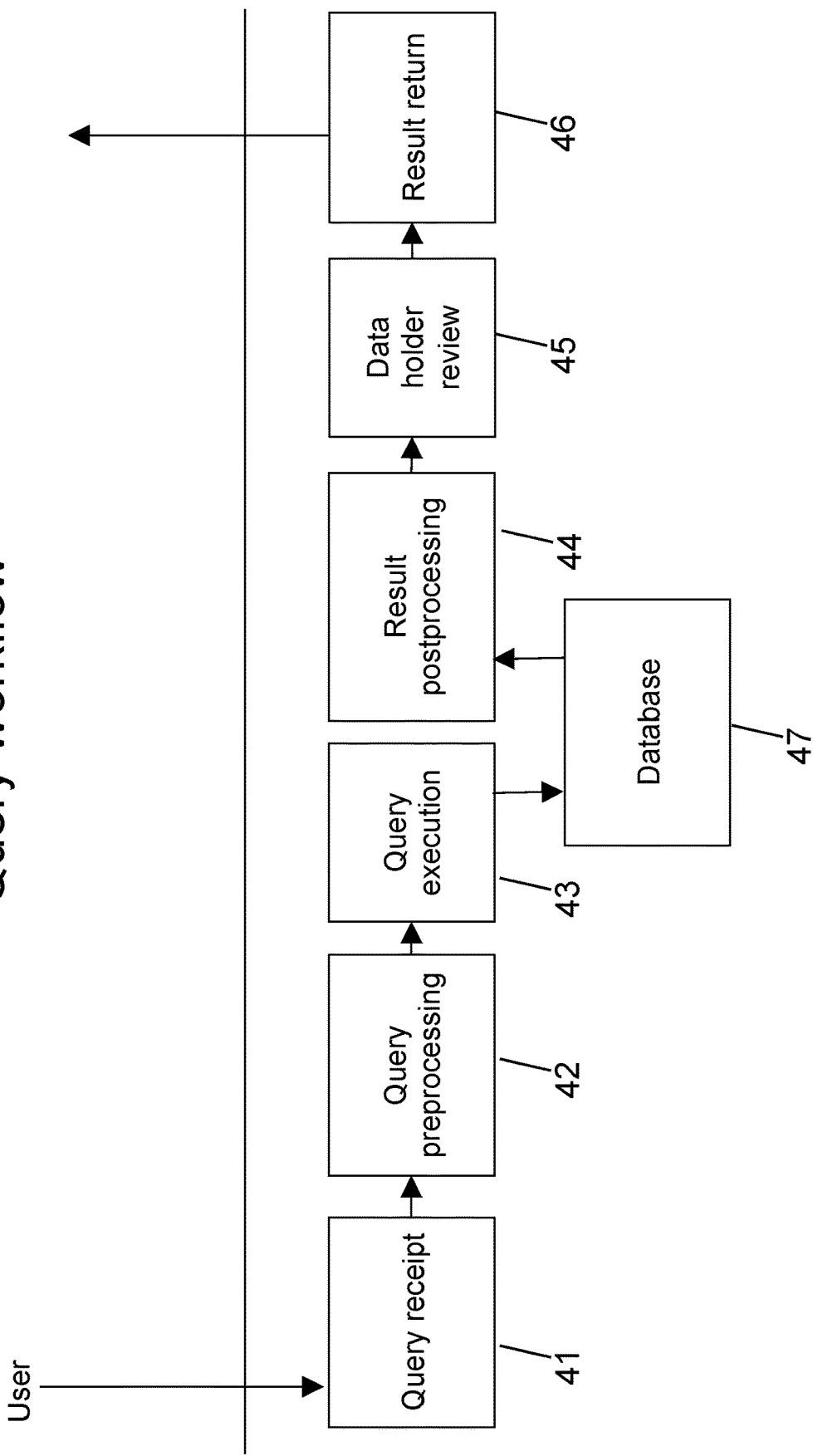
FIG. 5 shows a diagram of the query workflow.

FIG. 5 shows a diagram illustrating a query workflow. Lens is set up as a service that accepts queries and carries them through a multi-stage workflow before returning the result to the query. The result of the query may be approximate or exact, depending on the privacy controls that are enabled. The key stages of the workflow are as follows.

4.1 Query Receipt

The query, as well as potential meta information relating to privacy, is received by the service.

4.2 Query Pre-Processing

The query is classified as malicious or benign based on the rules built into Lens (described below). Depending on the privacy configuration, queries deemed malicious may be flagged or blocked. At this stage, queries may also be altered to return more general results. For instance, the query "SELECT AVG(salary) WHERE weight=207" might be altered to read "SELECT AVG(salary) WHERE weight >200 AND weight <250".

As a part of the rules that classify queries as benign or malicious, other Lens may run other queries on the dataset to gather additional information to help determine malice.

4.3 Query Running

The query is run on the dataset. This step is not handled by Lens but rather done by the database system that Lens is connected to (e.g. Postgres, MySQL, Elasticsearch, or Hive).

4.4 Query Result Post-Processing

Depending on the privacy configuration, the result of the query may be perturbed with random noise, suppressed, or rounded.

4.5 Data Holder Review

Depending on the privacy configuration, the data holder can manually review the query and accompanying visualizations/notifications provided by Lens. He can approve or deny the query. This is implemented by using an asynchronous response model, where after the data analyst submits the query, Lens marks its state as "NEEDS_APPROVAL".

Only once the data holder approves the query does the state change to "APPROVED" and the data analyst can view the query result.

4.6 Query Result Return

The query result is returned, along with meta information relating to how the query or query result has been altered.

5. Privacy Features

Lens has the following features to preserve individual privacy while maintaining high utility.

5.1 Dummy Dataset

A common need in the early stages of data analysis is to examine the data to get a basic sense of the size, shape, column types, column ranges, and what example rows look like.

As an example, a data analyst may want to orient themselves with the data, better understand the meaning of each column, spot check certain assumptions about the data, or debug particular conclusions.

In order to satisfy this need while preserving maximal privacy, Lens creates a dummy dataset that matches the original dataset on properties such as proportion of missing values and range of columns (the full list of properties is in bullet points below). The properties are listed in order of increasing privacy risk, and the data holder can configure for each dataset to which level the dummy dataset should match the original dataset. For instance, the data holder may say to use the properties up to Level 3 in the construction of the dummy dataset.

The concept of levels makes sense because each level releases more pieces of information than the level below it: for example, the properties on Level 2 release more information about the raw data than Level 1. Specifically, Level 1 releases information only about the number of missing and NULL values in the data, which is generally non-sensitive. Level 2 releases the approximate minimum and maximum value of each numerical column, which could disclose a couple of values that are present in the dataset. Level 3 discloses several categorical values that are somewhere in the dataset, but only those that are shared by many people. Level 4 discloses all categorical values in the dataset. Level 5 discloses frequency information, showing which values are rare and which are common.

- Level 1: The proportion of missing values in each column. This is calculated by iterating through the rows and counting how many in each column have missing values (where missing is defined by the data schema—it is commonly the empty string).
- Level 1: The proportion of NULL values in each column. This is calculated similarly to the proportion of missing values.
- Level 2: The ranges of continuous columns.
- Level 2: The ranges of integer columns.
- Level 3: The common options in categorical columns. This is calculated by iterating through the records and capturing the frequency counts of each option, and only including the option in the output set if it is (a) greater than a certain configurable threshold and/or (b) greater than a certain configurable proportion of the total number of rows.
- Level 4: All the options in categorical columns.
- Level 5: Univariate distributions. The distribution is calculated in different ways for continuous and categorical variables. For categorical variables, the value counts are used to represent the distribution. For continuous variables, histograms with a certain number of bins (configurable by the data holder) are used to represent the distribution.

As a further enhancement, Lens supports ostensibly continuous columns that are a mix of continuous and categorical in nature. For instance, time worked per week is ostensibly continuous, but really a partially categorical and partially continuous concept. A large majority of workers work a fixed amount such as 40 or 45 hours. Another large portion of workers work a more variable quantity of hours per week that may vary between 30-70 hours. The synthetic data is most useful if it reflects both of these patterns, and captures that the values 40 and 45 are categorical options that make up a certain portion of the rows, and the rest of the rows behave as a continuous variable with a distribution expressed as a histogram. To gather this data, the value counts of the column are captured. Any counts above a certain configurable threshold are handled as categorical while the rest of the rows are handled as continuous.

Lens first iterates through the dataset computing each of the statistics above. Then, it samples a fixed number of rows (e.g. 100) sampling accordingly for each of the columns. Sampling is done in the following way: (a) first flip a biased coin to decide whether to output a missing value, then do the same for NULL; (b) for continuous columns, if there is only min and max, sample uniformly from the interval [min, max], but if there is a histogram recorded, do a weighted random selection to choose the bin, then sample uniformly from the range of the bin; (c) if it's a categorical variable, do a weighted random selection to choose the option; (d) if it's a hybrid categorical/continuous variable, then flip a biased coin to determine whether to treat it as categorical or continuous, and then follow the methods for (b) or (c) accordingly. The sampled rows are exposed to the user through an API call or a feature on the web page. The sampled rows may be freely downloaded and shared.

5.1.1 Dummy Dataset as a Test Range

Lens allows the analyst to execute a query over the dummy dataset. This option has no privacy cost, but allows the analyst to ensure that his query runs as expected. This functionality is particularly useful in the custom (e.g. Python code) queries and the feature extraction queries, as it can help ensure that the query will not crash or fail on the data. Hence a data analyst is able to check its query will run as expected before submitting it to Lens. Since the dummy dataset matches the existing dataset on a few properties, it gives away very little about the raw data.

5.2 Malicious Query Detection

Lens contains methods to detect malicious queries and flagging or blocking them. These are rule-based approaches that detect queries that are likely to be used in an attack or not likely to be legitimate aggregate analysis. This section applies only to queries of the SQL-like type.

5.2.1 Background

Dorothy Denning outlined several methods for combating disclosure in aggregate queries in Chapter 6 of her 1982 book *Cryptography and Data Security*. Among these are "Query-Set-Size Control", "Maximum-Order Control", "Implied-Queries Control" and the "Sm/N Criterion". Let C be the set of records over which the aggregate query is run (i.e. after the filters clauses have been applied to narrow down the set of records). Let C be the number of records in C. Query-Set-Size Control is the practice of permitting a query only if $t<|C|<N-t$, where N is the total number of records in the dataset, for some configurable threshold t. Maximum-Order Control is a cap on the number of filter clauses that a query can have. The Sm/N Criterion restricts querying on columns where the product of the distinct counts of columns used in filters (Sm) divided by the total number of records (N) is sufficiently high (e.g. >0.1).

Implied-Queries Control is like Query-Set-Size Control, but it enforces Query-Set-Size Control both on the original query and all implied queries. Implied queries are all the queries whose answers could be derived from a combination of the original query and less specific queries. Less specific queries are queries that have a proper subset of the filter clauses of the original. In practice, the implied queries of a query look like the original query with any subset of the filter clauses inverted (e.g. WHERE age >45 becomes WHERE age <=45).

5.2.2 Implementation

Lens implements the above checks as part of the preprocessing stage of the query, and if any of the attacks are detected, Lens creates an alert record. Lens may also notify the data holder (e.g. via email) of the alert or highlight the query in the data holder's audit view. Optionally, the system may be configured to block queries completely if they trigger an alert. It is configurable by the data holder whether to block queries that cause alerts or just to send alerts and highlight queries for attention. It is also configurable whether to block returning the query until the checks complete and pass, or to immediately answer the query and run the checks in parallel in a separate thread. The checks are computed as follows. The Query-Set-Size Control check is computed by replacing whatever aggregate function is in the original query with "COUNT(*)" (or equivalent in other query systems) and ensuring that the result is greater than the configured threshold. The Maximum-Order-Control is computed by examining the query and counting the number of filter clauses and ensuring that the number is greater than a configured threshold. The Sm/N Criterion is calculated by running COUNT DISTINCT on each column used in a filter clause, and ensuring that the product of the results divided by the total number of rows is greater than a configured threshold. The COUNT DISTINCTs on each column may also be done when the dataset is loaded and stored for repeated use—this leads to better performance. The Implied-Queries Control is computed by iteratively inverting every subset of filter clauses and running the Query-Set-Size Control on the resulting query.

5.2.3 Compound with Noise Addition

This malicious query detection functionality may be used simply as a way to identify malicious actors, particularly if it is paired with noise addition (see below) which is a strong defense of privacy by itself. Noise addition provides a robust defense against sensitive data disclosure, but it does not clearly flag up potentially malicious queries. The rules above clearly flag up potentially malicious queries and can thus be used to identify potentially malicious analysts.

5.3 Noise Addition to Query Result

Lens may add random noise to the results of queries in the postprocessing stage. To implement this, Lens draws a random number from a 0-centered distribution (this distribution is defined by various parameters; see the differential privacy section below).

Then it adds this random number to the raw result to get a noisy result. Noise addition enables the system to achieve a differential privacy guarantee.

5.3.1 Background on Differential Privacy

Differential privacy is a privacy guarantee for algorithms that run on sensitive data. Invented in 2006, it is currently considered one of the strongest guarantees of privacy, due to the fact that it composes with other differentially private releases, it holds under postprocessing, and it is unaffected by background information. Intuitively, differential privacy promises that "the attacker can learn virtually nothing more about an individual than they would learn if that person's record were absent from the dataset" (https://www.infoq.com/articles/differential-privacy-intro). There are two types of differential privacy with different definitions. The first is epsilon-differential privacy. Epsilon-differential privacy states that for two datasets that differ by one record, the probability that the algorithm will output any result on one dataset is no more than e^epsilon that of the other dataset. (Epsilon, delta)-differential privacy states that with probability 1-delta, the Epsilon-differential privacy guarantee will hold. The differential privacy literature offers descriptions of a number of algorithms that come with differential privacy guarantees—these are often referred to as differentially private mechanisms (henceforth called DP mechanisms). DP mechanisms must be probabilistic (i.e. incorporate some random element) in order to achieve the differential privacy definition. The below DP mechanisms are relevant to Lens.

5.3.1.1 Laplace Mechanism

The Laplace mechanism achieves epsilon-differential privacy by adding noise drawn from a Laplace distribution to query results. The Laplace distribution is 0-centered and has one configurable parameter, the scale. The scale defines the width of the distribution (and thus the likelihood that a large amount of noise is added). The scale must be set to the global sensitivity of the query (GS) divided by epsilon. We now define GS. The GS of a query is the amount by which one record could affect the output of the query. For instance, in a COUNT query, the GS is 1 because any single record can only make any COUNT result go up or down by 1. The GS of a SUM query is the range of the variable. Consider the age variable, which is (let's say) always between 0 and 100. The maximum amount that one record could change a sum is if the record used to be 0 and is now 100. Thus, the GS of the SUM of the age column is 100. An example implementation of the Laplace mechanism is found in the PINQ paper (McSherry, Frank D. "Privacy integrated queries: an extensible platform for privacy-preserving data analysis." *Proceedings of the* 2009 *ACM SIGMOD International Conference on Management of data*. ACM, 2009).

5.3.1.2 Gaussian Mechanism

The Gaussian mechanism is like the Laplace mechanism but with the following differences: the distribution is Gaussian instead of Laplace, the variance is set to GS*ln(1/delta)/epsilon, and (epsilon, delta)-differential privacy is achieved.

5.3.1.3 Sample-Aggregate Mechanism

Figure 6:
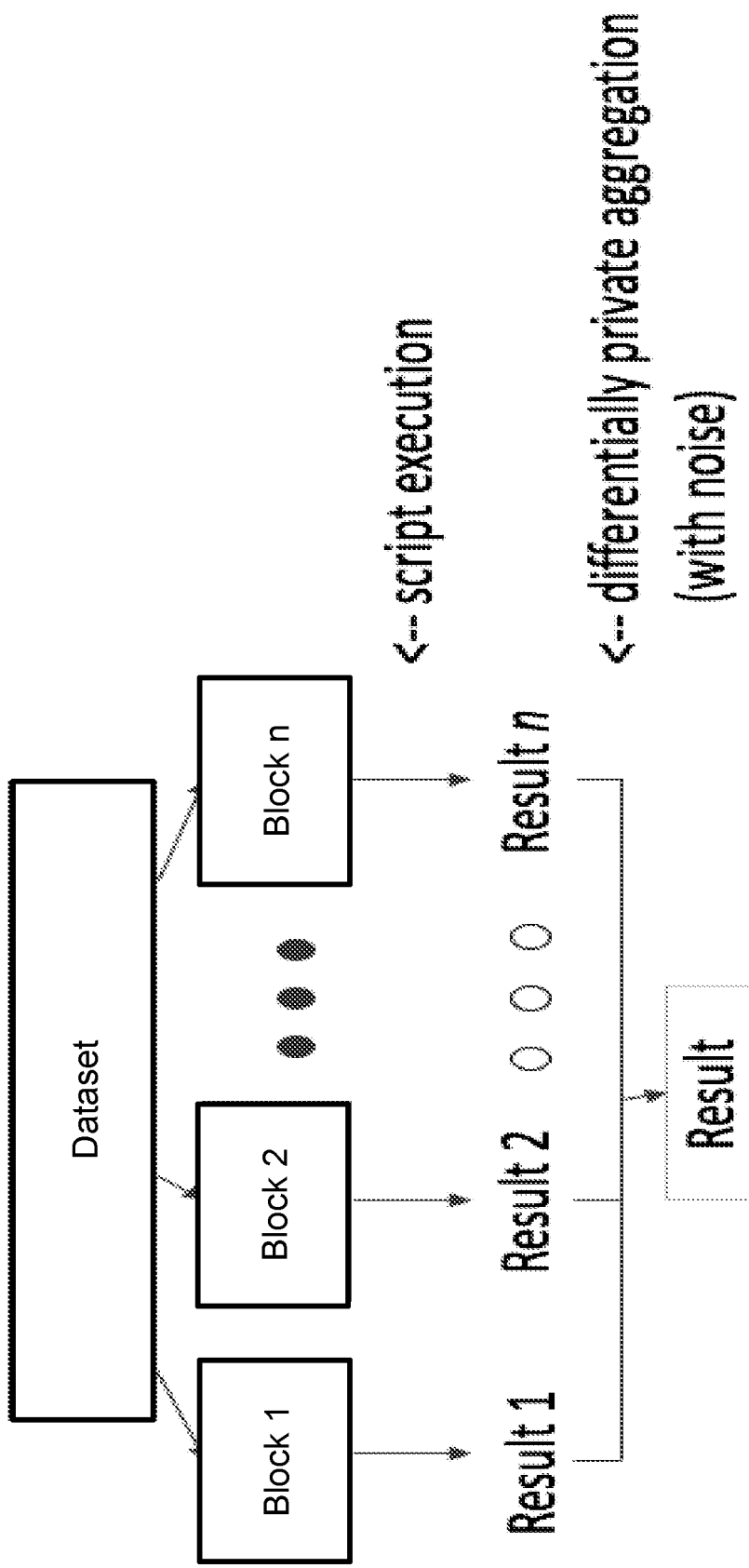
FIG. 6 shows a diagram of the sample-aggregate mechanism.

The sample-aggregate mechanism achieves epsilon- or (epsilon, delta)-differential privacy on a query f, where f is a function of the dataset and returns a small number of outputs in a known range, by executing it in the following way: break the dataset into a configurable number of blocks, run f on each block to get a set of results, and take a differentially private aggregation of the results using the Laplace or Gaussian mechanism. An example of the sample-aggregate mechanism is shown in FIG. 6. Note that this approach yields accurate results only if f is approximately accurate on subsamples of the dataset. An example implementation of the sample-aggregate mechanism is found in the GUPT paper (Mohan, Prashanth, et al. "GUPT: privacy preserving data analysis made easy." *Proceedings of the* 2012 *ACM SIGMOD International Conference on Management of Data*. ACM, 2012).

5.3.2 Specifying Resolution

Figure 7:
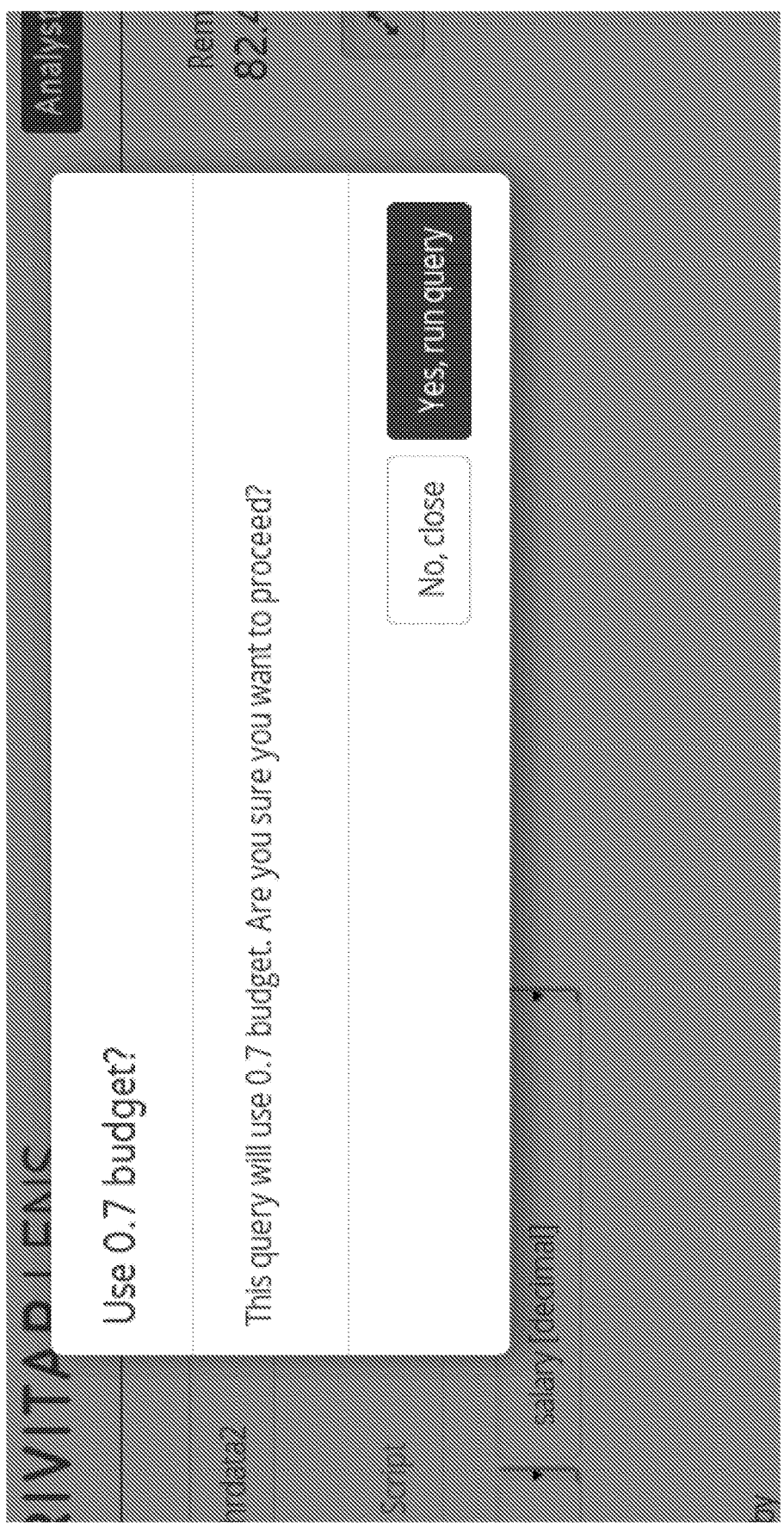
FIG. 7 shows a screenshot of a user interface displaying to an end-user an amount of budget spent.

The analyst benefits from getting the resolution in a query result that he needs for his analytical purpose, but no additional resolution than that. Achieving this balance will allow him or her to conduct as much useful analysis as possible without unduly risking privacy or running into privacy restrictions. To make it easy for the analyst to best achieve this balance, Lens has three modes of specifying the desired noise on the query result: (1) The first is to directly specify the privacy budget to be used on the query. (2) The second and third only apply to SQL-like queries. The second is to specify a desired confidence interval, for instance 95%+/−2.5, which means that there should be a 95% chance that the reported answer is within 2.5 of the real answer. Lens uses the Laplace or Gaussian (depending on the type of differential privacy) cumulative distribution function (CDF) equation to arrive at the privacy budget from these inputs. (3) The third mode is to express a confidence interval as a percentage of the true value, for instance 95%+/−1%, which means that there should be a 95% chance that the reported answer is within 1% of the true answer. This is approximately calculated by spending some budget to get an approximate value of the true answer, using this approximate value to calibrate the amount of budget to spend that would result in the desired resolution, and rerunning the query with that amount of budget. Modes (2) and (3) apply only to SQL-like queries. In each of cases (2) and (3), a confirmation step may be performed where Lens displays to the user the amount of budget that would be spent, as shown in FIG. 7. The user may confirm or deny that they want to proceed with the query. Appendix 1 (Section A) describes the algorithms to calculate a desired resolution specified by the data analyst and corresponding to modes (2) and modes (3) explained here.

5.3.3 Presenting Information about Noise Addition

This section applies to SQL-like queries only. It is vital when query results have been altered to present the analyst with statistical information about how they have been altered, and in particular to inform the analyst about the nature of the noise that has been added. Lens gives either exact or approximate information about the magnitude of noise addition with every query result.

For COUNT and SUM queries, the noise distribution is exactly known, and a 95% confidence interval may be calculated from the noise distribution and displayed to the user, either like "400+/−25" or as "375-425".

For AVERAGE queries, there is a problem because they are calculated as a noisy sum divided by an exact count, and the exact count is not public. Lens uses a configurable, hard coded amount of privacy budget (like 0.1) to get an approximation for the count in the denominator. It then divides the noise distribution of the sum in the numerator (which is known exactly) by this approximate count to get an approximation for the noise distribution of the average. A 95% confidence interval may be calculated from this distribution and displayed to the user.

5.3.4 Private Vs. Public Columns

Some datasets have a mixture of public and private columns. For instance, it may contain a column listing gender and a column listing medical test outcome, and the data holder may designate that the former is public and the latter private. Public means that the information is freely available elsewhere, or would be freely given. Private means the opposite.

Lens supports a configuration of columns as public or private (and this configuration may be customizable per user). Lens pre-processes queries to determine whether they concern only public columns and whether or not these queries should be allowed. For SQL-like queries, this determination is achieved by examining the columns in each filter clause and in the aggregate. For statistical test queries, it is achieved by examining the variables that were chosen in the test. For flexible code queries and parameterized models, it is determined by checking whether the analyst provided an explicit list of columns he required, and whether these columns are public. If Lens determines that the query concerns only public columns, even in the case where the Laplace mechanism (i.e. noise addition) is being used for privacy protection, no noise is added to the query and no privacy budget is spent. Stated otherwise, the system removes privacy protections for queries that do not need them because they concern only public information. While this technically means that the system is no longer providing differential privacy, it is still providing an equivalent guarantee of the privacy for the information in the private columns only. It does not provide any guarantee of privacy of the values in the public columns, but that is okay because they are public anyway. Lens may or may not allow access to a sample of the row-level values for the public columns—this is configurable by the data holder.

Note that for certain queries in which the filter clauses concern public columns but the aggregate concerns a private column (e.g. "SELECT AVG(test_score) WHERE gender='Male';"), the sensitive vs. non-sensitive distinction leads to an important optimization. The optimization occurs because the extra queries required, as discussed above, replace the aggregate function with a COUNT (here, "SELECT COUNT(*) WHERE gender='Male';"), thus ending up with a query that concerns no public columns and so does not need noise. In this case, these extra queries that are conducted by Lens do not incur privacy budget and their results are exact.

5.4 Query Generalisation

This section applies only to queries of the SQL-like type. Lens supports procedurally altering queries on the fly in a pre-processing stage to make the filter clauses more general. The pre-processing stage rewrites query by replacing specific filters with more general combination of filters.

An alert may be shown to the analyst notifying him/her that this alteration is occurring. For instance, if a dataset contains an age column, and due to HIPAA (Health Insurance Portability and Accountability Act) regulations the data holder wishes all aggregate statistics to meet the HIPAA requirements for age generalisation, Lens can pre-process queries to replace age filter clauses with more general age filter clauses. For instance, it can replace "AVG(costs) where age=47" with "AVG(costs) WHERE age >=40 AND age <50". The data holder supplies the information about the desired intervals or groupings of categorical options to generalise to. Lens implements generalisation by preprocessing the filter clauses of the queries. If the column used in the filter clause is continuous, Lens extracts the value used in the filter clause, and (a) if it's an equals filter (e.g. WHERE age=45), replacing the filter clause with filter clauses that define membership in the associated bin; (b) if it's a not-equals filter (e.g. WHERE age !=45), replacing the filter clause with filter clauses that define exclusion from the bin; and (b) if it's an inequality clause (e.g. WHERE age >45), replacing the inequality bound with the nearest bin boundary. If the column used in the filter clause is categorical, and the option used in the filter clause needs to be generalised to a group of options (e.g. "January", "February", and "March" need to be grouped together), the filter clause is replaced by a set of filter clauses linked by the OR or AND operator, depending on whether the original clause used the equals or not-equals operator.

5.5 Activity Visualization

Lens visualizes activity in a way tailored to make attempted breaches of privacy easy to spot. A user interface graphically depicts information leakage (use of privacy budget) and specific alerts which may be triggered by rules as a function of time.

Figure 8:
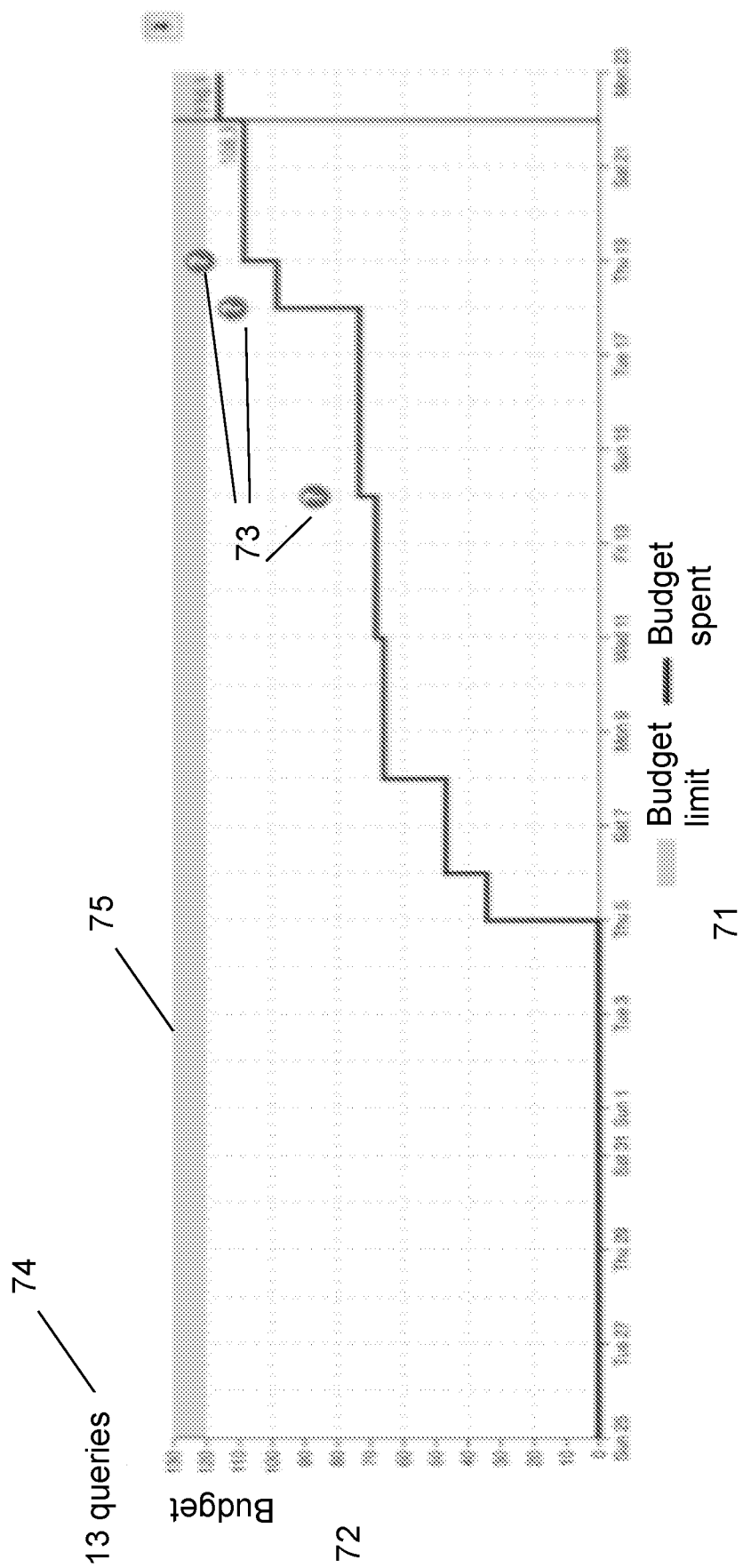
FIG. 8 shows a line chart representing an individual's querying of a dataset as a function of time.

FIG. 8 shows an example of a line chart which represents an individual's querying of a dataset over time. On the x-axis is time (71), while on the y-axis (72) is cumulative information leakage. If noise addition is being used, then the information leakage of each query is calculated according to the principles of differential privacy (see above). If noise addition is not being used, then noise addition may be calculated as (a) a constant amount per query, or (b) as 1/|C| where |C| is the size of the query set. The line chart is annotated with bubbles above the line (73) (e.g. red circles with exclamation marks in them) when the query triggered one of the attack detection checks discussed in section 3.2. The bubbles (73) are positioned such that their x-axis positioning matches the time that the suspicious query occurred. These bubbles may be links that display the query when clicked. The total number of queries (74) in relation to the individual is also displayed. A pre-defined budget limit (75) can also be set.

5.6 Query Rate Limiting

Limitless querying is almost always a problem for privacy because each new query leaks new information. Research has shown that answering enough different queries allows nearly complete reconstruction of the original sensitive dataset. Lens has features to slow or cap the information leakage to each analyst for each particular dataset. Information leakage may be calculated in the same ways as discussed in section 3.5. Lens can establish a total amount of information leakage for a dataset or a total number of queries for a dataset. For either of these, it maintains a measure of the information leakage caused by previous queries and checks at each new query whether it would exceed the threshold of information leakage. Lens can also rate-limit the amount of information leakage or number of queries by capping the information leakage or number of queries per day, month, or year, depending on the configuration. It accomplishes this in a similar way to normal capping, but it resets the measures every day, month, or year.

5.7 Extension to Time Series Data

Lens by default assumes that each row in the dataset corresponds to one person, and aims to protect the privacy of each person. However, if the dataset is time series data, many rows can correspond to one person. Lens can calculate the maximum number of rows touched by any one person (after being configured by the data holder with the column that identifies a person, such as an ID number column), and use this number as a multiplicative factor by which it increases the magnitude of its noise addition on all queries. Assuming all other parameters stay the same, this approach yields equivalent privacy guarantees to the one-row-per-person case.

5.7.1 Feature Extraction

Note that if a new dataset is extracted from the time series data (see the feature extraction feature above) then this multiplicative factor on noise addition is not used on queries about the new dataset. The new dataset receives normal noise magnitudes. This is because feature extraction results in a non-time-series dataset.

5.8 Seeing One's Own Data in the Raw

There may be cases where some data owned by the analyst is in the dataset (along with other people's data that the analyst does not own). The analyst has the right to see his own data in the raw, but must be protected from learning sensitive information about the other individuals in the dataset. Lens supports this if the analyst's data can be specified with a WHERE filter clause: for instance, "WHERE customer_id=346". Lens stores this clause and then, in the pre-processing stage, checks whether this clause is present in the query. If it is present, then it skips the privacy protections for the query.

6. Capabilities

The capabilities available to the two types of users of Lens: data analysts and data holders.

6.1 Data Analyst 6.1.1 View Available Datasets and their Metadata

The data analyst can see which datasets are available to him/her, as well as the column names and certain metadata about the columns (e.g. the metadata described in the dummy dataset section).

6.1.2 Query the Datasets and View Results

The data analyst can submit queries and get results. These results will include extra information about any privacy protection measures that have been applied to the query.

6.1.3 View Information on the Noise that has been Added to Each Result

If noise has been added to the query, the data analyst can view information about the magnitude of the noise distribution.

6.1.4 Run Feature Extraction Processes to Create New Columns from Existing Columns The data analyst can create new columns as transformations of existing columns, and then query both the new columns and the old columns in aggregate queries.

6.1.5 View Dummy Datasets that Look and Feel Like Real Data

For each dataset available to him/her, the data analyst may view a set of sample rows from the dummy dataset. The dummy rows are returned raw, as in a SQL "SELECT*FROM table" query.

6.1.6 View their Own Data in the Raw

If the analyst is the owner of certain rows in the dataset, he may query about those rows and skip privacy protections.

6.2 Data Holder 6.2.1 Add Datasets

The data holder can add new datasets.

6.2.2 Configuration

Lens is configured by the data holder to enforce certain privacy controls on each user's access to each column. For instance, the data holder may want to allow analysis by another group within the same company (i.e. internal sharing), and allow a more restricted set of analysis to a third group from outside the company (i.e. external sharing). Columns may be public, private, or blocked. For instance, column A in table B may be private to user C, but public to user D, and blocked to user E. Furthermore, columns may be generalised to different extents to different users. For instance, the age column may be used in bins of width 5 by user F, but bins of width 10 by user G. Additionally, different levels of dummy data may be made available to different users. For instance, Level 7 dummy data may be made available to user H, while Level 4 dummy data may be made available to user J. Lastly, Lens may rate-limit users differently. For instance, user K may be allowed to spent 10 privacy budget total and no more than 1 per month, while user L may be able to spend 100 privacy budget total and no more than 4 per month.

6.2.3 Audit Queries

FIG. 9 shows a screenshot of the information that is being displayed to a data holder. The data holder may see all of the queries that have been asked in the system, as well as who asked them, when they were asked, the raw result of the query, the published result of the query, and, if applicable, the privacy budget spent on the query, and any attack detection rules that triggered on the query.

6.2.4 Manually Review Queries

The data holder may put Lens in a mode where a human operator must review and approve all queries before their results are released back to the data analysts.

6.2.5 be Alerted by the System when Suspicious Events Occur

The data holder may be alerted (e.g. via email) when a query triggers an alert in Lens.

6.2.6 Configure Users

The data holder can add or revoke data analyst accounts on the system as well as assigning users to particular access groups.

7. Use Cases

This section lists some example of use cases for Lens. Lens is not limited to these use cases.

7.1 Improving Education Through Analysis of Student Data

Schools generate a large amount of data, ranging from performance of students to environmental and circumstantial factors about students such as whether they are wards of the state, whether they have used special education resources, whether they have financial aid, etc. This data is highly sensitive. Meanwhile, schools, parents, and governments are trying to improve education through data-driven decision-making. They want to answer questions like: what is the ideal class size? does bringing in guest speakers in STEM subjects help convince students to choose STEM subjects? does using tablets in the classroom help improve learning? However, for privacy reasons and architectural reasons, conducting even simple analysis on student data is a slow and expensive undertaking. Furthermore, once the privacy and architectural hurdles are cleared, the data is often sent in the raw to the analyst (even if they only need aggregate information). Lens has the potential to improve the way that analysis is done. It could ease access to aggregate information and limit the sharing of sensitive row level data. It would work as follows: first, the government organisation (the data holder) that holds the student data installs Lens in their environment. Then, they post some datasets in Lens by providing information for Lens to connect to the database holding the raw data and relevant tables. For instance, they may post datasets that include grade information and social care status information for students in a certain region over the past 10 years. Then, once they approve a certain person wishing to do analysis, they provide this person with an account and configure Lens such that the person has access to the requisite tables and columns. Then, the data holder configures the privacy configurations, for instance protecting the grade and social care columns by noise addition and capping the total querying at a privacy budget of 5 (with a maximum of 0.5 per query). Finally, the data analyst uses the REST API or web frontend of Lens to submit his aggregate queries, receiving the statistics about the relationship between social care and performance. The analyst can go on to use these statistics to argue for a policy change, build an ed-tech product, or otherwise.

7.2 Building a Data Product for a SaaS Company

Many software-as-a-service (SaaS) companies provide services that streamline operational processes (e.g., purchasing, supplying, payroll, invoicing) at companies. These SaaS companies possess operational data for a large number of companies, many of which are from similar industries and may even be peers or competitors. While each customer company will have strong demands about the privacy of their data, customer companies may be willing to sign up to a service in which each customer company can learn aggregate information about the group of companies similar to themselves. From this learning they may be able to focus efforts on aspects of their business which are substandard. In this use case, Lens could be used as follows. First, the SaaS company (the data holder), after obtaining permission, posts the operational datasets in Lens (for instance, a dataset of salary levels for different job types across different companies). Then, the data holder configures privacy controls on these datasets, defending against disclosures of the row-level data. Then, the data holder builds a product layer for visualization and reporting that uses Lens on the back end (thus working with privacy-preserving aggregate information) and makes this information easy to consume for customers. For instance, this data product layer may automatically gather information about the wage patterns in the past month for various job types, turn this into a set of charts, rankings, and visualizations, and refresh this report each month. Lastly, the data product may send this report to the customer companies or display it to them in a web page.

Section C: SecureLink

SecureLink relates to a computer-implemented process for transmitting datasets from several contributing organisations to a central organisation in a way such that the columns with an ID number in the datasets are consistently masked; encryption techniques are applied.

SecureLink uses three distinct types of actor and the ElGamal cryptosystem to provide a public-key cryptographic scheme that satisfies the id number masking. ElGamal encryption is a public-key cryptosystem that is commonly believed to be secure. It's security proof relies on the Diffie-Hellman assumption. It has the property that it is homomorphic under exponentiation: raising the ciphertext to a power and then decrypting is equivalent to decrypting and then raising the result to a power.

SecureLink is a system to allow data about individuals from a large, diverse group of organisations ("Contributors")—many of whom may be direct competitors—and join it together for the purposes of a central organisation (the "Recipient"), whilst preserving the privacy of the individuals and organisations involved. Each individual is identified by a unique identifier, used consistently across all Contributors.

For the purposes of this document, we focus solely on cases where there is a single unique identifier for each individual across the contributors, but the system could easily be extended to handle multiple identifiers (for instance, social security number and passport number) by conducting the process independently on each type of identifier.

1. Privacy Requirements

In a non-privacy preserving system, these global identifiers could be used by the Recipient to join the disparate records from all Contributors for a particular individual. In SecureLink, we assume the following requirements that prevent this approach:

- Contributors must never see each other's data and should not be able to join their own data with any other downstream data in the system.
- The Recipient must never see the original unique identifier for any individual, yet must be able to identify and join all records belonging to the same individual.
- Parties must not be able to cheat—even by breaking the protocol.

Figure 10:
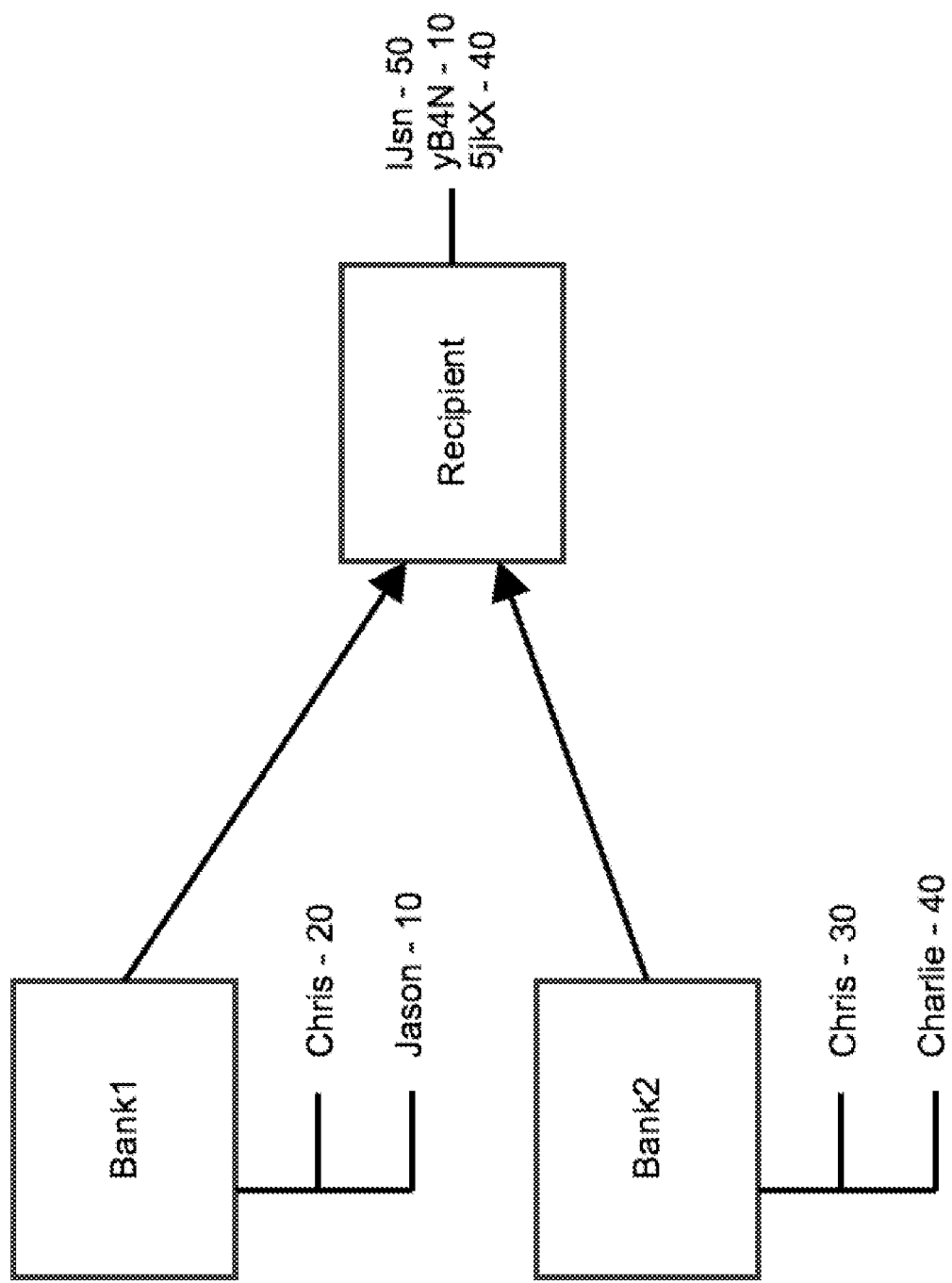
FIG. 10 shows a simple diagram where contributors share data to a recipient.

FIG. 10 illustrates a simple diagram where two contributors (Bank1 and Bank2) share data to a recipient. A simple example of how this system might be used would be to help calculate the distribution of net worth of individuals. In this example, the banks are Contributors and the recipient calculates the sum of all credits and debits for an individual across the whole financial system for further analysis.

To satisfy these requirements, we use cryptographic techniques to obscure the unique ID as it passes through the system and ensure that it is deterministically mapped to a new unique ID at the recipient which cannot be easily transformed back into the original ID. As part of this process we use a third party as an intermediary (henceforth 'the Intermediary') between the Contributors and recipient who takes part in the transformation of the unique ID. This intermediary does not know the original unique ID nor are they able to join the data (satisfying the above privacy requirements).

System Scale and Performance

Since there is no requirement for overall coordination between the various parties, the processing can be scaled and performed independently in parallel across many servers.

2. Implementation

SecureLink is implemented as three software agents—one for each of the parties: the Contributor, Intermediary, and Recipient.

2.1 Setup

As part of the setup, first, the Recipient selects an elliptic curve cryptography parameter set that will be used throughout the system. The Recipient makes this parameter set available and the Intermediary and Contributor parties verify it. The verification may involve ensuring that it corresponds to one of the recommended parameter sets from "Standards for Efficient Cryptography 2 (SEC 2)" (http://www.secg.org/sec2-v2.pdf). Once the parameter set is agreed upon and verified, both the Recipient and Intermediary generate key pairs required for the ElGamal encryption used throughout the system. To prove that they know the private key, they also use their private key to cryptographically sign the public key using an industry standard digital signature scheme, such as DSA. Both sets of public keys and the corresponding signatures are made available to all Contributors.

In addition, the Intermediary generates a random integer between 1 and the "order" parameter of the elliptic curve. This random number is referred to as the 'exponentiation key.' The Intermediary keeps this integer secret.

2.2 Flow of Data

When a new batch of data is available, the Contributor application is used to obscure the identifiers within the batch and send it to the Intermediary. The Intermediary then processes these batches as and when possible, and uploads the results to the recipient.

ElGamal encryption is used to encrypt and obscure the ids. As part of the ElGamal encryption process, for every message a random ephemeral key is generated. This results in the ciphertexts of encrypted unique IDs being different and indistinguishable across Contributors, preventing unwanted linking.

Figure 11:
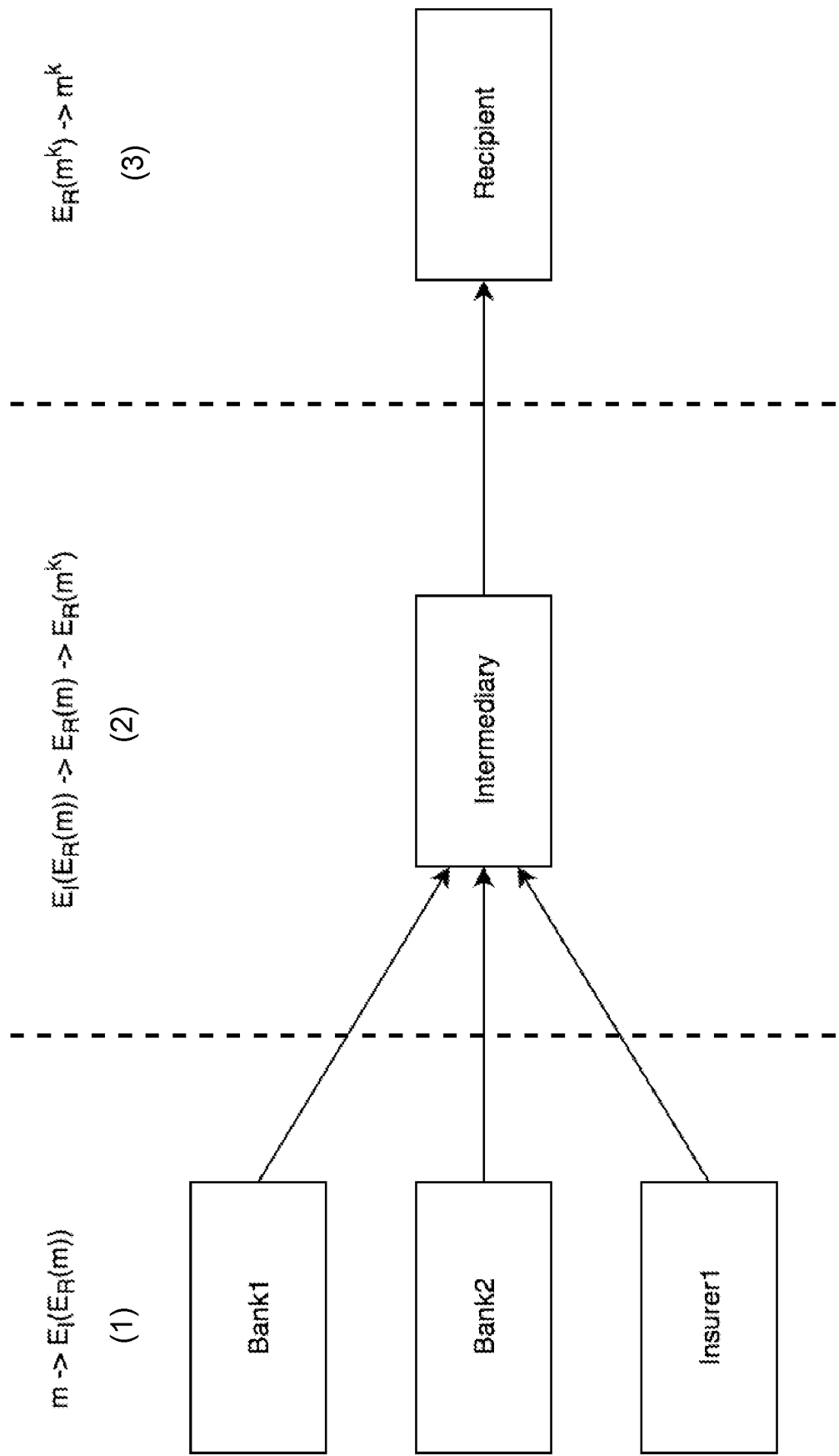
FIG. 11 shows a diagram illustrating the key components of SecureLink.

FIG. 11 shows a diagram illustrating the key operations of SecureLink. The key operations performed on the unique IDs held by each contributor are as follows:

1. The Contributor encrypts the unique ID using both the public key of the Recipient and the Intermediary (see Equation (1) in FIG. 11). In Equation (1), m in the original unique ID. The Contributor then sends the encrypted value $E_I(E_R(m))$ to the Intermediary.
2. The Intermediary decrypts $E_I(E_R(m))$ once using its secret key, leaving the value $E_R(m)$ still encrypted with the Recipient's key (See Equation (2) in FIG. 11).
3. The Intermediary further obscures the identifier by exponentiating $E_R(m)$ to a secret power k, the 'exponentiation key' (see the Setup section). The resulting value is $E_R(m^k)$ (See Equation (2) in FIG. 11). The value $E_R(m^k)$ is sent to the Recipient. Since ElGamal encryption is homomorphic under exponentiation, the decrypted value received by the Recipient will in effect be exponentiated by the same power, preventing the Recipient from seeing the original unique ID m.
4. The Recipient decrypts the remaining layer of encryption with their private key (see Equation (3) in FIG. 11). The resulting value is $m^k$, where m is the original unique ID. It is cryptographically hard to get to the original m from $m^k$, by the decisional Diffie-Hellman assumption, but it is still possible to join an individual's data using $m^k$ as the new unique ID.

2.3 Contributor

A Contributor is a party that holds some kind of data about individuals which is to be used by the Recipient. SecureLink is able to scale to support thousands of Contributors, all of which operate independently of each other. It is envisaged that the Contributor agent will operate within the infrastructure of the Contributor organisation, as close to the source of the data as possible. The Contributor agent will periodically receive new batches of data as they are produced by the organisation, these will be processed and passed to the Intermediary.

When the Contributor agent initialises, it loads in the encryption parameters—the curve parameters, public key and corresponding signature for both the Intermediary and Recipient. Each public key is verified (e.g. using the DSA signature verification algorithm)—this ensures that the protocol is being adhered to correctly.

The data produced by each Contributor can potentially be structured completely differently—the only commonality assumed is that one field within each record contains the unique identifier for that corresponding individual as used consistently by all other Contributors. The Contributor agent is configured with a description of the structure of the data it processes, comprising the names of the columns in the data and their data types.

Each time a new batch of data is available, the Contributor processes all records in the batch and obscures the identifiers. The steps involved in obscuring an identifier are as follows:

1. The identifier is converted to a point on the elliptic curve in a one-to-one mapping. It is assumed that the identifier is a number between 1 and N for some N less than the order of the elliptic curve. This mapping may be achieved by iterating through the identifiers and assigning a random element of the elliptic curve to each identifier, checking whether it collides (i.e. is the same as a previously assigned element), and trying again until if so. Alternatively, a hashing approach may be used, such as found in the "hash_to_point" function of PETlib (https://github.com/gdanezis/petlib/blob/71ec0ea5e81cea498a06d7563271210d011de448/petlib/ec.py). The hashing approach introduces a probability that distinct identifiers will be hashed to the same point, but this probability is cryptographically small and it is for all practical purposes a one-to-one mapping.
2. The Contributor creates a combined key using the public keys of both the Intermediary and the Recipient. In practice, this involves multiplication of the two public keys. (Note that there is an inconsistency in common terminology between descriptions of ElGamal and descriptions of elliptic curves. ElGamal encryption and decryption are performed using operations on groups. Groups are defined to have one operation. In the context of ElGamal, this operation is often referred to as multiplication, and repeated application of this operation is often referred to as exponentiation. In elliptic curve groups, however, the operation is commonly referred to as addition and repeated application of the operation as multiplication. We stick to the multiplication/exponentiation terminology in this document.)

3. This combined public key is then used to encrypt the hashed point. The output from the El-Gamal encryption is a pair of points on the elliptic curve.
4. The pair of points are serialized and treated as the obscured value of the identifier.

At this point, the Contributor has produced a copy of the batch of data, with all the identifiers obscured. This, together with the structural description of the dataset is then securely transferred to the Intermediary. The data file and schema are uploaded by the Contributor to the Intermediary server via SFTP. Alternatively, files could be physically transferred and manually placed in the location for the Intermediary for situations where direct network access is not feasible. At this point, the Contributor's interaction in the system is complete.

Each batch of data is treated independently by the Contributor, so can be processed by a separate invocation of the agent if necessary. The process of obscuring the identifiers is also simple to parallelise by dividing the data amongst a group of background workers if required for scalability.

2.4 Intermediary

The Intermediary is a broker that receives data from the Contributors, performs some transformations on the data, and then passes it on to the Recipient. The Intermediary has no need to see any of the raw identifiers, but must be a distinct entity from the Recipient to preserve the integrity of the system and ensure the required privacy guarantees. It is assumed that the Intermediary and the Recipient will not collude.

Contributor agents upload files to the agreed location for the Intermediary to receive them. The Intermediary monitors this location for new batches of data, and processes them as they become available. As in the case of the Contributor, each batch of data is independent, so can be processed individually by a separate process if required for scalability. The Intermediary is able to use the schema information uploaded by Contributor to identify which are the columns in the data that correspond to identifiers.

The aim of the processing performed by the Intermediary is to transform the obscured identifiers such that when decrypted by the Recipient, they decrypt to a value distinct from the original raw identifier value. This is achieved by using the homomorphic properties of El-Gamal. The Contributor does this by performing the following steps on each obscured identifier received from the Contributor:

1. De-serialize the obscured identifier to retrieve the pair of points (A, B) on the elliptic curve.
2. Perform one El-Gamal decryption on the pair of points using the Intermediary Private Key. Because we will decrypt this value again, we must continue to pass along the value of A. In practice, this means returning (A, Decrypt(A, B)).
3. 'Blind' the new partially decrypted point pair—to do this, both points are raised to the power of the 'Exponentiation Key' generated during the setup of the system.
4. Serialize the new point pair using the same mechanism in the Contributor to obtain the new value of the obscured identifier.

At this point the obscured identifiers are still encrypted, so cannot yet be joined, but have been transformed so they will not decrypt to the original identifier value.

The Intermediary then sends the newly obscured batch of data along with the corresponding schema to the Recipient via a secure transmission technology such as SFTP.

2.5 Recipient

There is one Recipient in the system and they are the party that is collecting the information for analysis. While the Recipient needs to join all the information about each individual they do not care about the specific identity of each individual and so they should not be able to easily reidentify the original unique identifier for a particular individual. The blinding step performed by the Intermediary ensures that the Recipient is able to decrypt corresponding identifiers to the same value, which is distinct from the original identifier value and cannot be used to discover the original identifier value.

When a new batch of data is made available to the Recipient, it uses the schema information as in the Intermediary to identify which columns contain identifiers. It then deserializes these values to retrieve the pair of points, and performs an El-Gamal decryption using the recipient private key to retrieve a point that represents the identifier. It may then serialize this point to a string or number.

The recipient agent is then able to pass the decrypted identifiers and the corresponding data onto the Recipient's data processing infrastructure (for example, save the data file for ETL (Extract Transform Load) to a data lake). In this infrastructure, all the received datasets from various Contributors may be joined on their masked ID columns, and it will work as if the Recipient were joining on the raw ID columns.

3. Use Cases

SecureLink can be used if a central research organisation wants to collect statistics from individuals who have data at many different service-providing organisations. For example, consider a national health research organisation that is conducting an assessment of nation-wide hospital costs. A single person may visit many hospitals, incurring costs at each hospital. The healthcare research organisation may wish to link the costs of each individual across hospitals in order to have more complete data. A convenient way to link these costs is by social security number, which one assumes is recorded consistently across hospital visits. However, the health organisation wishes to maintain privacy in the data that they collect and thus wishes the identifier to be tokenised.

In this situation, the health research organisation can use SecureLink. The organisation is the Recipient and the hospitals are Contributors. A third-party non-profit or security company could serve as the Intermediary.

SecureLink allows the healthcare research organisation to gather tokenised records of each person's costs linked together across hospitals. This is rich data that can fuel valuable research.

Section D: Publisher

Publisher relates to a computer-implemented process for processing a sensitive dataset and publishing a derivative dataset such that privacy is preserved in the derivative dataset; perturbation, generalisation, tokenisation, encryption, and visualization techniques are applied.

1. Scope of Datasets

Publisher operates on tabular datasets. It can handle a set of tables that have relations among them, such as primary/foreign key relationships. Supported data types include, for example:

Strings;
Numerics;
Dates;
Location data;
Complex structures such as arrays or maps. Columns containing map fields, as long as a comprehensive list of possible keys is known, are broken out into a set of String columns, one column per key. Columns containing array fields, provided all fields have arrays of the same length, are broken out into a set of columns, one column per index in the array.

The data may contain identifiers such as names or account numbers and thus be suitable for masking or tokenisation. Alternatively, it can represent categorical attributes such as race, religion or gender, and other sensitive values such as salary or geolocation and thus be applicable for k-anonymisation.

Publisher is built to support very long tables (with many rows) as well as wide datasets with many columns.

Publisher can handle datasets stored in various formats including CSV, Avro, and Parquet.

2. Architecture

Publisher integrates with a distributed storage and compute environment, referred to as a cluster. A cluster is many separate hosts that work together via a distributed computing and storage framework such as Apache Hadoop. Clusters can store large datasets and run distributed programs that require a large amount of memory. Publisher is installed on an "edge node", which means a host that is not one of the cluster nodes, but is on the same network as the cluster and can interact with the cluster over a network interface.

Figure 12:
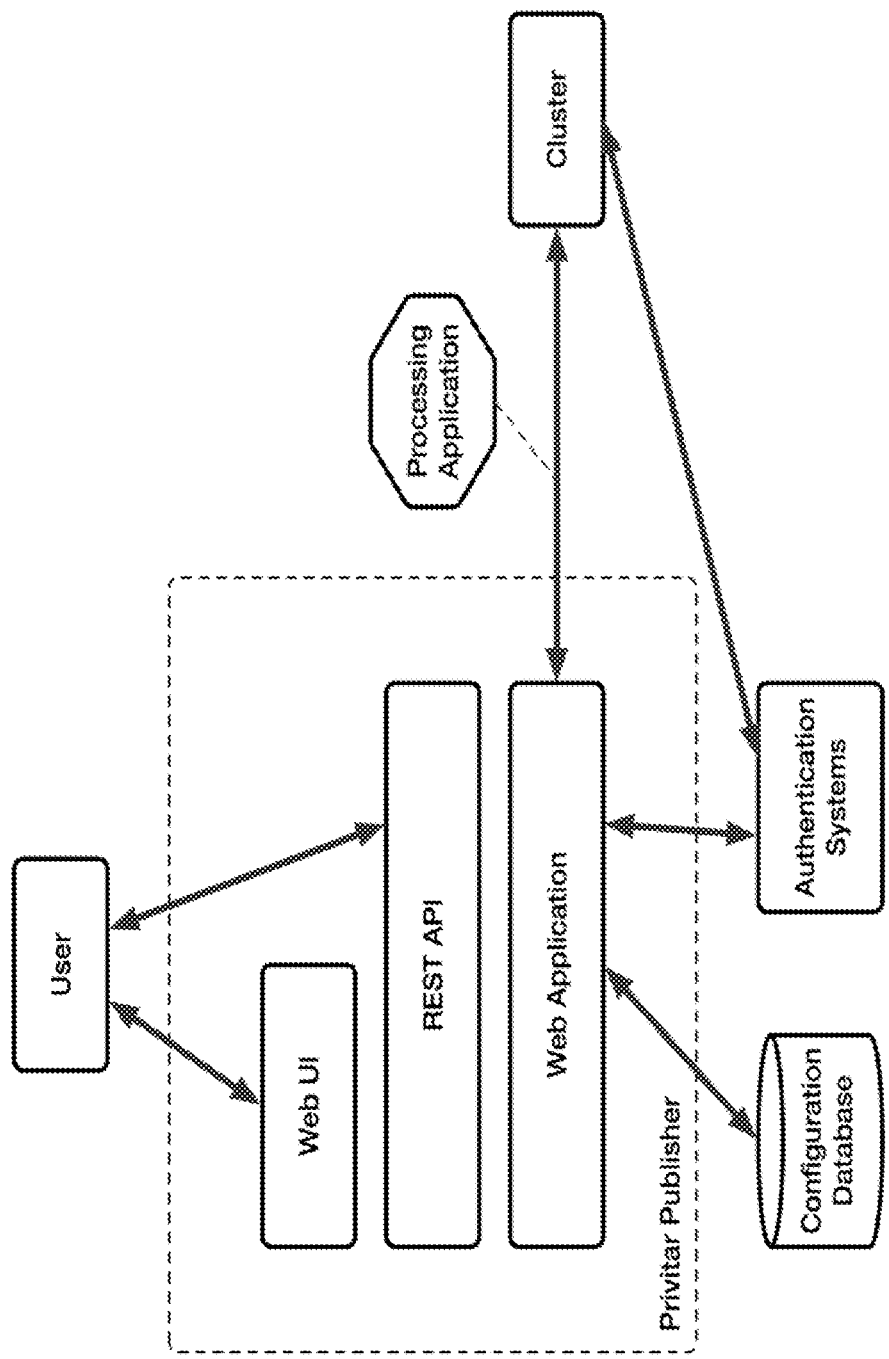
FIG. 12 shows a diagram illustrating the key components of Publisher.

FIG. 12 shows a diagram with the key components of the Architecture of Publisher. Publisher consists of two main processes:

1) a web application through which users can manage configuration, run masking and anonymisation jobs, view metadata about job runs, and administer user permissions.
2) a distributed program (e.g., an Apache Spark application) that is submitted to the cluster. When running on the cluster, it loads the sensitive dataset from cluster storage, transforms it, and writes the transformed version to a new location in cluster storage.

Using the web application the user defines how the dataset is represented, which transformations should be applied to the dataset and where the dataset can be found. The web application allows the user to submit the transformation program to their own compute cluster alongside processing instructions. Once processing is complete the transformation program will persist the anonymised data in the cluster. The transformation program also writes summary results (such as number of rows processed) in the cluster, and the web application then retrieves these results for display to the user.

Authentication.

Publisher integrates with authentication systems such as LDAP (Lightweight Directory Access Protocol) or Active Directory, using password-based authentication via a login screen in the web-app, or Basic authentication in the API.

High Availability Service.

Publisher can run in high availability mode to be resistant to the failure of the host machine. This may be implemented by running two copies of the webapp service (e.g. Tomcat) on different machines, and using a load balancer which can automatically redirect traffic to the machines that are running. The duplicate copies of the webapp service point at a consistent database backend. In the event of a machine failure, the load balancer will automatically redirect traffic to the other machine. Users may then continue to use the service in the same way.

Configuration Database.

Publisher uses a relational database (e.g., PostgreSQL) to store configuration information, the audit log, and metadata about the jobs that have been run. As configuration information, Publisher stores the permitted users, the roles of each user, the schema of each dataset, and the details of each masking, tokenisation, or privacy policy that a user has created. As audit log, Publisher stores every configuration object that has been created by a user, as well as any updates to these configurations. Publisher also stores all jobs that have been run. As metadata about the jobs that have been run, Publisher stores the number of rows processed, the rules applied to each column, and information about how columns were perturbed.

Key Management Server (KMS).

Publisher's encryption functions require secret keys. Publisher does not store these secret keys; rather, it integrates with a Key Management Server such as Apache Hadoop KMS. When Publisher requires an encryption key, it uses the name of the key to request the key from the KMS, whereupon it receives and uses the key.

3. Management of System

This section covers the way data and privacy policies are handled in Publisher, as well as other management features such as audit and user permissions.

3.1 Publisher Policies

Publisher anonymises sensitive data by producing safe copies of sensitive input data objects. In Publisher, this process is described by a 'Policy', which is created and managed by a privacy officer and is specific to a particular format (the 'Schema') of input data objects that are to be processed. 'Data object' means either data at rest in HDFS, such as a CSV, Avro or Parquet data file, or a streaming source such as Kafka records.

Policies are a central entity in the Publisher application. Publisher enables non-technical users to express how they wish to transform a dataset by defining a Policy. Users define Policies by entering information into the Publisher application. Publisher then uses the Policy and executes the processes necessary to produce a dataset that complies to that Policy.

Figure 13:
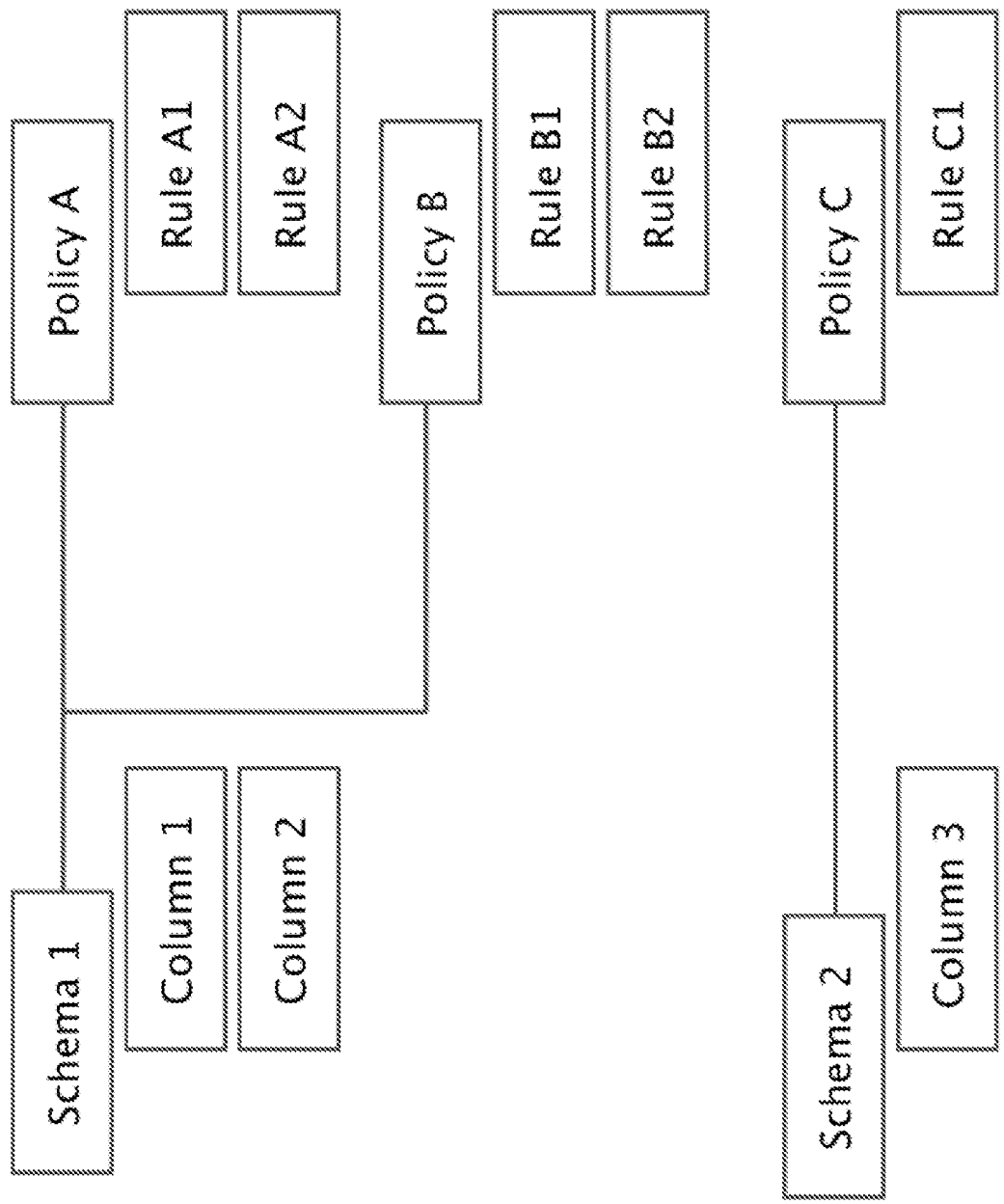
FIG. 13 shows an example of the modelling of a 'Policy' Schema in Publisher.

FIG. 13 shows an example of the modelling of a 'Policy' Schema in Publisher. Schemas are modelled in Publisher as a set of named Tables, each of which consists of a set of named Columns of values. Each Column has a data type. This is consistent with tabular data represented in CSV, Parquet or Avro files. In FIG. 13, Policies A and B work with Schema 1, which has two columns. Policy C works with Schema 2, which has one column Publisher can store the configuration of many Schemas and Policies. This is to support having multiple Policies for different uses of the same Schema, support for multiple Schemas, and working space for work-in-progress Schemas and Policies that are not yet in active use.

Any data object that conforms to a given Schema can be anonymised by use of a compatible Policy. It is also possible to have multiple Policies that can transform the same Schema. This is important because it allows the output to be customised for different downstream consumers, who may require different anonymisation treatments. Policies used in this way can be as similar or as different as required, depending on such factors as sharing or isolation of data between teams, data minimisation, sharing outside the organisation, conformance to required data formats in output, etc.

Because the Policy is a configuration object that is persistent within Publisher, it serves as a standard for processing of data it is compatible with. This has the benefits that it encapsulates reproducibility of processing on multiple data objects over time, control of consistency between use cases, and being a single point of management, review and reporting.

3.1.1 Centralised Policy Management

A key feature of Publisher is that descriptions of privacy protections to be applied to sensitive input data (the Publisher 'Policy') are described, managed and created centrally.

This arrangement has the benefits that privacy officers can see a single overview of what data is protected and by what methods; can add new data sources using a single user-friendly interface; can apply protection measures that have been standardised across an organisation to multiple data sources; can manage access control to the whole configuration in a centralised way; and can optionally reuse existing tokens in a consistent manner, to allow new data to be joined or appended to data already processed, including repeated batch processes such as nightly data loads.

3.1.2 Rules

Publisher provides a main user interface to creating Policies. This process is to create or reference a Rule for each Column of each Table. When processing a data object, Publisher applies the logic for the appropriate Rules as configured in the Policy. A Rule is a value-level transformation. Publisher applies a Rule to each value of a Column when processing a data object.

For at-rest files, Publisher submits a Spark job to the Hadoop cluster, thus exploiting the parallel-processing capability of the Hadoop cluster to apply Rules to Columns in a distributed way on very large input data.

For streaming sources, Publisher uses a transformation agent in the appropriate message pipeline to make the transformations described by a Policy's Rules on the components of messages as they are processed through the pipeline.

3.1.3 Consistent Tokenisation

'Masking' and 'tokenisation' refer to two types of Rule where sensitive values are either removed or obscured (masking), or replaced outright with generated tokens that stand in for the real data values (tokenisation). Publisher provides several types of masking and tokenisation Rules. See the sections on Masking & Tokenisation and Generalisation for more information on the capabilities of Rules available in Publisher's Policies.

When creating Policy Rules, there is the option to have tokenisation be 'consistent'. This means that, in applying a given Policy, whenever Publisher processes a given raw input value, it always produces the same output token, even in subsequent re-runs or when processing different data objects.

Consistent tokenisation is important when:
1. There are relationships between Columns If Publisher is used to process files with foreign-key relationships that must be maintained, the same value (i.e., the same token) must be output for a given raw input value in all the anonymised tables.
2. Further data is expected, either incremental batches, or new tables To add more data to previous output, it is necessary to retain tokens that Publisher has already generated, and add new tokens to the set of known tokens as necessary.

Consistent tokenisation is implemented in Publisher using a construct called a 'Token Vault'. This is a mapping between raw input values and the computed token. It does not matter which type of Rule was used to generate a token: the mapping is stored in a standardised way. See later sections for more detail on management and security of Token Vaults.

If tokenisation is not consistent, Publisher creates a new token for each occurrence of a value, even within the same file. This means there may be multiple tokens for the same input value if it occurs more than once in the data.

Inconsistent tokenisation is important when:
1. Sharing data with independent third-party recipients When two or more parties are receiving anonymised data based on the same original source, inconsistent tokenisation should be configured in Publisher to ensure the third-party recipients cannot collaborate to join their respective copies of datasets on common token values.

3.1.4 Sharing of Rules

As discussed, Publisher Policies are composed of Rules. Publisher allows Rules to be shared across Policies for centralised management.

It is possible in Publisher to reuse Rules across Policies in three ways:
A rule can be present in a single Policy.
A rule can be shared between many Policies, but its tokens are not consistent.
A rule can be shared between many Policies, and its tokens are consistent.

The choice of whether tokens are consistent in shared Rules determines whether Publisher uses the same set of tokens (i.e. the same Token Vault) between Policies. For example, two Policies may include a shared Email Address Generator Rule, so tokenised email address are produced in the same random way:

Policy 1: john.smith@tardis.com abhifjwocumdh@gmail.com
Policy 2: john.smith@tardis.com mvndklskwnrug@yahoo.com But if the Rule is 'shared consistently' then the same randomised token will be used by both:

Policy 1: john.smith@tardis.com zamfnhshdjfnd@hotmail.com
Policy 2: john.smith@tardis.com zamfnhshdjfnd@hotmail.com In this arrangement, when data objects are processed by either Policy, the same Token Vault is updated. All Policies that update the same Token Vault always see the same token mapping and can add new tokens to it.

Figure 14:
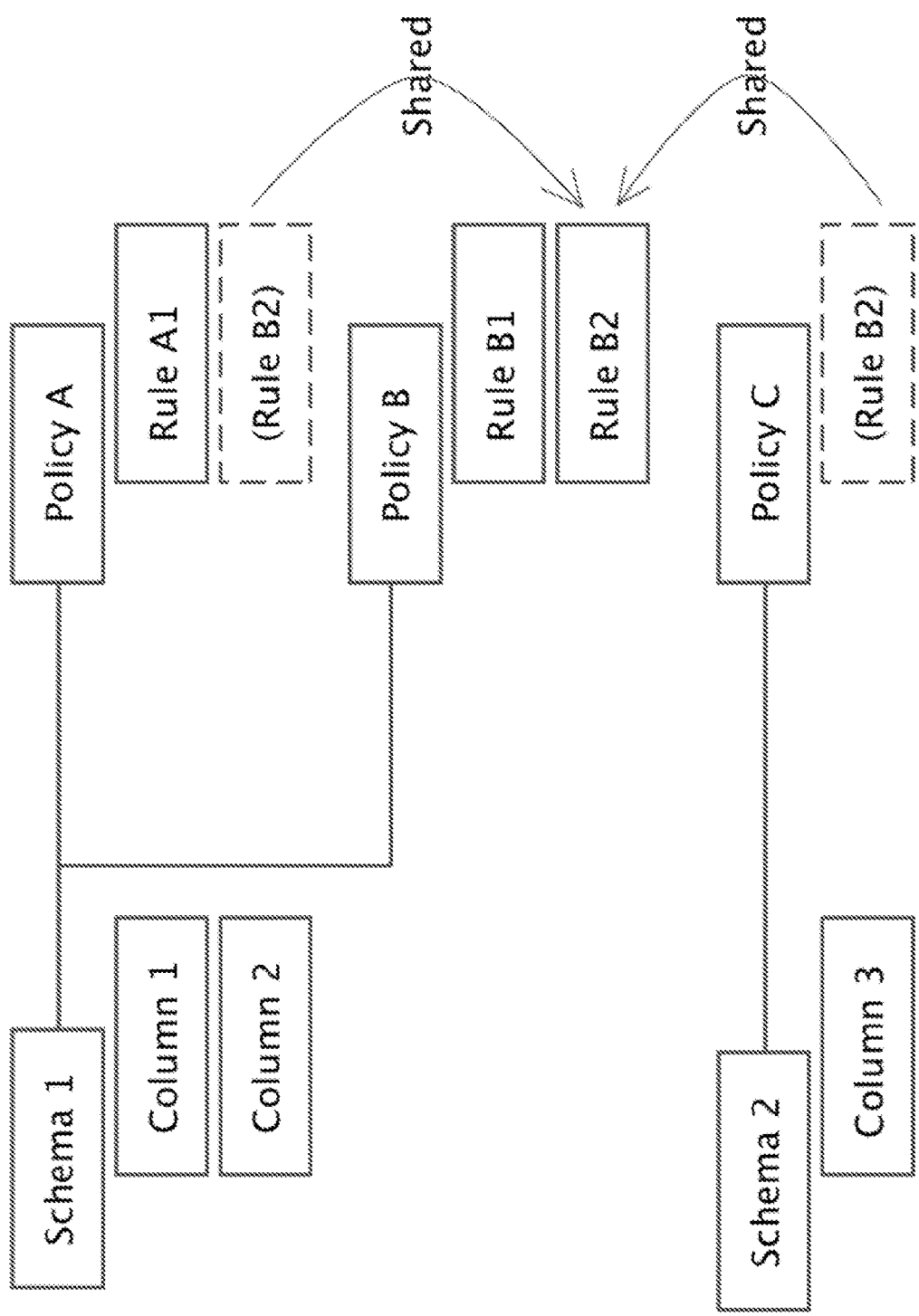
FIG. 14 shows a diagram illustrating the sharing of rules within Publisher.

FIG. 14 shows a diagram illustrating the sharing of rules within Publisher. In this example, Policy A and Policy C share a Rule with Policy B.

Rules may also be shared from Rules libraries. A Rule library is a standalone set of Rules not present in a Policy for the purpose of sharing into Policies as described above. Such libraries may be populated with Rules for an organisation's use, and freely shared as new Policies are developed.

Figure 15:
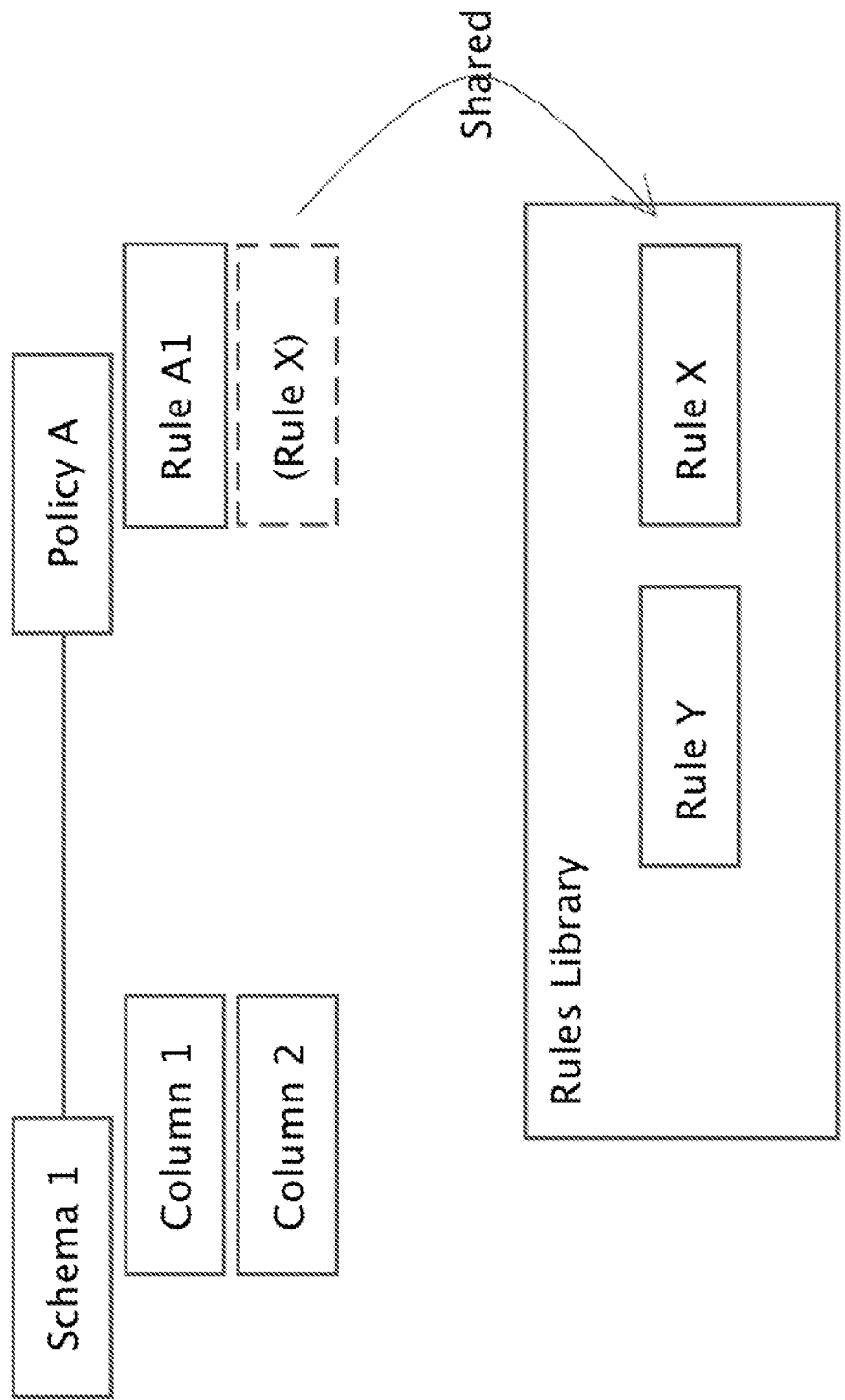
FIG. 15 shows a diagram illustrating the configuration of a Rule Library within Publisher.

Multiple Libraries may be configured within Publisher, to divide Rule definitions for organisational reasons. This is illustrated in FIG. 15 in which Policy A shares a rule with a Rules Library.

3.1.5 Benefits of Shared Rules

Publisher allows Policy governance to be controlled at multiple organisational levels by controlling shared Rules.

For example, if it is mandated organisation-wide that National ID Numbers be handled with strong encryption wherever they are used, a shared Encryption Rule should be created in Publisher by a privacy officer that can be reused by any user creating a Policy for a Schema that includes a National ID Number.

Conversely, if a sensitive data field is found only in a single type of file, the Rule for processing this Column might never be shared and present only in the specific Policy for processing this type of file.

3.2 Integration with Metadata Stores

When defining new Policies, Publisher assists the privacy officer by annotating the data sources in question with summary information obtained from external metadata stores. It is important that organisational knowledge about data sources is taken into account when the protection is defined; this may include data type, data classification, whether data is identifying or not, whether data is quasi-identifying or not, sensitivity, visibility/permitted audience, risk/exposure estimates, data expiration date, and access control requirements. These annotations help the privacy officer to determine which protections (that is, which types of Rule) should be applied to each Column in the Schema.

3.2.1 Extracting Metadata from Data Objects

Publisher can obtain metadata and summary information from the data itself. Publisher scans the data on the Hadoop cluster, and various metrics and properties are determined. Some of these properties are displayed on the UI when Policies are defined, such as data type, distribution, cardinality, and textual/numeric pattern of the data. Publisher displays these to allow the data owner to understand the structure of the data and what protections should be applied to ensure its safety. Publisher doesn't display personal data in the Policy annotations: only summaries across the datasets are displayed, and outliers are removed.

Figure 16:
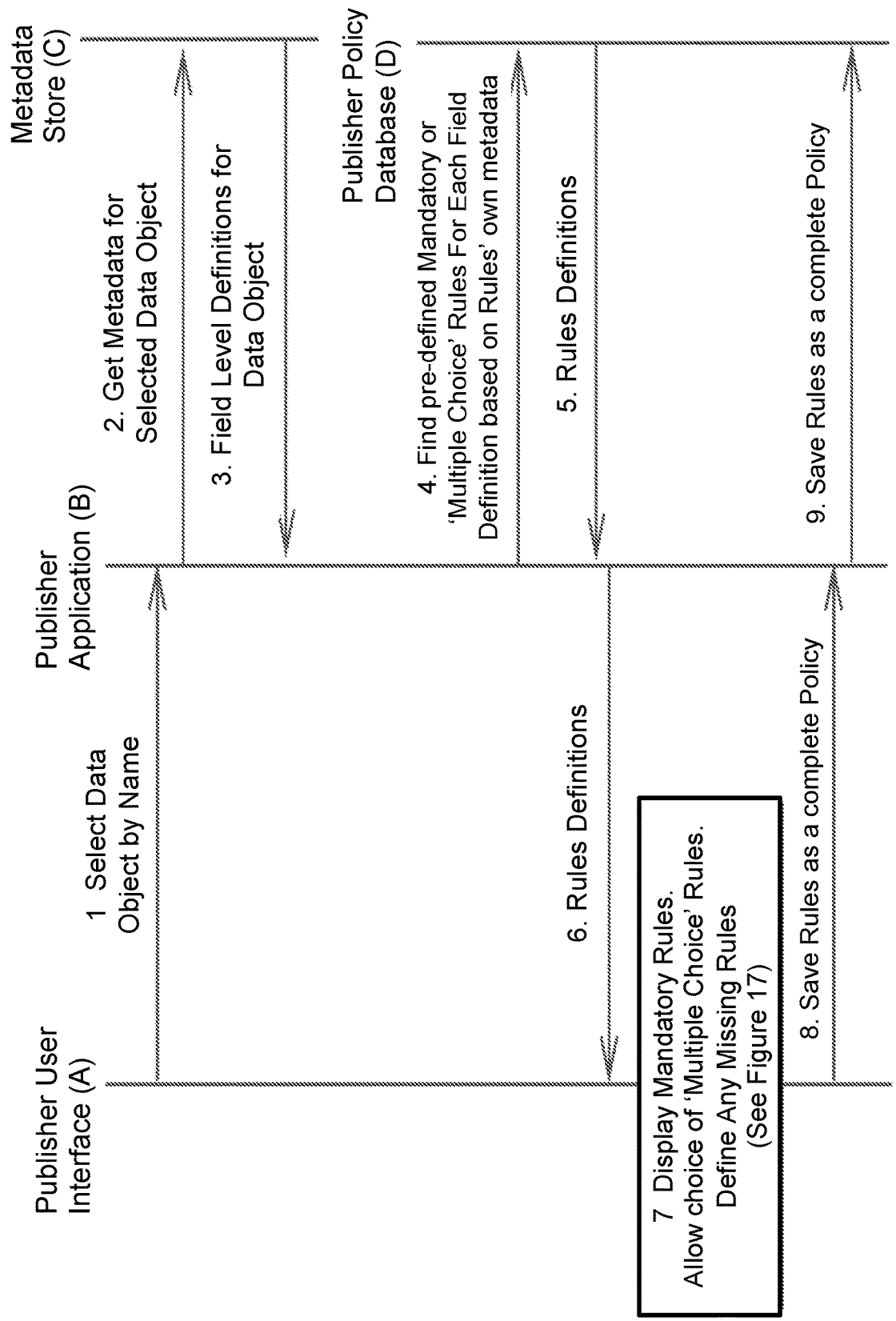
FIG. 16 shows the process of integrating with a metadata store.

FIG. 16 depicts the process of integrating with a metadata store. It shows the following steps:

(1) User selects a data object (or objects) to import (2-3) Selected object is looked up in an external metadata store, and an organisation's description of that object is returned. This description includes properties for each field or column such as datatype, sensitivity, audience, etc.

(4) Using those property descriptions, find compatible Rule(s) for each field based on metadata applied to individual Rules in the Publisher database. Note that, per field, there may be in the Publisher configuration either a) a single mandated Rule that must always be used, b) a choice of Rules that the user can pick between, and c) no current rule—in this case a new Rule must be supplied by the user before the data object can be processed.

(5-7) Return the Rules to the user for verification, choice of Rules and definition of new Rules as required. See FIG. 17 a UI wireframe for step (7).

(8-9) The Rules are written back to Publisher's database as a Policy.

FIG. 17 depicts a UI that allows a user to verify, choose from a set of alternatives, and define new Rules per column based on the flow outlined above. The table summarises the actions possible for each field (or column).

A practical example of metadata integration is to enforce an organisation-wide definition on protection of credit card numbers. For the purposes of this example, assume that it is centrally mandated that any data field (or column) containing a credit card number must be stored encrypted. With reference to FIG. 16, the logical flow in this case would be:

(1) User selects a file that contains, among others, a column of credit card numbers. The user's aim is to create a Policy containing an appropriate Rule for each column. We will consider just the credit card number column; other columns are handled similarly.

(2-3) In the organisation's metadata store, this file name and column name are already tagged with metadata indicating the referenced data column refers to a credit card number. This tagging is returned to Publisher.

(4) In Publisher's database, a mapping exists representing the restriction that columns tagged as credit card numbers must be processed with an Encryption Rule. Publisher is therefore able to select an encryption Rule for this column.

(5-7) The Encryption Rule is presented to the user for confirmation. In this example, the user cannot change the choice of Rule, therefore the organisation's protection on credit card numbers is enforced.

(8-9) The Policy is saved with the correct Rule for the credit card number column.

The same approach may also be applied at a higher level of abstraction—for example a bank might tag both credit card numbers and bank account numbers as Tier 1 sensitive data. Publisher would in this example associate an encryption rule with Tier 1 sensitive data, and so any data recorded as being Tier 1 sensitive in the bank's metadata store will be processed in a standard way.

3.3 Publisher Jobs

A Policy represents a particular processing scheme on input data. It does not reference objects directly; this is the purpose of the Publisher 'Job'. Jobs in Publisher are created by referencing a Policy, an Environment, and data objects in Hadoop that are compatible with the Policy's Schema. Jobs can be run, either immediately or later, which starts the process of transforming the referenced input files according to the definition in the Policy. Jobs may be re-run multiple times, either to reflect changes to the Policy on the same input data, or to process changes to the input data files. After a Job has run, it remains as a record in Publisher. This is useful in the case where the source data has changed and the privacy modification process should be repeated. While a Job is running, its progress can be monitored using the Publisher UI or, to support automation, a REST API.

Data objects can be described in the Job either directly using its complete HDFS path name, or via a path that includes wildcards, which can match multiple objects in a directory structure. In the case where wildcards are used, re-running a Job may process different objects if they have been added or removed since the previous run. This allows Publisher to use a single Job to handle situations where the files change periodically, such as batch uploads. This mechanism is compatible with the Hadoop convention of directories named as "name=value" pairs to represent partitioned datasets: wildcards in Job definitions such as "creation_date=*" are supported. When new partitions are ingested, the wildcard matches as described here and the new partitions are processed by the Job.

In addition to wildcards it is possible to parameterise paths in Jobs with named elements, so that when the Job is run through the Publisher UI or over the Publisher REST API, only the named path elements are required. For example, a configured path such as "/input/creation_date=${cdate}/*.avro" in a Job can be supplied with the replacement of "20170406" for 'cdate', resulting in the processing of all Avro files in the directory/input/creation_date=20170406/. This is important for integration use cases where an external system is responsible for ensuring input files are appropriately located in HDFS. In this use case the REST API is called with the location of the input files, as determined by the external system.

3.4 User Permissions and Roles in Publisher

Publisher separates access permissions for the different types of configuration activity into roles. Users using the Publisher UI may be assigned multiple roles, which determines the actions that each user may perform. The roles and their associated responsibilities are:

1. Administrator
   Configure system setup, and create and edit Schemas.
2. Author
   Create and edit Policies and Jobs.
3. Operator
   Execute Jobs.
4. Investigator
   Perform reverse token lookup. Note that two users with this role are required to look up users in the Publisher UI.
5. System
   A specific role permitted invoke API calls, to isolate this permission from other interactive roles This separation in Publisher matches the responsibilities of users working with sensitive data in organisations. The Administrator role will apply to IT users configuring the underlying technical details of the Publisher installation. The Author role is for privacy officers creating and managing the details of privacy policies and synchronising Publisher configuration with the organisation's wider privacy activities. The Operator role is for day-to-day use in producing output files for release, may not be a trusted user, and therefore is prevented from having the ability to accidentally or deliberately change configuration.

This role separation in Publisher is essential for preventing users from moving sensitive data to new locations in the cluster. Consider the case where a user could both author policies and execute jobs. They could create a Policy that retained all data, then select an output location, and then run the job, upon which Publisher would create an exact copy of the sensitive dataset in the new location. Having role separation between Authors and Operators defends against this attack, as neither an Operator nor an Author could carry it out on their own.

3.5 Bad Record Handling

Publisher Jobs can be configured to detect errors in execution and stop if some or all records cannot be processed due either to bad data or misconfiguration. In this case an error message is written to a log.

If the data format can be supplied to Publisher with unexpected malformed or inconsistent rows (for example, CSV files wrongly having a variable number of columns), a small number of the bad rows can be written to a secure location for debugging purposes. Publisher limits the number of rows that can be logged like this for security reasons.

3.6 REST API Integration with Data Processing Pipelines

Often an organisation will have multiple automated data processing 'pipelines' that handle the ingest, validation and storage of data feeds. A pipeline is typically orchestrated by a third-party workflow automation tool. Publisher can participate in such pipelines to add privacy processing to the sequence of operations performed on newly ingested data.

Pipeline integration is particularly relevant if the organisation's use case is to establish a 'safe zone' where all data has been anonymised for general ongoing use. Publisher acts as a choke point, ensuring only safe data passes out.

In file-based processing automation, data files are landed in a specific location in a cluster's HDFS storage by the previous pipeline component, and a pre-existing Publisher Job is invoked by an external workflow engine using Publisher's REST API. The Job is configured to act on all the new files at once, matching them by location and name in HDFS, and applies a Policy as configured in the Job to anonymise the files and write safe copies to an output location directory with a mirrored structure.

The HTTP response to the REST call provides a URL that can be used to monitor progress; it is the responsibility of the external workflow engine to use this URL to detect when the anonymisation process is completed and pass the safe output files to the next step in the processing pipeline.

3.7 Audit

3.7.1 Configuration Audit and Compliance Reporting

Publisher helps organisations meet regulatory requirements around reporting on the origin of anonymised data. There are two main types of report:

1. Establish the lineage of specific data objects from raw source to safe copy via a Publisher Policy For example, in the event of a data breach, it is necessary to understand what raw data is at risk by the exposure of an anonymised
2. Review current and previous Publisher configuration to demonstrate the extent of the protection in place For example, when a project is in the planning stage, it is necessary to demonstrate an adequate level of protection on sensitive data proposed to be used.

These are discussed in more detail below.

3.7.2 Audit of Data: Data Lineage

Figure 18:
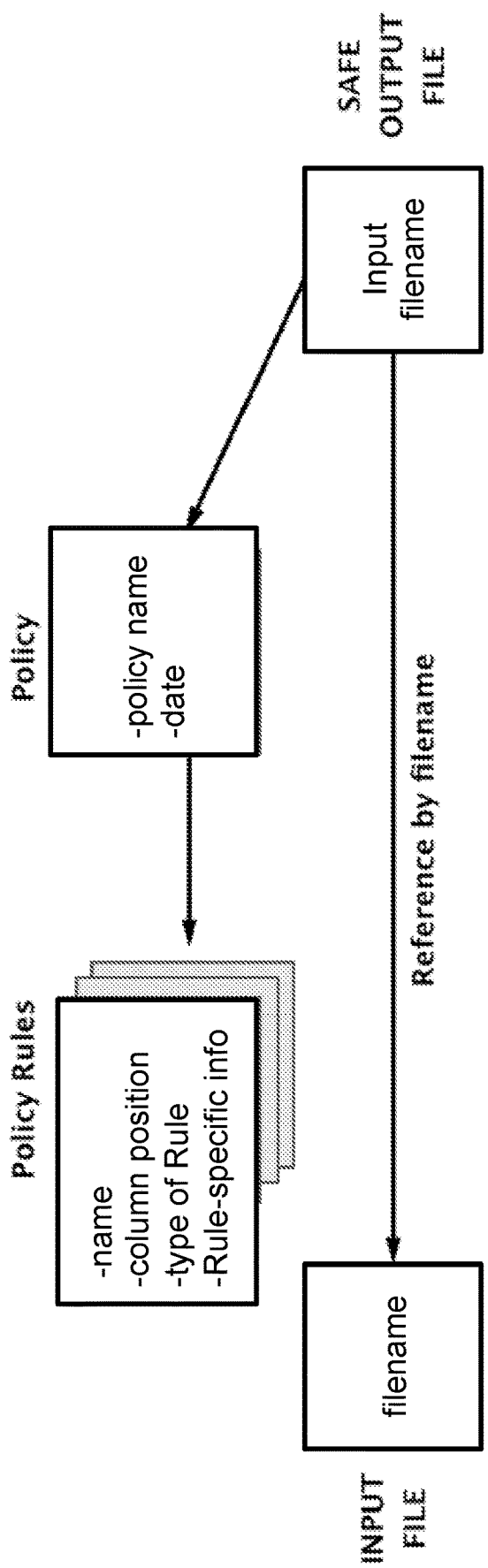
FIG. 18 shows a diagram illustrating the audit of data workflow.

Hadoop distributions provide support for data lineage metadata in HDFS, which allows files that have been derived in some way from other files to be connected, recording their origin. Publisher integrates with such systems to record the production of anonymised files from input files. When Publisher writes an output file to HDFS, a description of the Policy is created as metadata, and used to connect the sensitive input file with the safe output file. This metadata is shown in FIG. 18.

This metadata is exposed for the benefit of external applications that are interested in locating safe copies in preference to the sensitive originals. Such applications might, for example, build a search index on the HDFS contents, and respond to user searches by displaying the safe copies and hiding the sensitive originals. In this example lineage is necessary to determine which sensitive files should be hidden.

Another example is situations when the safe output copy inherits metadata from the original. The link can be used to read the original metadata and apply it to the derived copy.

3.7.3 Audit of Configuration

In the event of a breach, and for other investigations, Publisher supports the process by allowing identification of the Policy that was used to generate a particular output data object.

Publisher keeps a log of changes made to its configuration objects, so when an investigator needs to establish which Policy was in effect at the time of the production of the file, the relevant Job and Policy can be recovered. This can then be used to establish the level of protection that was applied to the file.

The history of configuration changes is tracked by Publisher storing successive modifications of the objects in a database, along with the timestamp when that change was made. It is therefore possible, given a query timestamp, to reconstruct the state of the configuration at that time. Publisher provides a UI to display a historical Policy, Schema or Job.

This UI can be used to review subsequent changes, which is useful for investigating how protections on a specific dataset have changed over time.

The historical Job used to generate an output dataset contains other useful information during an investigation, such as:

Reference to input and output files by location in HDFS.
Notes field with information on why the Job was run (if supplied).
Access permissions on the input and output files at time of Job run.

3.8 Chain of Custody for Sensitive Data

Publisher conducts all processing of sensitive data within the organisation's computing cluster. This avoids additional risk resulting from transmission of sensitive data to and/or storage of sensitive data by a third party. This is an inherent benefit of Publisher's use of Spark jobs in "yarn-cluster" mode.

3.9 Data Sharing

Publisher contains features to track data shared with less trusted groups either internally or externally to an organisation. 'Shared data' refers to the situation where a data object leaves a controlled information system, and is assumed to be subject to unknown further processing and/or onward distribution. Typically, in such situations data releases are constrained by legal agreements on audience, expiry date, terms of use, etc. Publisher enables a releasing organisation to track what has been released and under what terms.

If a dataset turns up unexpectedly in violation of such terms (online, leaked to media, etc), Publisher Data Sharing tracking may enable organisations to determine, for example:

1. The original dataset;
2. Release date;
3. Authoriser in the organisation;
4. Intended recipient;
5. Intended purpose of the release;
6. Publisher Policy used for anonymisation;
7. Embedded Publisher watermark;
8. Terms of Use.

Generating datasets for sharing involves running a kind of Publisher Job where additional metadata fields are specified, which may include, but are not limited to:

Authoriser (name/email address/company);
Recipient (name/email address/company);
Intended purpose (text description);
Expiry date (date);
Terms of Use;
(Arbitrary other fields as configured).

These fields are stored alongside the normal record of a Job run, such as, for example:

Timestamp of execution (date);
Input file names (text);
Output file names (text);
Publisher Policy (name of Policy);
Watermark (numeric fields) (if required).

These fields are stored in a queryable form in Publisher's database, and the Publisher UI provides features to extract specific runs. For example, typical queries may be:

Find data releases between 1 Jan. 2016 and 31 Jan. 2016 that read input files from the HDFS location/transactions.

Find data releases authorised by john.smith@tardis.com that contained "marketing" in their usage description.
Find data releases with a recipient email containing "@hogwarts.ac.uk" where the dataset has expired.
Find data releases with Terms of Use compatible with "machine learning".

Once the Job runs have been listed by these queries, their full details are accessible, including the state of the Schema and Policy at the time of the job run.

This is useful because it allows a data owner to assess the risk of potential future breaches to data released at the same time as the breached file.

Watermarks

If a file turns up that contains a watermark, Publisher contains features to identify the Job run that generated that file. Once this has been done, the properties of that Job run can be used to direct Shared Data searches as described above, initiated from the Publisher watermark UI.

For example:

1. A breached file containing a watermark is presented.
2. A Job run is identified, giving a timestamp and recipient as well as other properties.
3. Further Job runs for similar timestamps and recipients can be queried-for and reviewed for risk.
4. If a risk is thought to be significant, follow-up actions can be taken such as changing encryption keys.

4. Data Privacy I: Tokenisation

Publisher contains several optimizations that allow the tokenisation of large datasets stored in distributed settings.

4.1 Masking & Tokenisation Rules

As previously explained, Publisher uses the concept of a policy to model the operations that must be performed on input data to make it safely anonymised. Policies contain one or more rules, where each rule encapsulates a single operation to be performed on one or more of the input data columns.

4.1.1 Rule Operations

As mentioned, Publisher provides both 'Masking' rules (those that either redact or obscure the underlying input value) and 'Tokenisation' rules (those that replace the underlying input values with generated tokens that stand in for the real data values). The following table describes the most commonly used basic rules.

|  | Rule | Description |
| --- | --- | --- |
| Masking | Retain Value | Values in the column are not changed in any way and appear fully visible in the results |
|  | Drop Column | The column is suppressed entirely from the output |
|  | Constant Value | A single user-specified value is used to replace every input value in the column |
|  | Clip | Retains a portion of the input value, discarding the rest. Can be used for blurring values like postcodes to post towns (e.g. reducing SE1 8RT to SE1), or telephone numbers to dialling codes |
|  | Substitute | Allows the user to specify their own input→token mappings |
|  | Perturb Currency | Perturbs a currency amount by up to some fraction of its value |
|  | Perturb Date | Perturbs a date a non-zero amount within the specified amplitude |
|  | Encrypt | Encrypts the input value using a key from the customer's KMS |
| Tokenisation | Regular Expression | Randomly generates tokens matching a regular expression. Allows tokens of arbitrary complexity to be constructed, representing such things as email addresses, postcodes, phone numbers, etc. Examples include: [a-z]{5, 10}\@(gmail\|yahoo\|hotmail)\.com 07[0-9]{2} [0-9]{7} |

| Rule | Description |
| --- | --- |
| Date Generator | Randomly generates dates that fall within a user specified range, with a configurable format and precision (i.e. whether to include the day of the month, or just the month number or year). |
| PAN Card Number Generator | Randomly generates credit card numbers. Can optionally preserve some digits of an input card number, and can be configured to only generate Luhn valid numbers. |
| Random Number | Randomly generates numbers with a specified precision (either integers or decimals with a configurable number of decimal places), optionally within a configured range |

All of the rules also support configurable handling of null/missing values in the input data—nulls can either be retained or nulls can be replaced with a generated output just as with non-null input values.

4.1.2 Rules Library

Publisher allows the user to create rules for common operations which may then be shared across policies. For example, the user may wish to create a 'customer ID' rule that generates tokens that conform to their organisation's particular ID format.

In addition, Publisher ships with a selection of 'out of the box' formats for generating common tokens, such as email addresses or UK postcodes.

4.1.3 Conditional Rules

In addition to the standard case, where the rule operates in the same way regardless of the original data, it is possible to construct rules that perform different operations depending on some state. Such rules may reference other rules from the common 'Rules Library' to allow complex behaviour to be specified simply by building on top of other rules.

The rules can be conditioned on either the individual value of the column, or the original value of another column in the row.

For example, such a rule may parse a phone number in the input data and perform special masking for UK phone numbers, delegating to a previously defined rule—this might be expressed in pseudocode as:
IF (val startsWith "+44") ukPhoneMask
ELSE genericPhoneMask Conditional rules may also depend on the values of other columns—for example the value of the 'Country' column may be used to inform the generation of the token to substitute for the 'Forename' column, using country specific lookup lists of names. In pseudocode, this may look like:
IF (row["Country"]="France") frenchNameLookup
ELSE IF (row["Country"]="Spain") spanishNameLookup
ELSE englishNameLookup 4.1.4 Script Rules More complex or entirely bespoke operations may be created using script rules, which provide an opportunity for the user to enter a snippet of scripting language code (such as Python) to define how some or all values of the output row should be generated. This code may receive the value of one or more of the input row's columns and may return one or more of the output column values, allowing arbitrarily complex expressions to be built up.

An example of where this is necessary is when several columns within an input are related—for example, if the input contains columns representing the date that a mortgage was taken out, the term of the mortgage and the date at which it will be fully repaid, changing either of the first two columns would necessitate changing the third. Hence if some masking of either of the initial two values is applied, the following script pseudocode might be used to ensure that the end date remains consistent with the other two columns:
outputRow["endDate"]=outputRow["startDate"]+outputRow["term"]

This snippet would assign the sum of the startDate and term columns to the endDate column.

In the above example, the rule acts on the columns subsequent to any anonymisation process being applied to them—they reference the outputRow structure. Rules may also reference the raw input data using the inputRow structure. Rules may also reference other rules. The system builds up a graph of all of the operations that are to be performed on the rows so that it can apply them in the correct order.

4.2 Consistent Tokenisation

Any tokenisation rule that generates tokens randomly may be used in either inconsistent or consistent mode. When used inconsistently, a new token is randomly generated for each given input value in isolation, and the same input value appearing multiple times in the same or different input sources will be replaced with a different, newly generated, token each time. Consistent tokenisation ensures that the same input appearing multiple times in the same or different input source is always replaced with the same randomly generated token, and that each unique input value receives a unique token (i.e. the relationship between inputs and tokens is one-to-one). These guarantees also hold for future executions of the policy, either against the same data or against new data.

The process followed for consistent tokenisation is conceptually simple and comprises two stages:
  Token Generation—the process of deriving the input→token mapping table, ensuring that each distinct value in the input column is assigned a unique token. This table of mappings is then persisted in the 'Token Vault' (see later section).
  Obfuscation—the process of using the assigned mappings when writing the output data, substituting the inputs in the source data with the generated tokens.

Since the tokens that the vault contains are generated with the strategy configured in the rule, the vault is necessarily scoped to the level of the rule—a policy that contains multiple different consistently tokenising rules will populate and consume multiple token vaults. If a rule is shared across policies, the user is able to configure whether each policy has its own vault for that rule or whether there is a single global vault shared by all policies using that rule.

4.2.1 Token Vaults

As described, the output of the token generation stage is a 'Token Vault', which stores all of the inputs that are present both in the current input data and in all historical input data processed, and the unique generated token that has been assigned to each input. This token will be used to replace it in all encountered data.

The token vault is persisted once the token generation stage is complete—this allows its use in the obfuscation stage, and also supports later token retrieval (see following section). Publisher supports the use of various different mechanisms for persisting this vault including any ODBC RDBMS, several 'NoSQL' databases or even storing files directly in HDFS. However, using a scalable, concurrent persistence store (such as an RDBMS or NoSQL database) may provide performance benefits by enabling the token generation and obfuscation stages to be combined into a single pass through the data—because the persistence store is capable of coordinating writes across multiple clients, Publisher is able to take advantage of this so that each node need only communicate with the persistence system and not with each other (each node can use the persistence store to determine whether an existing assignment exists for an input, or whether a token it has generated for an input has already been assigned for a different input).

Support for additional systems may be added by implementing a connector interface, providing concurrent random read and write capabilities for batches of input values.

Token Vaults are important because the mappings are potentially business-critical objects and values are potentially sensitive information. Publisher provides robust management and security for Token Vaults:

Publisher may be configured to encrypt the inputs that are stored within the token vault using an encryption key obtained from the customer's KMS. Key rotation is transparently supported as the vault values will be automatically re-encrypted if the key is changed. This is achieved by recording the version of the key that was used to encrypt the values in the vault's header. Obtaining this version of the key from the KMS allows us to decrypt the values even if the key has been rotated. When the vault is rewritten to include new token assignments the most recent value of the key will be used. The Publisher UI also offers the option of proactively rewriting vaults to immediately use the latest version of the key.

Publisher provides a user interface that lists and details all of an organisation's token vaults.

Since having access to the token vault allows the de-anonymisation of the output data, access to it should be strictly controlled. For example, if the vault data resides in HDFS, it should be configured to be only readable by the user account Publisher itself runs as.

4.2.2 Token Reverse Lookup

Publisher allows tokens that have been stored in a Token Vault to be reversed back to their original form and displayed to the user. This feature supports use cases where a subset of tokens has been identified by an external analytical process based on anonymised data, and it is necessary to follow-up with the real identifiers. Examples are financial crime investigations or targeted marketing; in both cases an outcome is determined for some individuals in an anonymised dataset by an analytics team that does not have access to raw data. Tokens produced can be converted back to their original raw values for follow-up.

A second use case for reverse lookup is to hold data at rest tokenised, and use Publisher to detokenise on demand. Publisher supports three ways to reverse lookup tokens:

Single token—the Publisher UI can be used to look up individual single tokens from a selected Token Vault. The user enters the token value and the raw input value that this token replaces is obtained from the vault and displayed. Use of this feature requires 'escalated twin-authentication'—two different users are required to authenticate before the lookup results are displayed.

Bulk de-tokenisation—if multiple tokens are to be looked-up, Publisher provides the option to read a file of tokens from HDFS and produce a corresponding file of raw values. This process can be initiated either from Publisher's UI or by a REST API call.

The API option is to allow de-tokenisation to be performed as part of an automation pipeline. This feature never involves displaying raw values to the UI user. The security of HDFS protects the emitted files of raw values. The API provides functions for monitoring long-running processes if the file of tokens is very large.

Interactive lookup via Hive SerDe—Publisher contains a Hive SerDe component that allows Hive queries over anonymised data to be dynamically de-tokenised when the query is run. The behaviour of the SerDe depends on the current user's role or access permissions. If the user has the appropriate permission to see the raw values, then any tokenised values in the result set returned by Hive can be dynamically looked-up in the appropriate Publisher Token Vault. Users without the required permission continue to see the tokenised values.

4.2.3 Consistent Tokenisation Implementation

As previously mentioned, if the token vault is persisted in a concurrent data store the token generation and obfuscation processes may be combined by allowing the coordination of token assignments made by different nodes to be managed through the persistence store. However, Publisher can fall back to using plain HDFS files for the token vault, requiring no additional software to be installed or managed by the customer.

At small scale and on top of plain files, the two operations required for consistent tokenisation are trivial to implement. However, when operating on a large dataset of many terabytes in size it is not possible to hold either the entire contents of the input or even the entire contents of the vault (mapping table) in memory on a single host. Therefore, efficiently implementing consistent tokenisation is a distributed computing problem. Publisher contains several innovations that allow for efficient distributed tokenisation.

4.2.4 Token Generation

The token generation step is responsible for assigning a unique token for every encountered input value. Its inputs are the input data file and the existing token vault (which will contain all token assignments generated in previous runs of the rule against preceding input files, and may be empty if this is the first execution of the rule). Its output is a new, updated token vault that includes token assignments for all inputs encountered in this and all previous executions of the rule.

The algorithm takes the set of input values that require tokenising, removes duplicates (since each value should only be tokenised once and each instance of that value should be replaced with the same token) and any value that has already been assigned a token (in a previous execution of the rule) and then assigns a random token to each remaining value. Since these values are spread across multiple hosts in a cluster it is not possible to efficiently prevent the same random token being assigned to more than one input, so after the assignments are made they are checked for uniqueness. If the same token has been assigned to multiple inputs, one of the inputs gets to keep the token and the others go back into the set of values still requiring a token. This process loops until all values have a unique token.

Figure 19A:
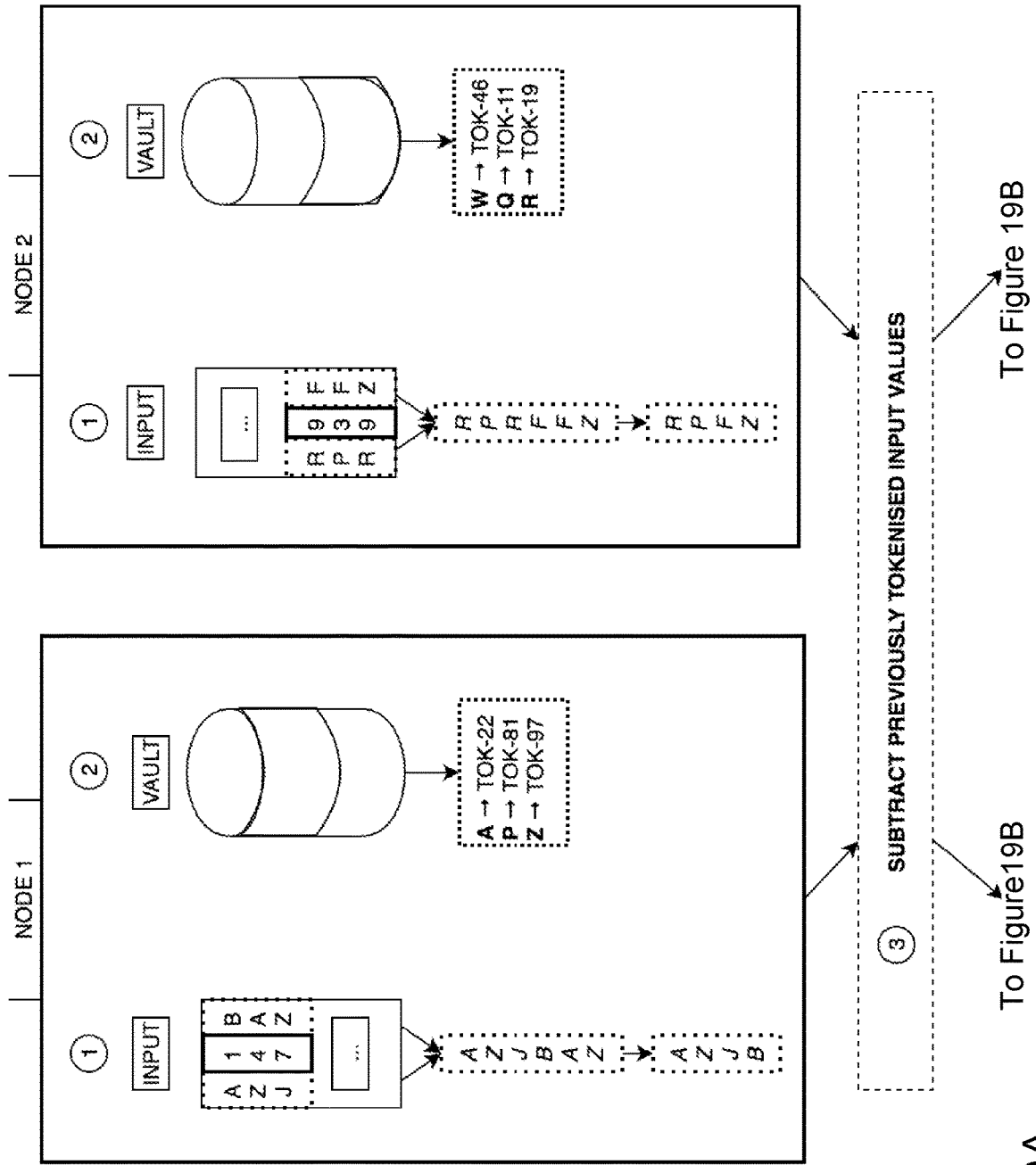
FIG. 19A shows a diagram illustrating the tokenisation flow.
Figure 19B:
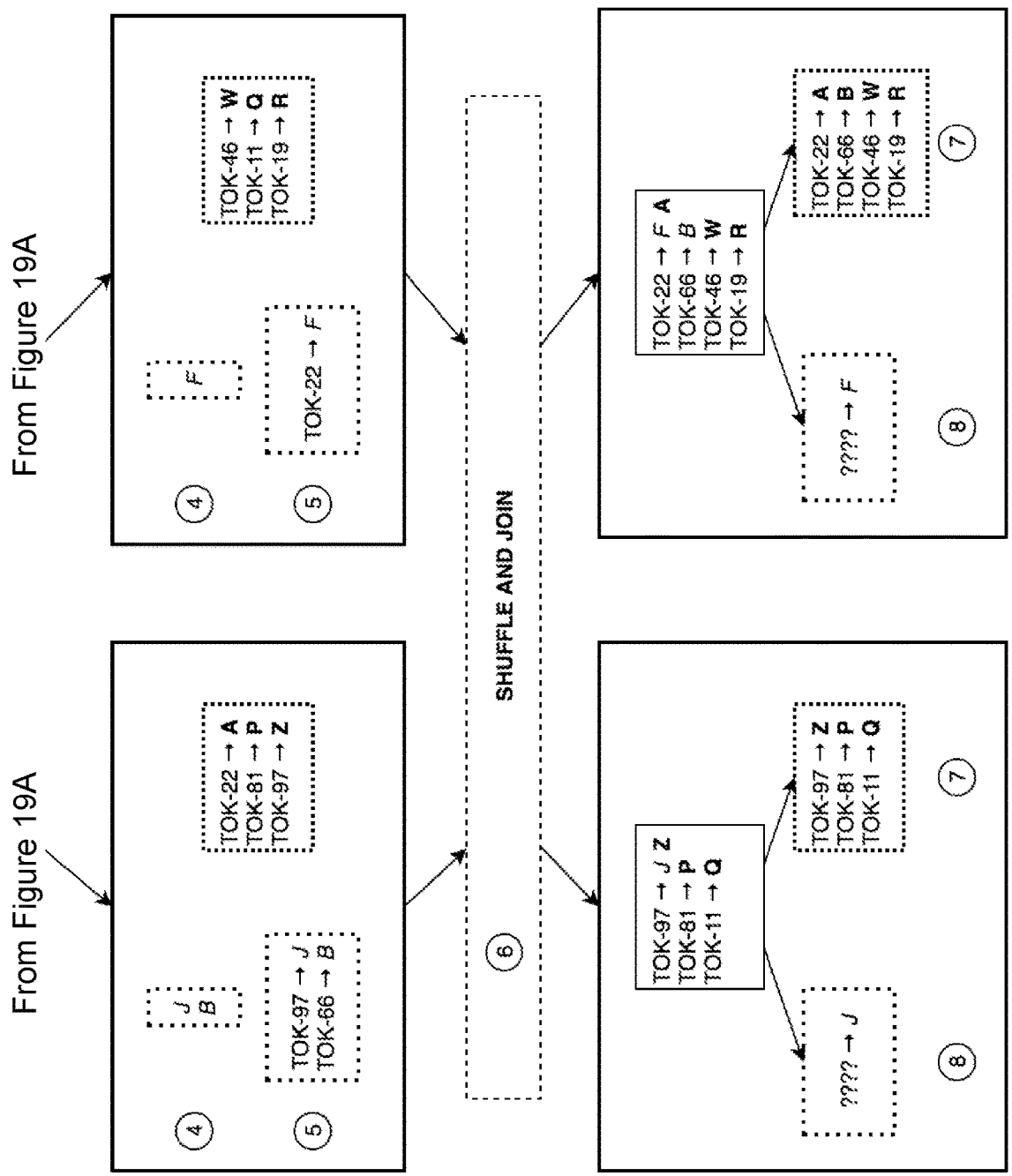
FIG. 19B shows a diagram illustrating the tokenisation flow.

FIGS. 19A and 19B are diagrams showing the tokenisation flow using HDFS files, one for the input file and one for the token vault, on a two node cluster (i.e. cluster with two machines designated for computation). Since both files reside in HDFS, they are split into blocks that are distributed across the nodes of the cluster. The example below assumes both files are split into two equal sized blocks, one of which resides on each node.

Token generation involves the following steps:

1. Each block of the input file is loaded into memory by the node on which it resides. The values for each of the columns that are to be tokenised by the rule are combined to form the set of input values for tokenisation. On each node, duplicate values within this set are discarded since each input should only be tokenised once (though the values in the set are not guaranteed to be globally unique, since other nodes may encounter the same values within their block(s) of the input file).

2. The vault of existing token assignations is also stored split across nodes, and each node loads its block(s) into memory. The entries in the token vault can be considered as a map from the raw input value (the map 'key') to its assigned token (the map 'value').

3. Any previously tokenised input values are removed from the set of values requiring tokenisation (i.e. the keys in the vault map are subtracted from the set of input values). Note that this involves communication across the cluster as Node1 may have a value to tokenise that already exists in the portion of the vault loaded by Node2. To achieve this, the input values are shared across the cluster nodes by partitioning them by value. Partitioning involves assigning sets of values to each node, and is commonly achieved by hashing the value and taking the modulo of the hash divided by the number of nodes in the cluster. For instance, in a case with 10 nodes, the value "ABC" might be hashed to 101, and thus be assigned to the node with ID 1. Each node then sends its values across the cluster consistent with this partitioning.

4. The nodes then process the portion of the data that have been sent to them—since the input data and vault entries have been partitioned using the same scheme, for each input value that the node encounters within the partition the node will also hold the vault value (if one exists). Therefore, the node is able to discard from the partition all those input values for which a vault value exists (and hence for which a token has already been generated and assigned).

5. Each node now generates a candidate token for each of the input values that remain to be tokenised. This converts the set of input values into a map where, as with the vault, the key is the raw input value and the value is the token (or, in this case, candidate token since the assignation is not yet finalised). The input value and vault value maps are then 'inverted', so that they are keyed by token rather than value (i.e. the keys are swapped with the values, and the maps go from input→token to token→input).

6. The token→input maps are now shuffled around the cluster to group them by token (this is achieved by partitioning both maps by the token).

7. Each token is then processed using the following logic:
   If the token has a single input value mapped to it, this pairing is finalised and will be persisted into the vault
   If multiple input values have been given the same candidate token, one of them 'wins' and gets to keep that assignation and the others have the token removed. If one of the inputs had previously been assigned this token (i.e. this token already existed in the vault) then this is chosen as the winner; otherwise an arbitrary choice of which input value has the token assigned is made.

8. Any remaining input values for which a unique token has yet to be assigned are fed back into the process at step 4. The token generation process then loops like this until all values have been assigned a unique token. There is a hard limit on the number of loops—if this limit is reached Publisher will terminate the process with an error. This protects against the situation where the token space of the user-entered expression (i.e. the number of unique tokens that it can generate) is less than the number of unique values that require tokenisation, which otherwise would cause an infinite loop.

9. Once all inputs have received a unique token assignation, the complete set of input value→token mappings are persisted back into the vault.

10. The entire process is repeated for each rule that is to be consistently tokenised.

4.2.5 Obfuscation

The obfuscation step uses the token vault generated in the previous step to replace the values in the input data. Its output is the input data file but with every value in the tokenised column(s) replaced by the assigned token.

Since both the input data file and the token vault are spread across the nodes in a cluster, data must be shuffled to achieve the obfuscation. The algorithm exploits the fact that the token vault is typically significantly smaller than the input dataset to minimise the amount of shuffling—the full input data is never shuffled (only the distinct set of values within a partition), and the vault data is instead shuffled so that all of the token assignations required to obfuscate a partition of the data file are copied to be on the node that holds that partition.

Figure 20A:
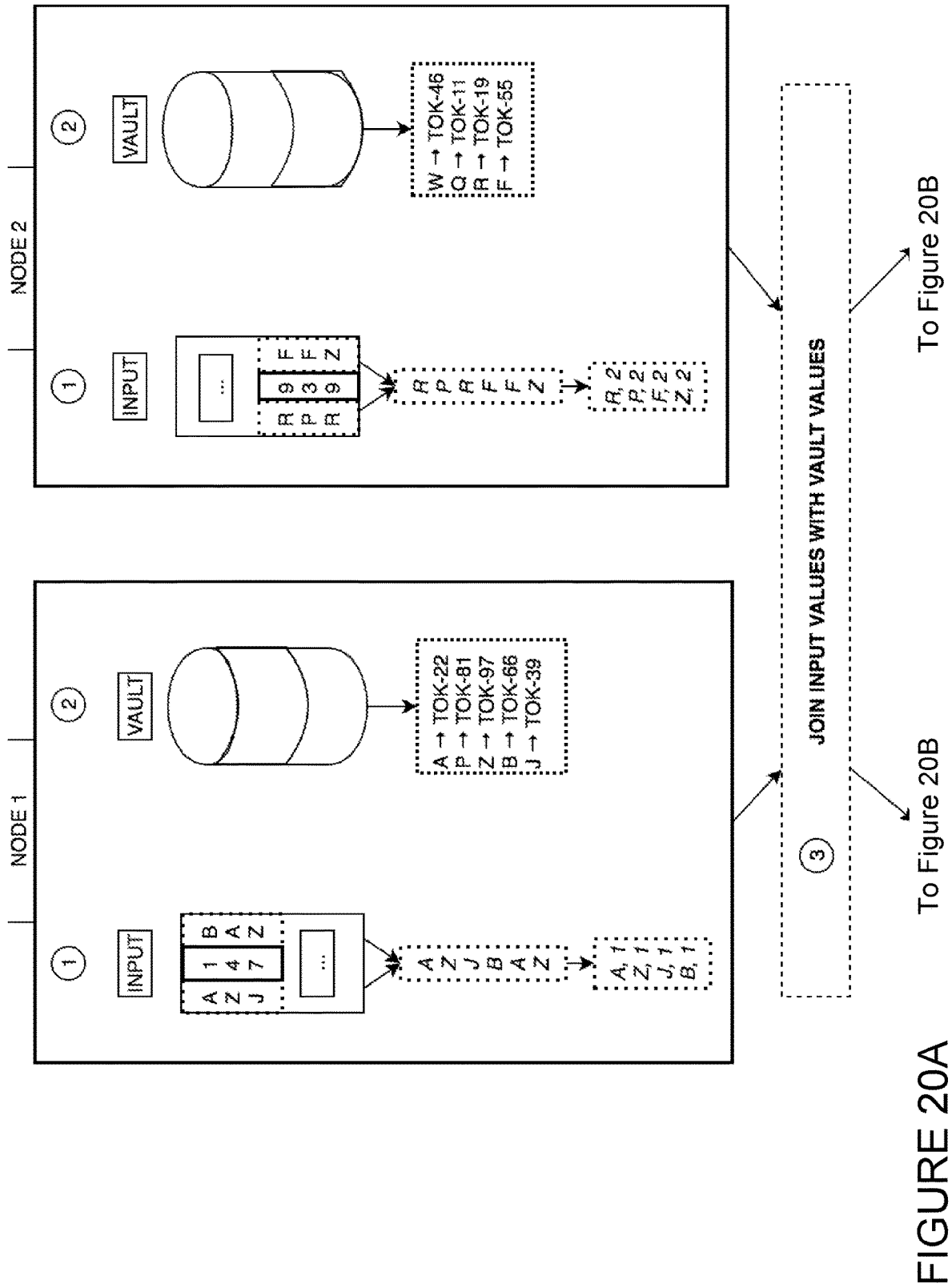
FIG. 20A shows a diagram illustrating the obfuscation flow.
Figure 20B:
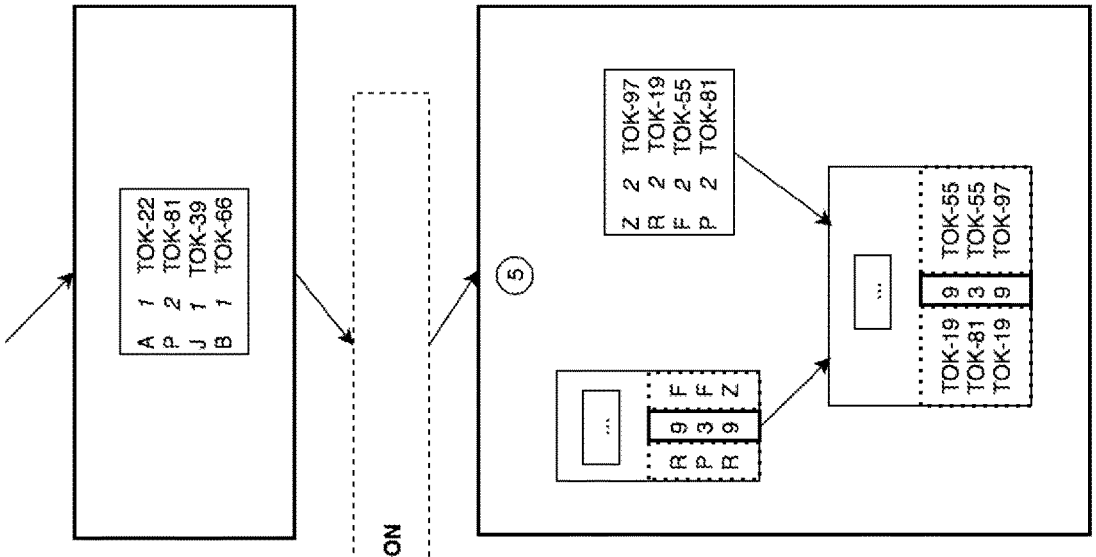
FIG. 20B shows a diagram illustrating the obfuscation flow.
Figure 20B:
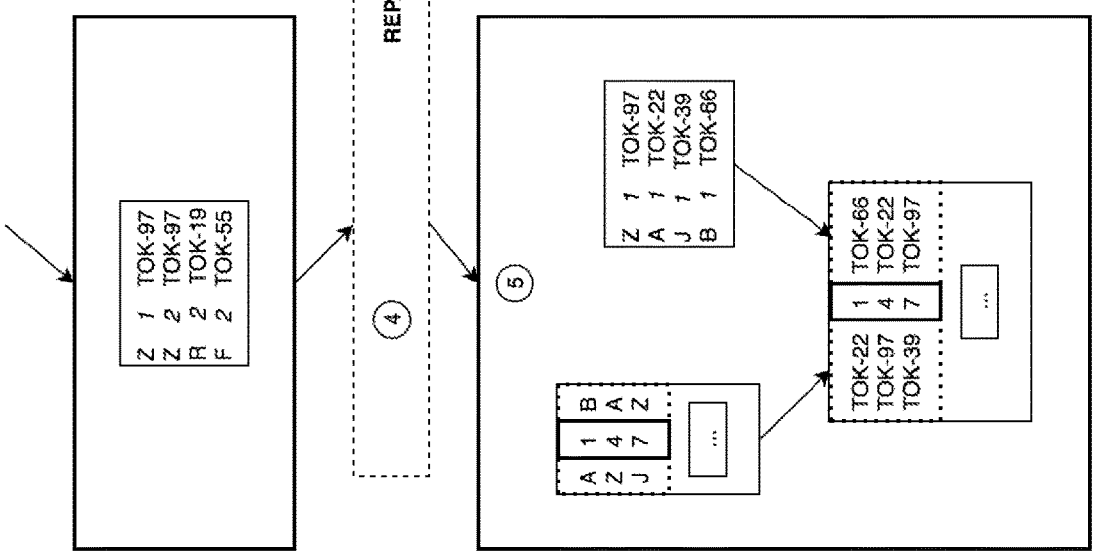

FIGS. 20A and 20B are diagrams showing the obfuscation flow following on from the previous example.

This involves the following steps:

1. Each block of the file is loaded by the node on which it resides. The values for each of the columns that are to be tokenised by the rule are combined to form the set of input values for tokenisation. Duplicate values within this set for each block are discarded since each input should only be tokenised once. Each value is then tagged with the ID of the block within which it resides.

2. As previously seen, the vault of token assignations created in the token generation step is also split across nodes, and each node loads its block(s) into memory, as a map of input value (key)→token (value).

3. The input values are joined with the vault value keys after ensuring that the vault entry for a given input resides on the same node as that input value. This involves partitioning (see previous section) both the input dataset and the vault entries and then shuffling the data across the cluster. Note that, since the values within each input data partition were made distinct in step 1, there will be at most a single occurrence of each value within each partition and therefore the maximum number of occurrences of any single input value is equal to the number of input data partitions. This avoids a common problem with such input data shuffling schemes where the presence of a single massively over-represented value can result in almost all of the data being sent to a single partition during the shuffle and causing that node to run out of memory (the so-called 'hot value' problem).

4. The joined tuples of input value, block ID and tokenised value are now partitioned across the nodes of the cluster, this time by the block ID. This involves a further shuffle of data across the cluster, returning the input value entries back to their originating node.

5. Now the input→token mapping for every input value exists on the same node as that input, and the original file may be processed and the tokenised value looked up for each input value. This process may be done independently on each node.

6. The entire process is repeated for each rule that is being used to tokenise the input file. On each pass, one or more further columns of the file are obfuscated until, after the final pass, the file has been completely anonymised.

4.2.6 Derived Tokenisation

The process above describes an efficient mechanism for tokenised the values within a large dataset. However, the process involves shuffling data around the cluster multiple times, which can prove expensive. Using the derived tokenisation feature, the shuffling of data present in the obfuscation phase may be avoided.

In traditional tokenisation as described above, the tokens are generated from their rule using an unseeded pseudorandom number generator (PRNG). The PRNG is used in one of many possible randomized token generation processes, such as creating a random integer from a range, selecting a random element from a pre-defined list, or creating a random string that satisfies a certain regular expression. When using derived tokenisation, the tokens still appear random, but the random number generator is seeded with a value derived from the input value as so:

1. Encrypt the input value using a key from the customer's KMS (using, for example, AES-128-CBC).
2. Break the resultant ciphertext into N-byte blocks and XOR them together, resulting in a final N byte block that is used as the seed for the PRNG (the value of N will depend on the seed length of the PRNG, for example it will be 8 if the PRNG accepts a 64 bit seed)
3. Derive the initialisation vector for the cipher using the identifier of the rule (for example, by concatenating it with itself until it is the right size), so that the same input value appearing in different rules will produce different seeds.

Figure 21:
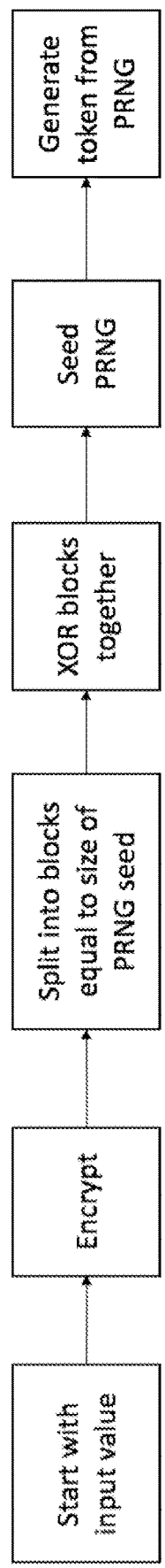
FIG. 21 shows a diagram illustrating the derived tokenisation flow.

This process is shown in FIG. 21.

Because the encrypted ciphertext resulting from a given plaintext value using a known key and initialisation vector is constant, the process will always result in the same random seed for an input value (within the same rule, but not across rules since the initialisation vector will be different).

Note that since the random seeds are derived using an encryption algorithm, and any strong encryption algorithm must provide uniformly distributed ciphertext values, it is impossible to distinguish from the generated token distribution whether unseeded or derived tokenisation has been used.

When using derived tokenisation, the tokenisation process described in the token generation section above (section 4.2.4) is broadly the same, but with the following modifications:

The deterministic process is used to create the tokens in the token vault; as described in Step 1.

When generating tokens in step 5, the PRNG is seeded from the encrypted value of the input, as described above.

A separate map of 'collisions' is maintained in addition to the vault. If two different inputs generate seeds that result in the generation of the same token (detected in step 7), one of them is added to the collisions map and assigned a non-derived value using an unseeded PRNG. Note that the probability of different inputs encrypting to the same 64 bit seed is vanishingly small, but the probability of two different seeds resulting in the same token is a function of the number space of the token expression.

Figure 22:
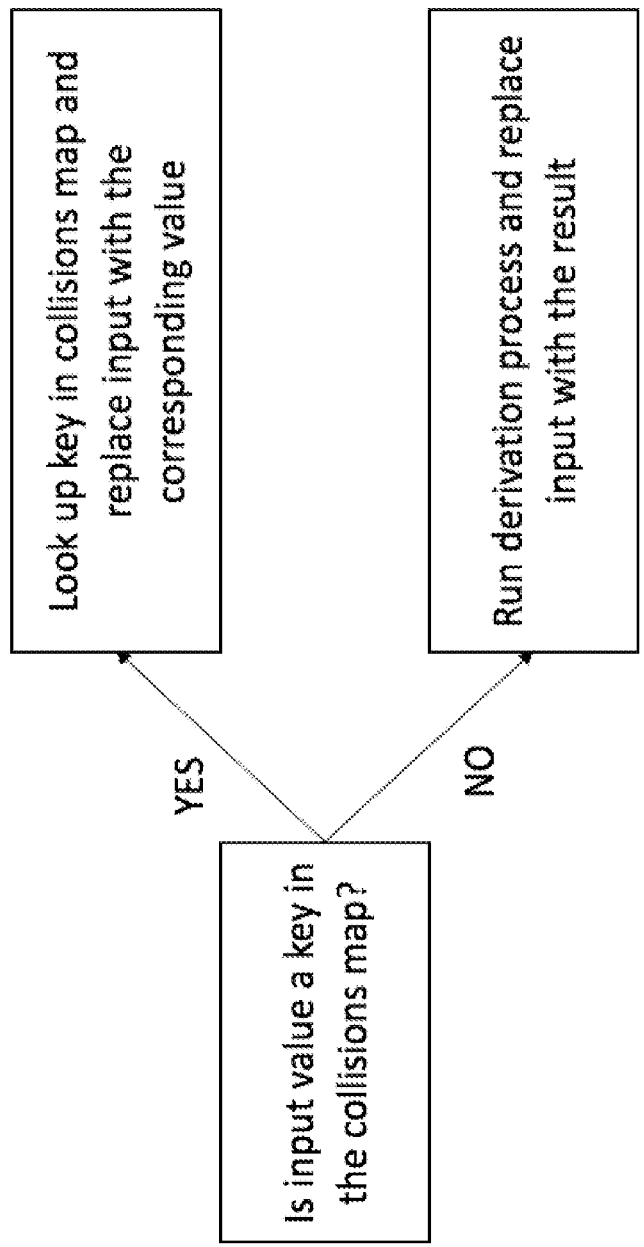
FIG. 22 shows a diagram illustrating the process of using the collisions map within the obfuscation phase.

This collisions map is very small, and can be sent to each node in its entirety. In the obfuscation phase, each node consults this map when a token is requested for an input: if the input appears in the map then the token from the map is returned; otherwise a token is derived using the ciphertext-seeded PRNG. This process is shown in FIG. 22.

The token vault is used in case reverse lookups need to happen. However, the obfuscation stage does not use this token vault, it uses the deterministic process (and the collisions table). Hence, the obfuscation phase ends up much faster because the token vault is not sent around.

The tokenisation process must still loop until all collisions have been detected and resolved, but at the end of the process we have a complete token vault which is persisted as normal (to support reverse lookups) and a much smaller map of input→token for any inputs that generate token collisions.

Figure 23A:
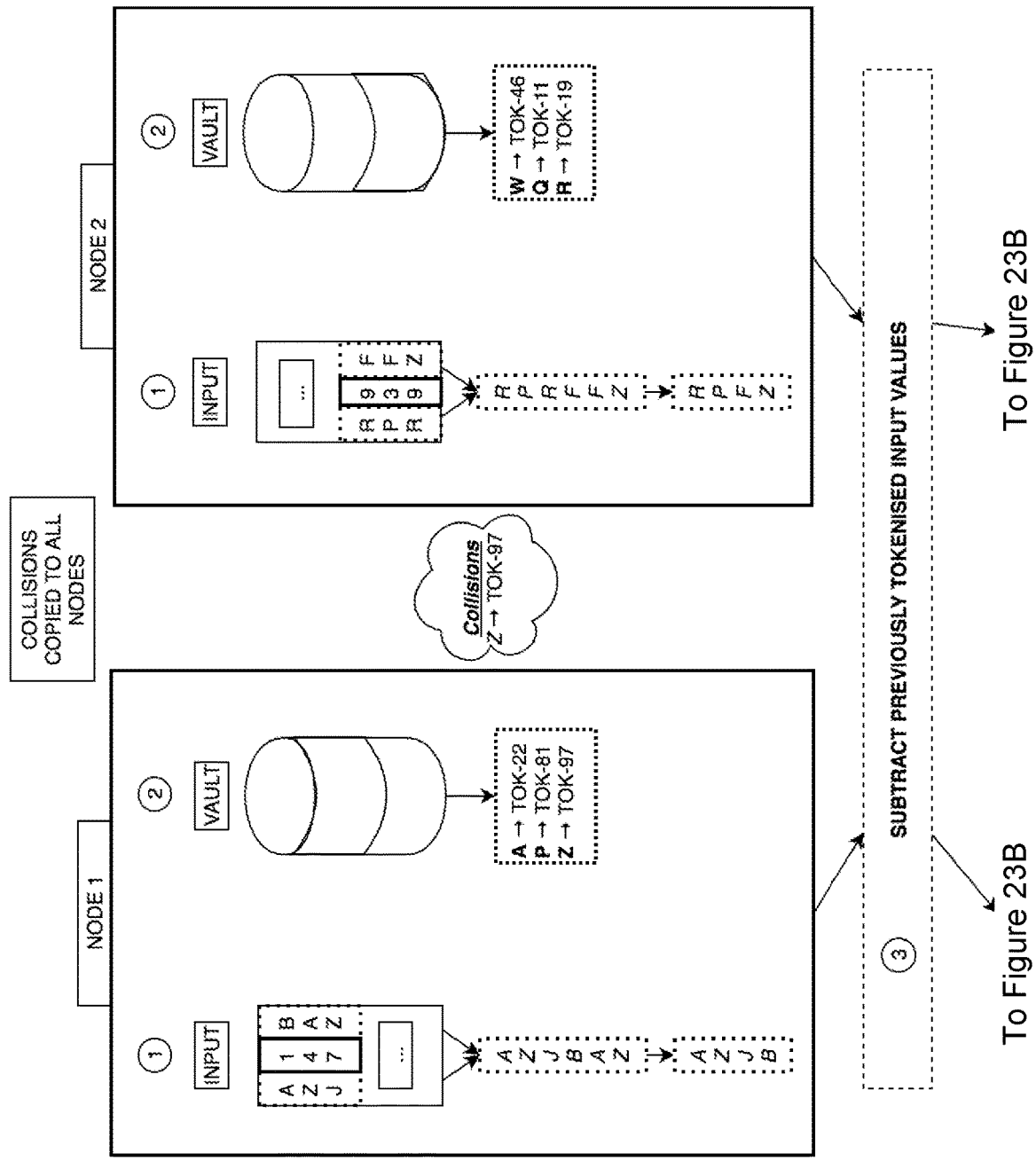
FIG. 23A shows a diagram illustration the token Generation phase adapted to use derived tokenisation.
Figure 23B:
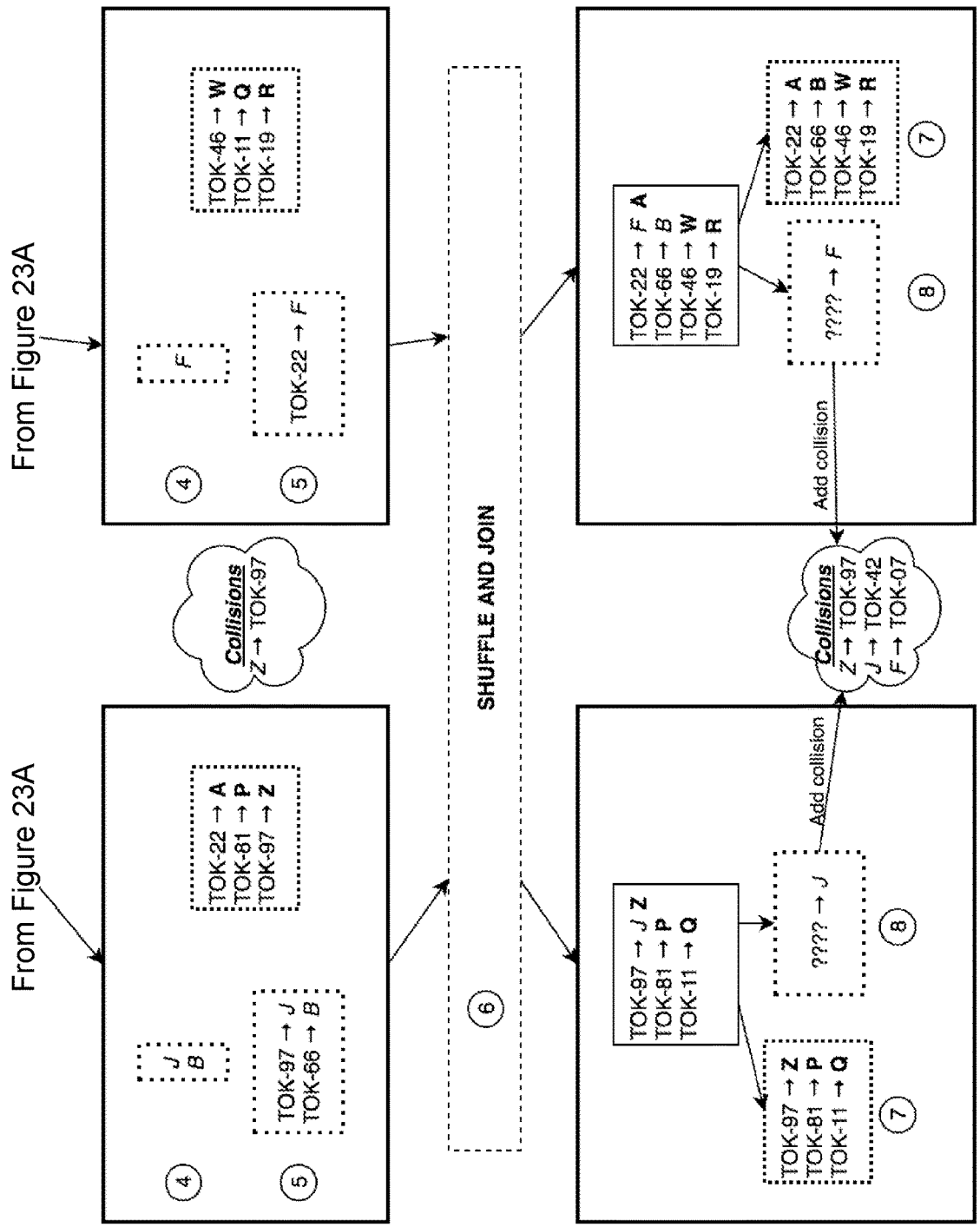
FIG. 23B shows a diagram illustration the token Generation phase adapted to use derived tokenisation.

FIGS. 23A and 23B shows the Token Generation phase adapted to use derived tokenisation. Note that the collisions file, which is small, is copied to all nodes during processing. The top panel (steps 1-2) show that the collisions map is loaded along with the token vault. The middle panels (steps 3-6) happen exactly as before, with new mappings being proposed for tokens that need them. The bottom panel (steps 7-8) shows that when two values lead to the same token in the derivation process, one keeps the value and the other is added to a collisions file.

Figure 24:
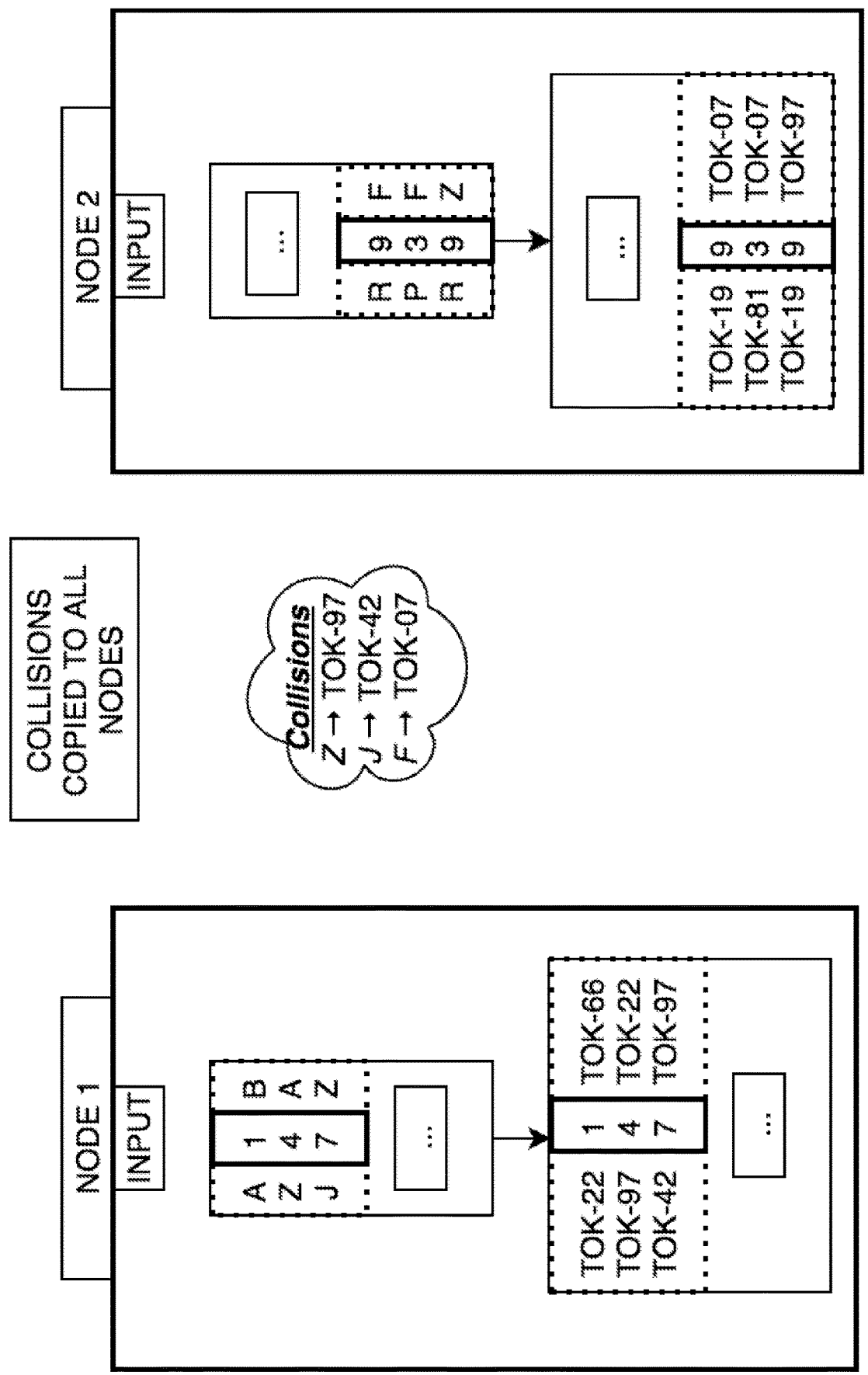
FIG. 24 shows a diagram with the collisions map workflow of the obfuscation phase.

The entire collisions map can then be sent to each node during the obfuscation process, which is now as simple as streaming through each value in the input file and either deriving the token to use using the ciphertext or else using the collision substitution value indicated in the collisions map. Each node can process its data independently, with no shuffling of data around the cluster necessary. FIG. 24 shows this simplified workflow.

4.3 Streaming Tokenisation

Many customers desire the anonymisation of data to happen in a continual streaming fashion—this is particularly important where data arrives in realtime and passes through an ETL pipeline before being stored in the customer's data lake. Masking and inconsistent tokenisation can be applied to incoming data in a streaming fashion since each datum can be processed independently. As seen, consistent tokenisation requires coordination of processing to ensure uniqueness of tokens. But using a token vault persistence strategy that supports concurrent random access with low latency also allows consistent tokenisation to be applied in a streaming fashion. Incoming values are read from the input queue and buffered into 'micro-batches'—the values within that batch are then tokenised together and transformed into anonymised outputs which are then added to the output queue. The size of the micro-batch can be configured both in terms of the number of elements within it and the maximum period of time that the system will wait for new input values before proceeding with the tokenisation of those received so far. This allows the system to be tuned to the required trade off between latency and throughput, allowing it to support both very high traffic use cases (where a larger batch size will allow maximum throughput to be achieved by efficiently batching tokenisation operations to minimise overhead) and use cases where low latency must be achieved (where a smaller batch size will minimise the amount of time that inputs sit in the queue waiting to be processed).

5. Data Privacy II: Generalisation

This section describes the generalisation functionalities of Publisher. Generalisation is the process of replacing values with less specific values. For categorical columns, less specific values means broader categories: for instance, "Smartphone" is less specific than "iPhone" or "Blackberry". For numerical columns, less specific values means wider intervals: for instance, "10-20" is less specific than "15-20", and "15-20" is less specific than "18". Publisher supports generalising certain columns.

Furthermore, Publisher supports automatically choosing the level of generalisation in order to satisfy certain privacy guarantees. It can automatically generalise to achieve k-anonymity, which is a defense against re-identification, and l-diversity, which is a defense against sensitive attribute disclosure (see definitions above).

This section is broken into three main parts: the configuration process, the data generalisation process, and the reporting functionalities in Publisher.

Background

A top-down specialization approach to generalising data was presented in Fung, Wang, and Yu's paper (Fung, Benjamin C M, Ke Wang, and Philip S. Yu. "Top-down specialization for information and privacy preservation." *Data Engineering, 2005. ICDE 2005. Proceedings. 21st International Conference on. IEEE,* 2005.) Publisher's approach to generalising data differs from this approach in a number of key ways, such as:

- Fung, Wang, and Yu's approach is for global recoding, whereas Publisher performs local recoding in its fully automated generalistaion (global recoding is available through declarative generalisation). Global recoding means that transformations are consistent across the dataset (e.g. 7 always becomes 5-10) while local recoding means that transformations can differ (e.g. 7 can become 6-8 in one row and 5-10 in another row). Local recoding usually allows the achievement of k-anonymity with less distortion.
- Publisher is intended to handle large datasets and has several performance optimization features not discussed in the Fung, Wang, and Yu paper.
- Publisher has more flexibility than the Fung, Wang, and Yu approach, whose applicability is limited to data that fits certain properties.
- Publisher incorporates defenses against sensitive attribute disclosure, such as l-diversity, which the Fung, Wang, and Yu approach does not.

Several terms will be used throughout this description. They are defined in the following table:

| | |
|---|---|
| Quasi-identifier or "quasi" | A quasi-identifying field in the input data. A quasi identifier is not a unique identifier (such as a passport number). It is, rather, an attribute that may be shared but is nonetheless identifying. For example, date of birth and postcode are quasi identifiers. More than 99% of people in the UK are uniquely identifiable by date of birth and postcode. |
| K | The minimum anonymity set size, where the anonymity set is the set of records that have a certain combination of quasi-identifier values. No combination of quasi-identifiers can be shared by fewer than K output records. |
| Anonymity set or "cluster" | A set of records that share the same quasi-identifier values. For instance, if the quasi-identifying columns are age and hair color, the set of records with age = 37 and hair = red will constitute one anonymity set. When generalisation happens, the anonymity sets of a dataset become larger. |
| Sensitive column | A column that contains secret information, such as income or test result. In Publisher, sensitive columns are distinct from quasi-identifying columns. |
| L-diversity | Setting L-diversity enforces a minimum number of distinct sensitive values in each anonymity set. If a field is not marked sensitive, then all the records in an output cluster may share the same value. (Machanavjjhala, Ashwin, et al. "l-diversity: Privacy beyond k-anonymity." *ACM Transactions on Knowledge Discovery from Data (TKDD)* 1.1 (2007): 3) |
| C-ratio | When using L-diversity, the C-ratio enforces the minimum acceptable distribution of sensitive values within an output cluster. A C-ratio of 10.0, for example, means that the L-1 most common sensitive values besides the most common sensitive value must have a combined count greater than 10% of the size of the largest sensitive value count in that cluster. |
| Priority column | Also referred to as an 'interesting column'. Splitting decisions are made with respect to interesting columns in order to distort relationships with the priority column (or columns) as little as possible. Note that quasi-identifiers can also be priority columns. |
| Info gain | The measure (with respect to the priority columns) used to decide which quasi-identifier to specialize (or "split") next. |
| Category | A generalisation of quasi-identifier values (e.g. a range of values like 5-10). |

5.1 Configuration Process

Publisher's dashboard web page allows users to enter configuration parameters about each dataset and column that relate to how that dataset or column should be generalised. The main parameters are as follows. Publisher takes a user-determined value of "k" for each table and "l" for each sensitive column. It also takes configuration information about which columns to generalise (i.e. which columns are quasi-identifying) and how to perform the generalisation. Last, it takes in a set of "interesting" columns whose relationships with other columns should be preserved.

Publisher contains features to help the users set these parameters in the correct way. The parameters are used by the generalisation processing phase and reporting phase, discussed later.

5.1.1 Configuring Numerical Column Generalisation

In Publisher, each quasi-identifying column has associated configuration parameters pertaining to the strategy of generalisation. For numeric columns the user can configure the maximum resolution the system should try to achieve (e.g. multiples of 1000 for a variable like income). Publisher will then generalise numbers to intervals of width greater than or equal to the maximum resolution. Publisher implements this by rounding the bounds of the intervals to the nearest multiple of the maximum resolution. The maximum resolution number is also referred to as the "alignment" because the bounds of the interval are "aligned" to multiples of it.

Alternatively the user can specify arbitrary intervals for the resolution (for example generalising age into standard marketing categories). Publisher will then generalise numbers to these intervals or combinations of these intervals. For instance if the intervals were 18-24, 25-35, and 36-100, Publisher might generalise 19 to 18-14 or 18-35.

5.1.2 Configuring Date Generalisation

For date columns there are three options available. By default dates are treated as numeric fields. Generalising dates as numerics produces lower distortion but may end up with dates that don't align with standard date periods such as internal accounting periods. Alternatively dates can be generalised using a hierarchy. Publisher provides a default hierarchy (decades→years→months→days), but alternatively the user can specify a custom hierarchy. This could include quarters as an additional level, or have year boundaries set to financial years instead of calendar years.

5.1.3 Configuring Categorical Column Generalisation

Categorical columns are generalised according to a hierarchy of related terms. A hierarchy is a tree structure with the actual raw values in the column in the leaf nodes of the tree. The nodes above the leaf nodes contain "category" values whose semantic meaning encompasses the child values. For instance a node with value "tree" might have child nodes "deciduous tree" and "evergreen". By default, the system generates a flat hierarchy of common terms in the data and an "other" category for uncommon values, where "common" is defined as appearing more than "k" times in the dataset.

Alternatively, the user can specify their own hierarchies, as discussed below.

User specification of hierarchies of categorical variables, and use of these for anonymisation:

The user can upload custom hierarchies defined in JSON or CSV format. The hierarchy needs to specify how the original values in the categorical column can be summarised into more general categories. The generalisation hierarchy needs to be an acyclic graph and define a strict hierarchy of categories. The leaf nodes need to be unique and can not have more than one parent node.

In the pre-defined hierarchy, a set of children is defined for each class label, starting with the broadest category comprising all sub-specifications and ending with the leaf nodes which correspond to the original values found in the input data table.

Figure 25:
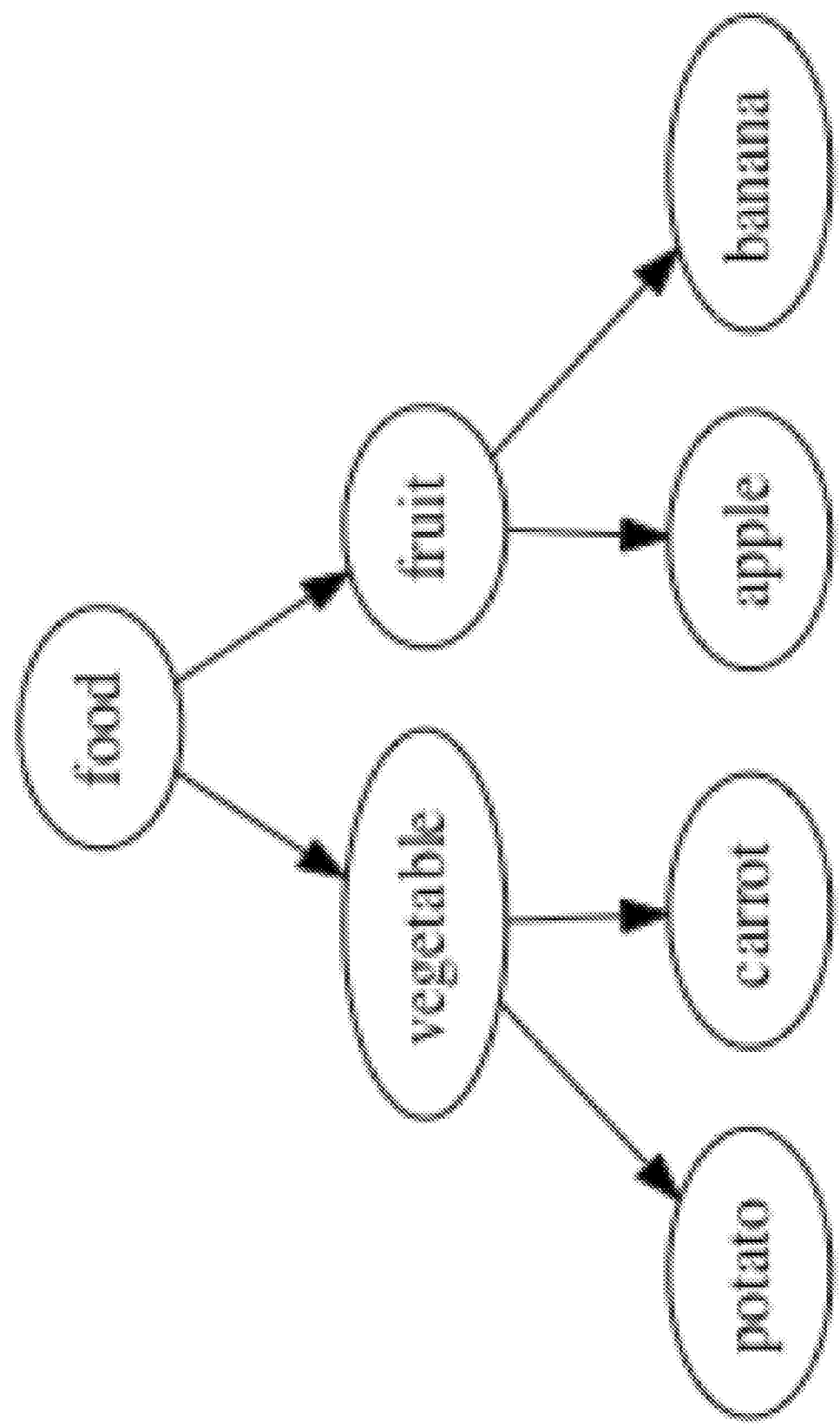
FIG. 25 shows a diagram with an example of food hierarchy.

FIG. 25 shows a diagram with an example of food hierarchy. This custom food hierarchy can be described in readable form in JSon format as follows:

```
{
    "value": "food",
    "children":[
        {"value": "vegetable", "children":[
            {"value": "carrot", "children":[ ]},
            {"value": "potato", "children":[ ]}
        ]},
        {"value": "fruit","children":[
            {"value": "apple", "children":[ ]},
            {"value": "banana", "children":[ ]}
        ]}
    ]
}
```

Leaf nodes in the hierarchy can partially match text in a column by using regular expressions. For instance, a leaf value might say "0213[0-9]", which is the logical equivalent of having ten leaf nodes with "02130", . . . , "02139" in its place. This is a significant usability aide as it allows a hierarchy to handle high cardinality columns without requiring the user to manually add all possible values as leaves. If two leaves both partially match a value then the most specific regex takes precedence, where a "more specific" regex is a regex that matches a smaller number of strings.

5.1.4 Catchall

A preprocessing step checks whether each value in the column matches a leaf node in the hierarchy. If no match is found, the value is replaced with a "catch-all" value. For instance, if a hierarchy contained only the leaf values "Brown", "Blue", and "Green", for eye color, and the value "Grey" was found in the input data, it would be replaced with the catchall value. The catchall value takes the form of a fixed string, such as "CATCHALL" The catchall value can then be used in the hierarchy and then catchall values will be handled in the normal way for the rest of the generalisation process.

This is a useful feature in cases where the user doesn't care much about rare values, and does not want to explicitly put each possible one in his or her hierarchy.

5.1.5 Derived Columns

Where one column is derived from another (e.g. date of birth and age) only one column needs to be generalised, the other can be recomputed from the generalised column. This recomputation approach allows Publisher to minimise the number of quasi-identifiers the algorithm needs to consider, and avoids the danger that the same information will be generalised in two different ways, leading to a composition attack.

The pre-analysis phase will determine which columns are highly correlated with each other, determined as having correlation above a certain threshold. Publisher then uses this information about highly correlated columns to guess that the columns might be derived. In the policy setup screen, if the user selects one of a pair of highly correlated variables as a quasi-identifier to be generalised, Publisher will prompt the user to ask them whether the columns are indeed derived, and whether they would like Publisher to recompute the other column from the first column after generalisation. If the user selects yes, then they must input the way in which to recompute one column from another. This can be in the following formats:

A mathematical expression, such as "x*10".

A date-of-birth to age rule that is parametrized with the date to measure to.

A python function that accepts the value of one column as argument and returns the value of another column.

Date columns will be converted to a numeric, seconds since the epoch representation for this purpose.

Publisher drops the column to be recomputed, and after the other column has been generalised, it runs a map job that recreates the column using the expression, rule, or function selected by the user.

Users can also set up derived relationships without being prompted from the Policy setup screen.

5.2 Generalisation Process

Publisher executes the generalisation by transforming certain columns in a table of data. The way that columns are transformed is discussed in this section.

5.2.1 Manual Generalisation

Publisher has a manual generalisation and an automatic generalisation mode. In manual generalisation, the user configures exactly how to generalise each column.

Publisher can generalise numerical columns into either fixed width bins of a user-specified width, or custom user specified bins. For example, an age column could be generalised to five year equal width bins (0-4, 5-9, 10-14 etc), or custom bins as specified by the user (0-18, 19-25, 26-40).

Publisher can generalise nominal columns by supplying a generalisation hierarchy and instructing the system to generalise to a level (measured in distance from the root node) within the hierarchy.

Optionally, the user can then indicate a number of columns to be quasis, and choose k. Publisher will then perform the generalisation, partition the records based on their combination of values in each quasi column (i.e. split them up into their anonymity sets), and then drop records from any partition that has fewer than k records. For instance, if there is only one quasi, "Age", and the user manually generalised the age column into intervals of width 10, and there are less than k records that have the generalised age value of 80-90, then Publisher will drop these records. This yields an output dataset that is k-anonymous for the configured k.

5.2.2 Automatic Generalisation

In automatic generalisation, the user configures k, 1, and the strategy for generalising each column, and Publisher automatically determines how much the columns need to be generalised to achieve k-anonymity and (optionally) l-diversity.

In Publisher, automatic generalisation is implemented as a 'top-down' algorithm, meaning that every quasi-identifying attribute starts as fully generalised, and then gets repeatedly specialized (made more specific). Fully generalised means the most general possible—for numerical columns, this is the full range of the variable (e.g. "0-100") while for categorical columns, this is the root node of the generalisation hierarchy.

The algorithm uses a tree data structure that it constructs over the course of the algorithm. Each node in the tree contains (1) a set of dataset rows and (2) a value for each of the quasi-identifier columns. The algorithm proceeds as follows:

Start with an initial node containing all the dataset rows. In this node, all the quasi identifiers have the fully generalised values.

'Split' the node into child nodes by each of the quasi identifiers (i.e. specialise the value in the node for that quasi-identifier, leading to a set of more specialised values; create a for each specialised value an associated child node whose quasi-identifier values are copies of the parent node except for the split quasi-identifier value, which is replaced with the more specialised value; and assign each row from the parent into the child node whose quasi-identifier values are consistent with the row's quasi-identifier values), to produce sets of candidate children Evaluate each candidate set of child nodes to determine:
whether the child nodes are 'valid', meaning they each meet the configured K and L-diversity thresholds.
the 'info gain' with respect to the configured 'interesting' columns.

Select the set of valid child nodes with the highest info-gain and add them to the tree.

Repeat the process on each child node until it is not possible to split further without violating k or L.

5.2.3 Infogain

Infogain is a function of a parent node and a set of potential child nodes. It examines the class counts in the column marked as "interesting" (see more on this below). For instance, if the interesting column is whether or not the debtor defaulted on their loan, there will be two classes, "Yes" and "No", and the counts of these can be gathered for any set of records. Infogain is defined as follows:
Let S be the class counts of the parent
Let T be the set of children; let each child have a proportion of records and class counts
Let H be the entropy function
Infogain(S, T)=H(S)−sum_{t in T} proportion(t) H(t)
And the entropy function is defined as:
H(S)=sum_{x in S} proportion(x) log_2 (1/proportion(x))

Intuitively, the entropy function measures how "unbalanced" a set of class counts is. The counts (Yes=49, No=51) will have low entropy, while (Yes=4, No=96) will have high entropy. Infogain, then, is the measure of how much more unbalanced the children are than the parent. This is a valid aim because we are trying to detect quasis that have a strong relationship to the interesting column—and if they do, then splitting records by the quasi will lead to a set of children that have more unbalanced class counts.

5.2.4 Splitting Options

A hierarchical category always splits into its child node categories (in the example above, the root category will always be split into a 'Vegetable' category and a 'Fruit' category). Note that the number of records that fall in each child category can therefore be unbalanced (e.g. there may be 80 'Potato' or 'Carrot' records but only 20 'Apple' or 'Orange' records).

For numeric categories there are two possible splitting strategies, median splitting and midpoint splitting. The user selects which strategy to use.

Midpoint splitting: This splits a numeric category (i.e. an interval) at its midpoint.

Median splitting: This splitting strategy, in splitting a quasi-identifier category, finds the median of the values of the records in the node and uses this median, aligned to the nearest alignment boundary, as the split point for the category. Note that the nearest alignment boundary is the nearest one that lies between the parent bounds; as the parent interval approaches the size of the alignment interval this may cause the split point to move away from the actual median. For example, in the case that the parent interval is [0 . . . 10), alignment is 5 and the median is 1, the split point will be at 5, producing child intervals of [0 . . . 5) and [5 . . . 10).

Note also that median splitting requires an additional pass over the data for each quasi in order to determine the median value in the node's records.

5.2.5 Dynamic Split Factor

If splitting a node by a continuous variable, Publisher can take the node's dataset rows' range for that variable and split it into N subintervals with approximately equal population (e.g. if N=2, it uses the median as the new boundary). By default, N is set to 2. The choice of N is important—too low, and many rounds of splitting are required; too high, and it risks a stopping condition being triggered when more splitting could have been done.

Publisher supports splitting a continuous variable into a dynamic number of subintervals, where the user configures a maximum number of children M, and Publisher calculates the number of children based on the equation:

$$N = n/(2^{q-1} * k)$$

Where n is the number of records in the cluster, q is the number of quasi-identifying attributes, and k is the k-anonymity parameter.

N is then rounded down to the nearest integer. If N is greater than M, M is used, and if it's less than 2, 2 is used (one cannot split into fewer than 2 children).

By accounting for the number of quasi-identifiers q, this method ensures that a split on one variable will not use up all of the potential for more splitting on other quasi-identifying variables. The equation can be explained as follows: splitting a node into (n/k) children will lead to children of size k, which can then no longer be split because a further split would violate k-anonymity. Splitting a node into (n/2k) children will lead to children of size 2k, which can then be split once more before violating k-anonymity. Splitting a node into $n/(2^{q-1}*k)$ children results in children that can be split q−1 times more. Thus this split factor ensures that there is a chance to split on every quasi at least once.

5.2.6 Look-Ahead Infogain Calculation

By default the system will calculate the info gain for one candidate split at a time, picking the candidate split with the highest info gain. At a cost of additional processing time, the system can calculate the sum infogain for multiple stages of candidate splits (for instance, two stages would mean every possible split and every possible split after that) and choose the next split based on which leads to the path with the highest sum info gain.

5.3 Scalability Features 5.3.1 General Distributed Computing Approach

The top-down specialization process can be implemented on the Spark platform. The tree structure is maintained and manipulated in the Spark driver, and the lists of rows in the nodes are Spark Resilient Distributed Datasets (RDDs).

In order to make a decision on how to split a node, metadata on the children of each possible split must be collected. The following metadata is collected for each possible set of child nodes:

- the number of records each child node would contain
- sensitive class counts for each child node (used to calculate L-diversity, if L-diversity is enabled)
- interesting class counts of interesting/priority column values (used to calculate info gain)

Publisher collects this information by running an aggregate job over the RDD of rows in the parent node.

Note that class counts only make sense for sensitive or interesting columns that are categorical. If the interesting column is numeric, then Publisher uses a discretization process to convert each value in that column into a categorical value in order to gather the class counts. For instance, if the numeric variable ranges from 0 to 100, then Publisher may discretize it into bins of 10, and count the number of values that fall into each bin.

The way that Publisher handles numerical sensitive columns is discussed later.

5.3.2 Splitting Out onto Nodes after a Certain Point—when the Workload Fits into a Certain Memory Size As mentioned above, there are various operations which require a pass through the entire data in order to evaluate category splits (such as calculating the median and collecting metadata). These operations are performed for each node that is split. As splitting progresses, each node represents a smaller and smaller fraction of the dataset, but a pass over the full dataset is still required in order to filter out the records that belong in the node.

When top-down K starts, the entire dataset is processed for each node split. That is, the operations are performed on the RDD and each node split involves one or more passes through the data. Even when the entire dataset fits in the cluster memory, this can take a long time when the depth of the specialisation tree grows. For example, if each node split takes 1/10th of the second, K=10, and the number of rows in the dataset is 10 million, then, assuming we are performing binary splits and we reach K=10, we will have to evaluate (10 million/10)*2 nodes; which equates to roughly 55 hours run time. If the data does not fit in memory, the time taken to evaluate each node increases dramatically, since each pass of the data requires that it be read in from HDFS.

In order to avoid the first problem of the cumulative cost of so many node evaluations we do the following: perform distributed splitting of nodes, as above, until we calculate that the data for a node would fit in the memory of a single executor. At that point in the algorithm, we stop splitting the node and continue splitting those nodes that are still too big until each of the leaf nodes would fit in the memory of a single executor. Once each node would fit, we assign each leaf node in the tree an ID and repartition the dataset into as many partitions as there are leaf nodes, assigning rows to partitions based on the ID of the node leaf node that contains them.

After repartitioning, the data for each node has been moved to its own partition, so we can now run exactly the same top-down specialisation 'locally'—that is, the top-down operations can proceed on the data locally in one of the executors, with all the data for the partition held in local memory. This is much faster than the distributed splitting. The amount of distributed splitting required to reach the 'repartition point' depends on the size of the input data and the number of partitions.

Figure 26:
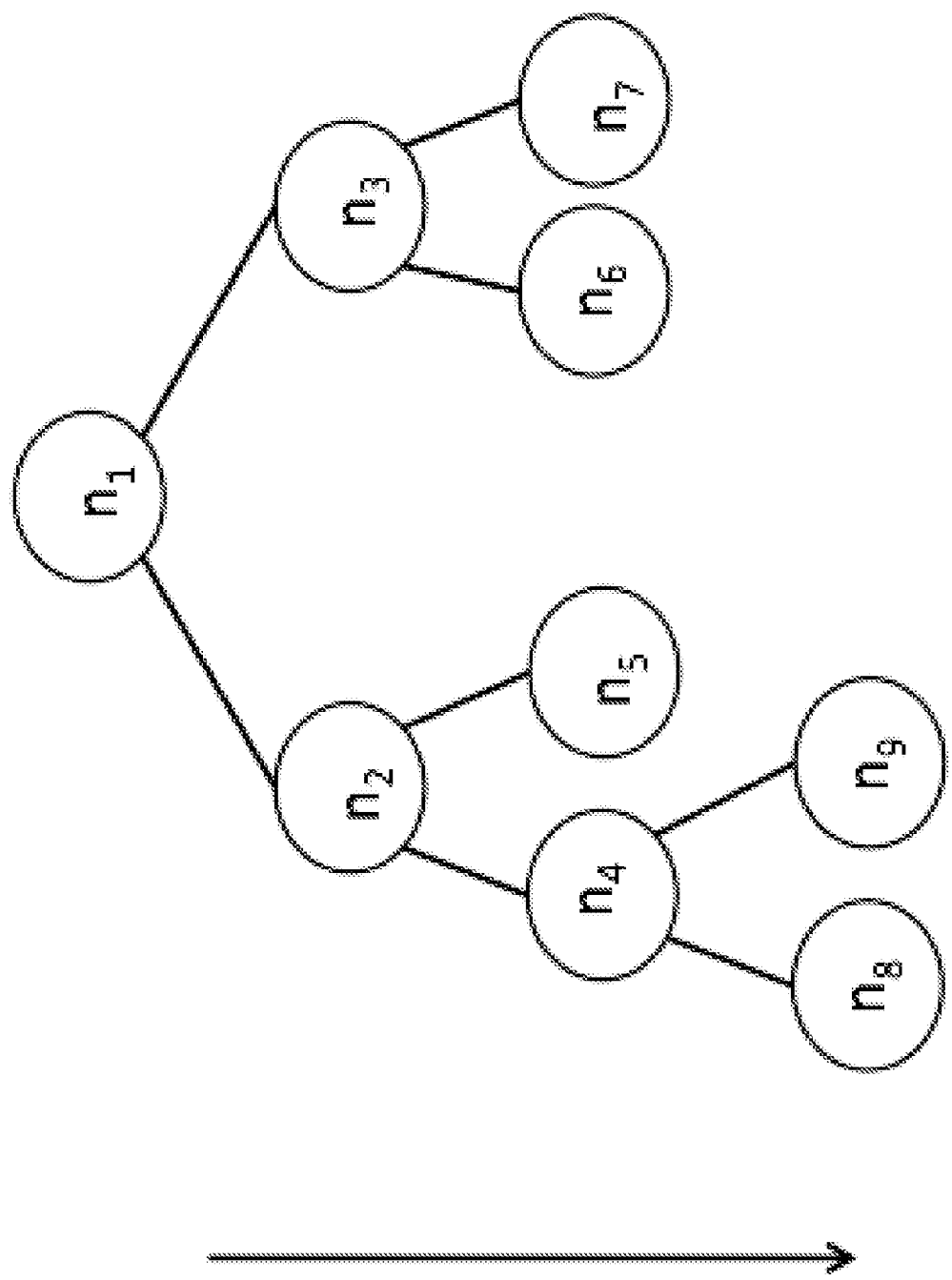
FIG. 26 shows a diagram illustrating the top down generalisation approach.

FIG. 26 shows an example with a diagram illustrating the top down decision tree approach. A tree structure of nodes is built wherein each node may hold a list of rows and a value for each quasi-identifying column. The first node ($n_1$) at the top represents the data that is generalised the most and hence has the highest privacy level. As the dataset is split into smaller and smaller subset, the dataset becomes more specific and data utility is increased. In this example, the dataset holds two quasi identifiers: age and weight. The algorithm starts with the first node ($n_1$), which holds the whole dataset and the most general values for each of these two columns, for example [0-100] [0-400] for age and weight respectively. The algorithm then decides whether to split the data such that it becomes more specific about age or about weight. The splitting decision may be chosen according to a chosen attribute to split, such as by calculating the infogain or by looking at the preservation of the correlation matrix of the raw data. Following the first split, $n_2$ may then have the rows matching with the following values for age and weight: [0-50] [0-400] and $n_3$ may have the rows matching with the following values for age and weight [50-100] [0-400]. The process is repeated where at each step an attribute to split is chosen until the process is stopped because a further split would violate k-anonymity. Once no further splitting can occur, all the leaf nodes are taken ($n_8$, $n_9$, $n_5$, $n_6$, $n_7$) and in each leaf node each row is assigned the quasi-identifier values of the leaf node, and these rows are then published. At each of these nodes, the set of rows achieves or is greater than k. In addition, at each split, the memory requirement is calculated and once the set of rows within a node gets small enough that they would fit the memory of a single machine, the node is independently processed by a single machine.

5.3.3 Using Subsampling to Improve Performance

For datasets that do not fit in cluster memory, distributed splitting requires the entire dataset to be re-read from source for each node evaluation. Re-reading the entire dataset may take an hour or more for large datasets. Large datasets also have many partitions (in the 1000s), so more distributed splitting is required to reach the 'repartition point'. Evaluating 1000s of nodes, where each evaluation takes an hour or more is not a feasible approach. Therefore, if the dataset does not fit in cluster memory, we take a sub-sample of the data that does fit in memory and use that to calculate the splits to the 'repartition point'.

Note that there is a limitation to this approach: as the number of partitions we need to split to increases, the deeper the splitting of the sub-sample has to proceed to reach the 'repartition point'—the sub-sample (and hence cluster memory) must be large enough to support splitting to the required depth.

5.4 Interesting Columns

The user of Publisher may select a set of interesting (or priority) columns. The user can specify the set of columns in the dataset that will be especially meaningful for any post-processing or downstream analysis. All columns that are of interest, have a particular structure that should be preserved, or for which the resolution loss should be minimal can be selected as a priority column. For instance, if the data is going to be fed into a linear classifier, the target variable can be selected as interesting column because it is the attribute about which we want to detect meaningful patterns.

The automatic generalisation algorithm attempts to preserve as much of the relationship of the quasi columns with the interesting columns as possible. As the top-down splitting proceeds, each possible split into the child nodes is evaluated by the information gained through that split. The information gain is calculated based on values in the selected priority columns (see above for detailed description of information gain).

5.4.1 Numerical Interesting Columns

If the selected priority column is numeric, the values are sorted into bins and the information gain calculation is based on the resulting categories. The user can either choose a fixed number of bins such that the range of values is split into this number of bins with even size, or she can define a fixed numerical range for the each bin category. The numerical values in the interesting columns are sorted into the resulting, non-overlapping bins and treated as separate categories for the information gain calculation. If, for example, "age" is selected as interesting column and the age of a person is given in years, one might define a useful binning of this column into age categories from [0-15), [15-22), [22-35), [35-56), [56-71] and [71-100] or decide to split the variable into only three broader categories. If a fixed number of bins is chosen by the user Publisher will automatically divide the range of values into evenly sized bins.

5.4.2 Several Interesting Columns

If several columns are marked as interesting, Publisher will concatenate the values of all those columns for each row and treat the resulting value as the interesting value for this record. Each combination of values, for instance pairs of gender and eye colour, will be treated as a different label, i.e. (female; blue), (female; green), (male; blue) and (male; green).

5.4.3 No Interesting Columns

It is encouraged that the user selects at least one priority column. In case none is chosen by the user, the splitting strategy is to alternate splitting evenly among the quasi-identifying columns. Each round of splitting, a different column is selected to split on. This strategy aims to balance out the distortion introduced into each column.

Publisher implements the alternation by maintaining a global counter, i, starting at 0, and if there are Q quasi-identifiers, splitting the (i mod Q)-th quasi in each split, and then incrementing i after each split has been conducted. When the repartitioning optimization is used (see above), at the repartition point, the strategy is changed. Each new partition is assigned an evenly spaced "local counter" between 0 and (Q−1). For instance, if there are eight quasi-identifiers and four partitions, the partitions will have their local counters initialized at 0, 2, 4 and 6. Then, within the partition, the splitting and incrementing happens as above but using the local counter.

5.5 Partial Recombination of Nodes to Enable Resplitting

In some cases, checking the children for k and l and stopping if any child is invalid can cause problems.

Figure 27:
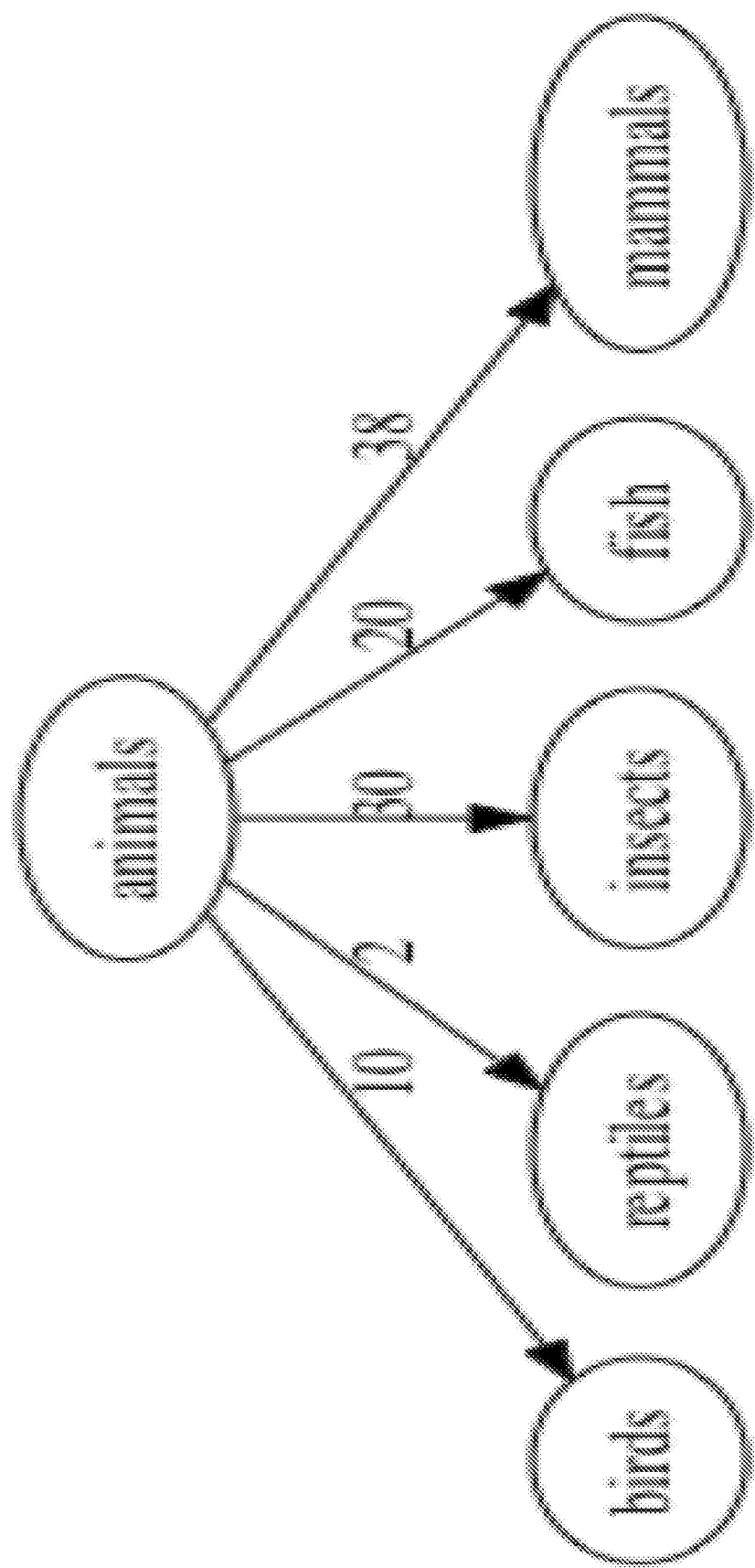
FIG. 27 shows a diagram with an example of 'animals' hierarchy.
Figure 28:
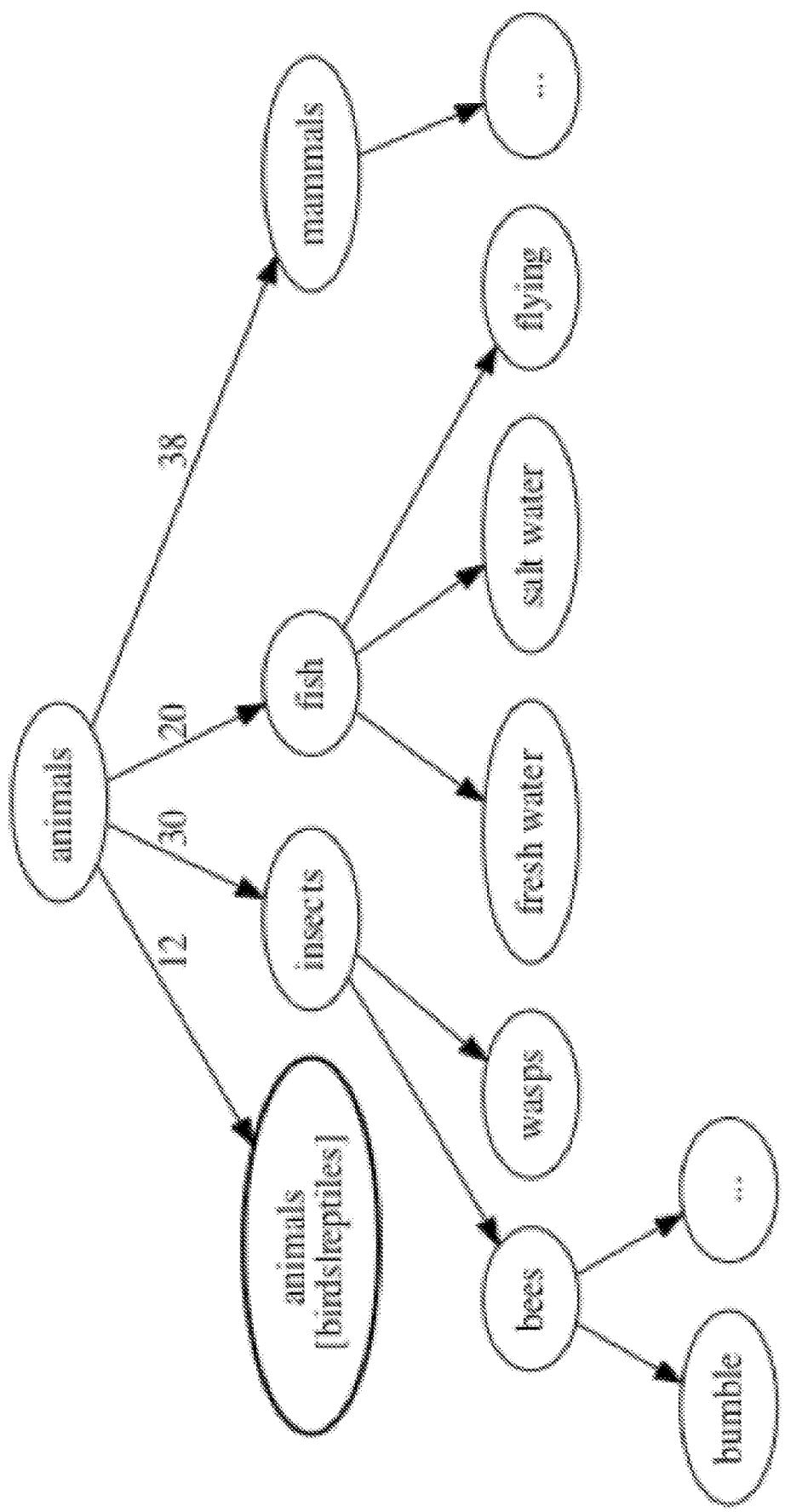
FIG. 28 shows a diagram with another example of 'animals' hierarchy.

FIG. 27 shows a diagram with an example of animals hierarchy, in which when splitting into sub-category, the data for one category is very sparse but there is plenty of data for other categories. In this example, k=5 and the category 'Animals' (which has 100 records) is split into five sub-categories. But one of the sub-categories, 'Reptiles', creates a node that only has two records. If we split into these five sub-categories we will create a node that violates K. However, there are plenty of records in other sub-categories that could potentially be split further. In order to avoid this, invalid child categories may be combined with other invalid categories and, if necessary, valid categories in order to form valid categories. These combined categories have the same value as the parent category (e.g. 'Animals' in this example) and cannot be split further. However, the sibling nodes can now be split further, allowing further specialisation. This is illustrated in FIG. 28. When this recombination is performed, the categories are combined smallest first in the case of hierarchical categories and with adjacent categories in the case of numeric categories (in order to form contiguous intervals).

5.6 Missing Values (and NULLs)

Many datasets have NULL values in entries that signify something different from a standard value. NULL values pose an interesting challenge for generalisation. They could potentially be identifying, for instance if there is a 'boss_id' field only the CEO will have a NULL value. However, they cannot be generalised with normal rules, because groups like "[40-50] or NULL" are hard for a user to make sense of.

Publisher takes an approach which minimizes the impact of NULLs. At each node, it notes whether the node contains NULLs or not (say in the variable N). If there are more than k NULLs in the node, it will split the NULLs into one child and the non-NULLs into the other child, marking N=true and N=false respectively. If there are fewer than k NULLs, then the non-NULLs are split normally and the NULLs are merged in with one of the children. This child is marked N=true and the rest are marked N=false. The process is then repeated for further splits.

The criterion for selecting which node to merge the NULLs is configurable, but may be the lowest population node.

This process ensures that only one final cluster (which should be a small fraction of the rows in the dataset) possesses values which can be NULL. Thus the output dataset is k-anonymous, but the potential to be NULL is encapsulated in a small number of output records and the dataset as a whole can be analysed more easily.

5.7 Guaranteeing L-Diversity

K-anonymity ensures that for any combination of quasi-identifiers that exists in the data, there are at least k records that share the same combination. These records form a cluster of size at least k. This characteristic of the anonymised output data mitigates the risk of re-identification through record linkage.

However, there remains a potential privacy vulnerability in k-anonymous data: for columns that contain sensitive information, such as a medical diagnosis, salaries, exposures or debts, there may not be sufficient diversity of values in an anonymity set. In the case where all records in a cluster with the same combination of quasi-identifiers also all share exactly the same sensitive value, a malicious attacker does not need to uniquely identify a data subject to learn the sensitive value of the target. If, for example, the attacker wants to infer the medical diagnosis of a man aged 65 and all records in the anonymised dataset that are over 60 are listed to have cancer it becomes clear that the target must have this diagnosis. Even if the adversary can not identify the exact record corresponding to the target, sensitive information has been leaked.

If l-diversity is applied, there must be at least l distinct sensitive value for each equivalence class in the output data. In Publisher l-diversity can be achieved for a set of selected sensitive columns. The data in the sensitive columns can be both categorical or numerical.

If l-diversity is enabled by the user, Publisher checks each potential set of child nodes for l-diversity, and will not conduct a split if it would lead to a non l-diverse node.

5.7.1 L-Diversity on Categorical Data

If the sensitive column chosen by the user contains categorical labels then each cluster in the output data will contain at least l distinct class labels. If during the top-down splitting algorithm the next specialisation step would violate this condition, even though k could still be achieved, the nodes will not be split further.

5.7.2 L-Diversity and Sensitive Attribute Disclosure Protection for Numerical Data If the sensitive column chosen by the user contains numerical data, either continuous or discrete, the values can be binned and coded as non-overlapping categories, for example describing salaries in the categories comprising ranges of [>20k], [20k-50k], [51k-100k], [>100k]. The user specifies the number of bins. Again, in the output data it is then ensured that at least L distinct, sensitive categories are represented in each group of records sharing the combination of quasi-identifiers.

Other range-based mechanisms to ensure sufficient diversity in sensitive, numerical columns are available in Publisher.

First, a minimum range of sensitive values in each cluster can be enforced. For instance, it can be required that the sensitive values in each anonymity set have a range of at least 5,000.

To account for highly skewed distributions, the range of values can be calculated based on the 10th and 90th percentile of the data values rather than the absolute range. This takes into account that outlier values in the sensitive attributes might leak sensitive information.

Another option provided calculates the minimum range required for a sensitive value in each cluster based on the cumulative distribution function (CDF) of the sensitive attribute. If a cluster contains sensitive values in the range (a,b) this range should cover a minimum range in units of the CDF, i.e. the range of sensitive value will be measured as ($CDF^{-1}(a)$, $CDF^{-1}(b)$) and must be above the minimum range.

The user can configure the minimum range for all of the above options and can as well choose a combination of criteria depending on what is most suitable for the attribute selected as sensitive.

In addition to the minimum set of distinct sensitive values l, a c-ratio can be configured in Publisher. With this setting the ratio of distinct values can be configured. If l-diversity is switched on, then in the output data the combined size of all l−1 categories but the largest must be larger than the size of the largest category divided by c. The c-ratio needs to be configured correctly to defend against inferential sensitive attribute disclosure.

As motivation for using a c-ratio, consider the following. Let us assume a sensitive column that contains a boolean variable, the "Yes" or "No" answer to the question whether the individual ever cheated on an exam. If the ratio of "Yes"s and "No"s in a cluster is very unbalanced, such as 99,999 "Yes"'s and 1 "No" in the same equivalence class for all men aged [21-35], even though l-diversity with l=2 is achieved, a malicious adversary still gains 99.99% confidence about the target's sensitive value.

5.8 Generalising Location Data 5.8.1 Generalisation of Location Areas

Generalising values such as postcodes and counties poses a unique challenge. While a region or territory is a categorical variable, using a hierarchy to govern the generalisation is both inconvenient and overly restrictive (sometimes it may be advantageous to combine territories A and B together and other times B and C, but hierarchies cannot support this flexibility).

Figure 29:
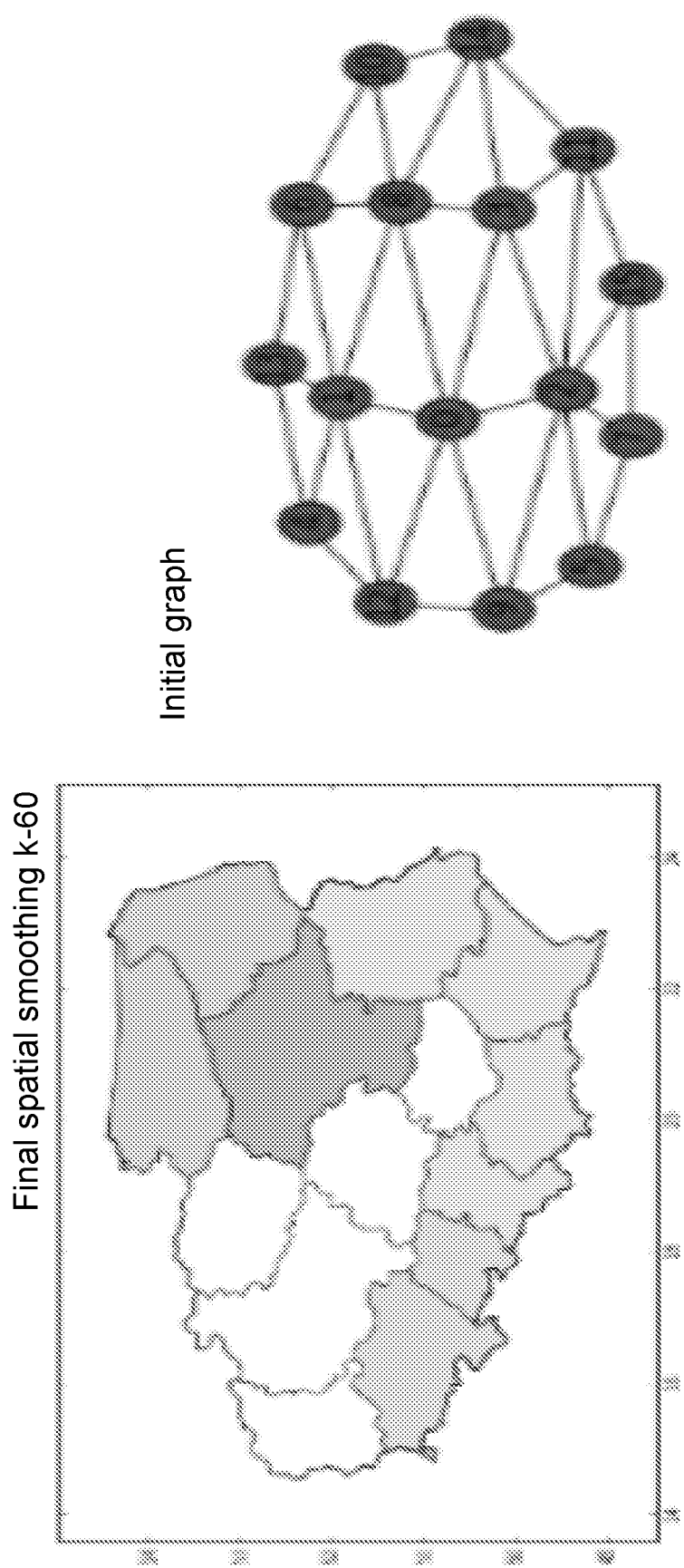
FIG. 29 shows a planar graph representation and a generalised territories map.

As illustrated in FIG. 29, Publisher has a location generalisation feature that allows automatic generalisation of location territories. First, there is a preprocessing step which analyses shapefiles (required as input) of maps and produces a planar graph where the nodes are the location territories and there are edges between nodes if the territories abut. These graphs can then be stored by Publisher for repeated use. Shapefiles of common territory maps (such as UK postcodes) are publicly available.

Second, in doing a split, Publisher looks for nodes in the planar graph that have less than k records, and merges each of those nodes with one of the neighbouring nodes (there are two modes: merge with the most populous neighbour and merge with the least populous neighbour). It repeats this process until all nodes satisfy k-anonymity.

The result is that small unions of neighbouring territories are created in order to satisfy k. A planar graph representation is displayed next to a generalised territories map in FIG. 29. The territories with the same shade may also further be merged.

This method faces a difficulty when there are territories that do not abut any other territories (such as islands). To solve this problem, Publisher's preprocessing feature makes 'bridges' between islands and their closest geographical neighbour.

5.8.2 Generalisation of Regions which are not Physically Adjacent but have Another Similarity When generalising across locations, it can be useful to consider other factors in addition to geographical adjacency. For example, if a very wealthy area is adjacent to a very poor area, it might be desirable not to combine these. In this case mean or median income is used for each node in the graph, and a similarity metric constructed between them. This is combined with distance, to create a new weighted distance and similarity metric, allowing regions to be combined according to both proximity and similarity. Many other similarity measures are possible according to the use case in the analysis, for example: character of the area (city centre, residential, rural), presence of notable places (eg places of worship, transport facilities, workplaces, hospitals, schools and universities), political majority, density of residents of a certain attribute. These measures may be combined in various ways—for example to preferentially merge regions which are distant and similar, adjacent and similar, or adjacent and dissimilar. Sometimes it is desirable to combine regions which are dissimilar in order to achieve diversity of features within a combined region, and hence protect privacy by providing deniability.

5.8.3 Defending Against Sensitive Attribute Disclosure in Location Generalisation Publisher supports automatically generalising locations to ensure that they will not disclose any sensitive attributes. To make this assurance, Publisher takes a user-provided list of locations of interest, also known as points of interest (POIs). POIs may be hospitals, stores, office buildings, restaurants, bars, cafes, schools, museums, sports facilities, and so on. Publisher can ensure that every generalised location area contains a minimum number of POIs. Because this guarantee is similar to l-diversity, we call this minimum number "l". For instance, if "l=4", then an adversary could not tell from the published dataset which location out of at least 4 any target went to. They might know that you were near Waterloo station, but they will not know whether you visited the cafe, cake shop, pub, or gay bar.

This guarantee is enforced as another stopping condition in the automatic generalisation process. Each prospective child area is examined to see how many POIs lie within that area.

5.9 Bounding Execution Time or Stopping Early

The algorithm starts with quasi identifiers at the most generalised level and progressively specialises them. As a result it is possible to stop the algorithm early and output data that is more private but with lower resolution. This allows the user to bound the execution time.

The user can send a stop signal to the system while it is processing, cancelling any in progress calculations related to the next specialisation and moving onto the output phase. To make it easy for the user to decide if they should stop early the system can report the current average cluster size at the current specialisation reached by the algorithm.

5.10 Streaming or Micro-Batch Data

Publisher normally works as a batch process, but can similarly guarantee k-anonymity and l-diversity on streaming or batch or micro-batch data. Micro-batch data is an approximation of streaming data where a program processes the newly arrived data very frequently, e.g. every 15 seconds. In this workflow, Publisher accepts data through a data stream and holds the data internally to process it before publishing it to an output stream.

They key difference in handling streaming or micro-batch data is that not all of the data values are known at the point in time when each data value must be generalised. Hence, there is a potential benefit of holding records for longer, which allows gathering more knowledge and better generalisation.

Publisher supports a configurable "latency-utility" parameter which governs how long the program waits before publishing records (in time). When a record has been held for this amount of time, the algorithm works as follows:

1. Find the k−1 other records that form the best cluster among the records being held by Publisher. Best is defined as lowest total distortion. The best cluster can be identified by trying all combinations of k−1 other records. Alternatively, the approximate best cluster can be identified through a greedy algorithm which does the following: start with a cluster of size 1 consisting of the record whose time is up; add the record to the cluster that results in the new cluster with the lowest total distortion; continue adding records in this way until a cluster of size k is reached.
2. Measure whether this cluster of records would help the overall generalisation. To measure this, compare the total distortion that each of the records would have in the new cluster versus being split out optimally among the existing clusters.
3. If the creation of the new cluster would help, generalise and publish the k rows.

Otherwise, find the best existing cluster for the record whose time is up, generalise it accordingly, and publish this record only.

For information about how distortion is measured, see the section below.

This process can be implemented on a streaming or micro-batch platforms such as Spark Streaming.

5.11 Reporting Results to the User

Publisher's automatic generalisation outputs an anonymised copy of the data where it is guaranteed that k-anonymity is achieved. Alongside performance metrics, such as time taken to generalise the data or the number of bad rows detected, Publisher presents a variety of data distortion measures after a successfully finished Job run.

5.11.1 Distortion Measures

FIG. 30 shows a table displayed by Publisher which contains the rule and distortion corresponding to a specific data column.

Publisher calculates the following measures of data distortion:

Mean absolute error on generalised numeric columns.
Information loss on generalised numeric columns as one minus Pearson's correlation between the raw input and generalised output column.
Information loss on generalised categorical columns as the average "generalisation height" across data values. Generalisation height is the number of levels up the hierarchy that the value ended up, normalized by the total distance between the leaf node and the root node. For instance, if a value "January" has a parent "Winter" which has a parent "Any", the root node, and it is generalised to "Winter", then this is a 50% generalisation height.

Both information loss measures are bounded between 0 and 1 and are presented to the user as percentages.

5.11.2 Distortion Histogram

The automatic generalisation algorithm transforms columns through binning and hierarchical generalisation. Publisher provides a tool to visually evaluate the changes introduced by the anonymisation. For numerical columns a histogram of the anonymised and raw quasi-identifying attributes is shown. The two distributions are overlaid such that they can be easily compared by the user.

However, the raw data needs to be protected from statistical disclosure at all points of processing. Thus, the displayed histograms are guaranteed to be k-anonymous. Publisher guarantees this by applying a k-anonymity guarantee on the histogram of original values: any bin with less than k members is suppressed.

Figure 31A:
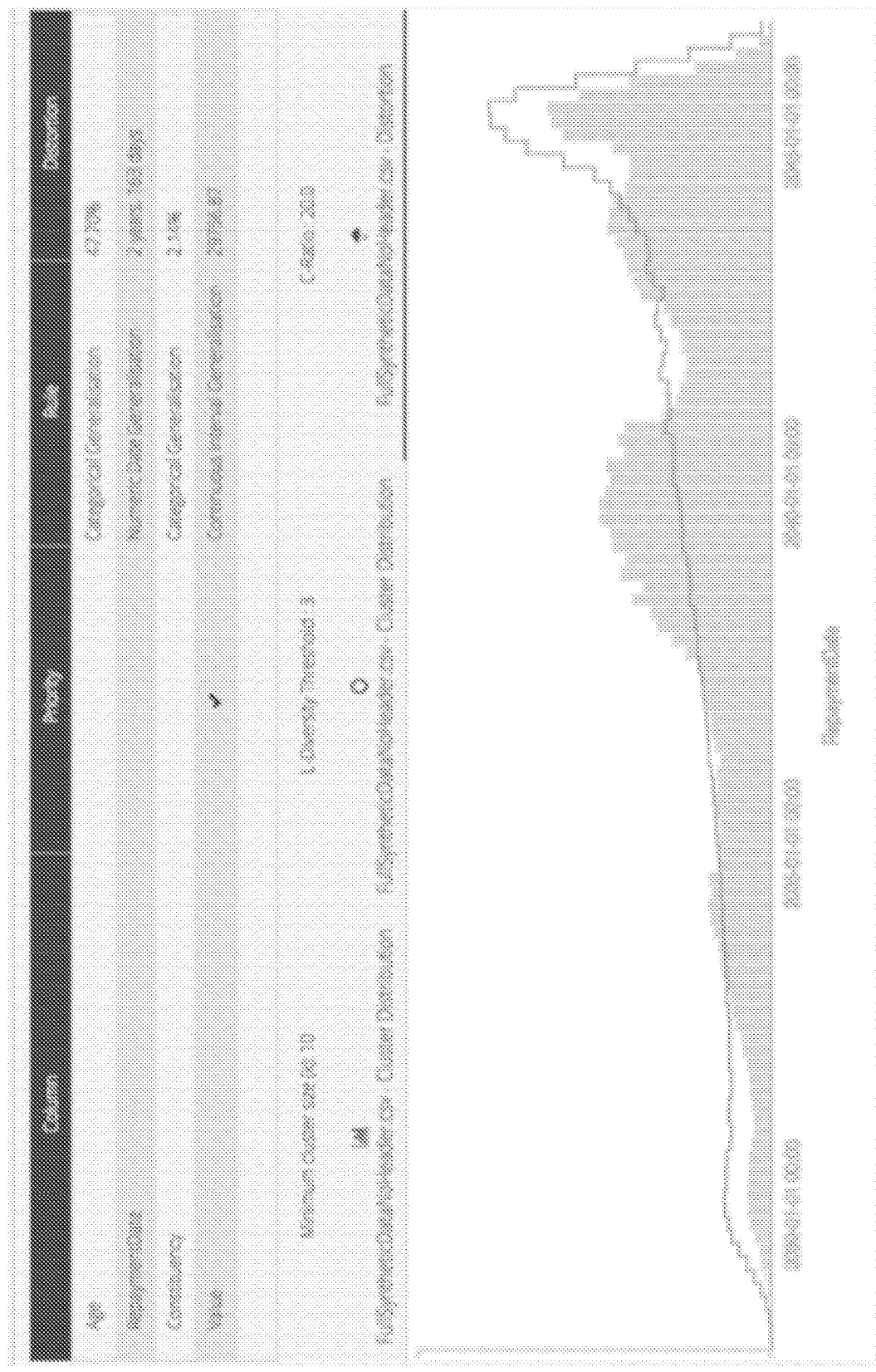
FIG. 31A shows a screenshot of Publisher in which distortion histograms are displayed.
Figure 31:
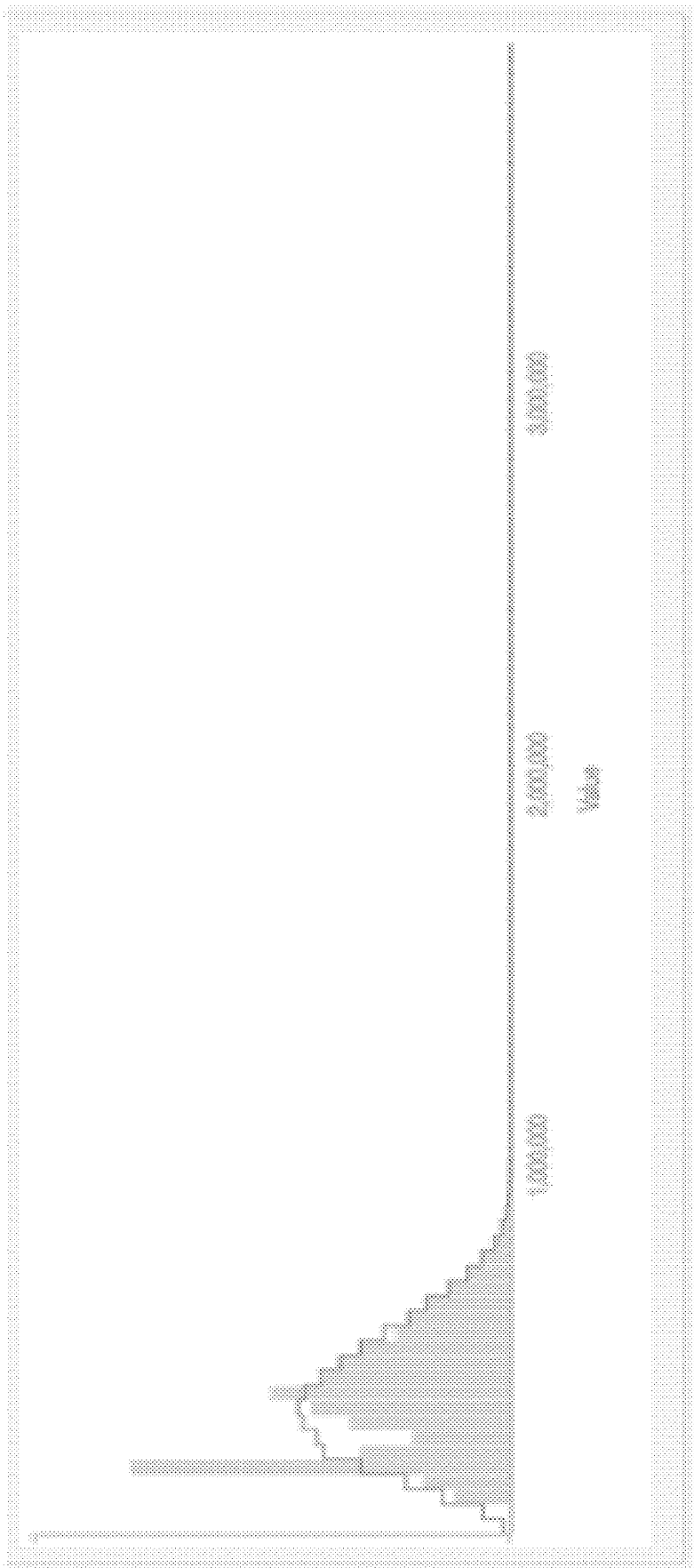
FIG. 31B shows a screenshot of Publisher in which distortion histograms are displayed.

FIGS. 31A and 31B show the results displayed by Publisher in which the distributions are overlaid on top of each other and wherein the original data histogram is shown as a line and the generalised output histogram is shown as grey bins.

5.11.3 Cluster Size Histogram

Automatic generalisation of the quasi-identifiers results in clusters of records with size no smaller than k. The mean, median and distribution of cluster sizes depends on the quality of the data. If input data is sparsely distributed many records need to be grouped together in large cluster with very general values in the quasi-identifying columns. Large cluster sizes provide a better privacy protection for the data subject but at the same time often coincide with a higher distortion in the quasi-identifying attributes.

Figure 32:
FIG. 32 shows a screenshot of Publisher in which cluster size distribution is displayed.

Publisher tries to determine a clustering of records that provides a good trade-off between data utility and privacy. The user can adjust the privacy policy by configuration of the priority columns or the values of k and l in such a way that the resulting clusters are of the appropriate size. There is no clear metric for the "optimal" distribution of cluster sizes but the user can evaluate the results of the generalisation through the provided visualisation of cluster size distribution, as shown in FIG. 32. Clusters shown in lighter grey do not meet the minimum cluster size threshold.

5.11.4 Cluster Size Bubble Chart

Figure 33:
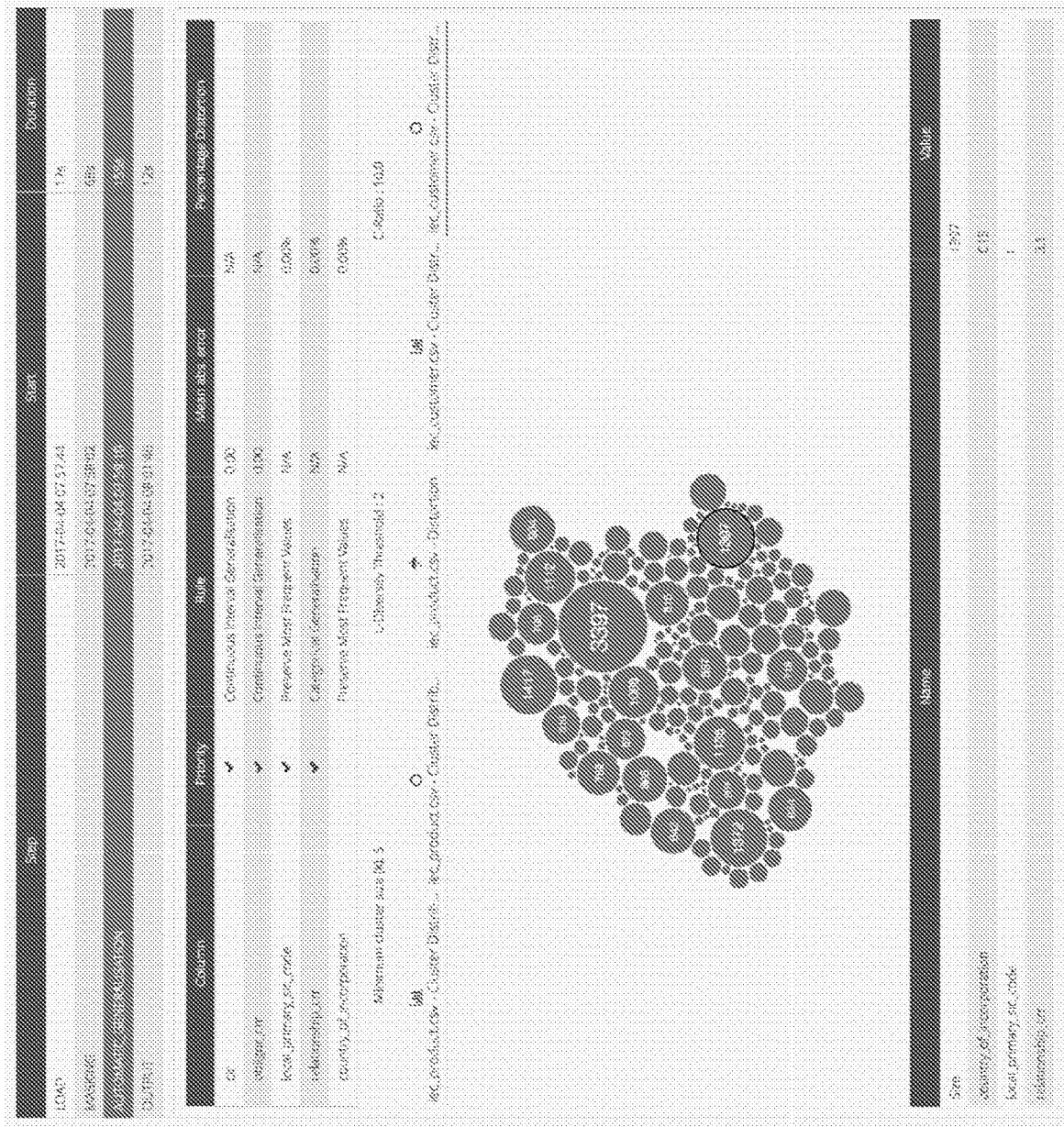
FIG. 33 shows an example of a cluster size bubble chart displayed to an end-user.
Figure 34:
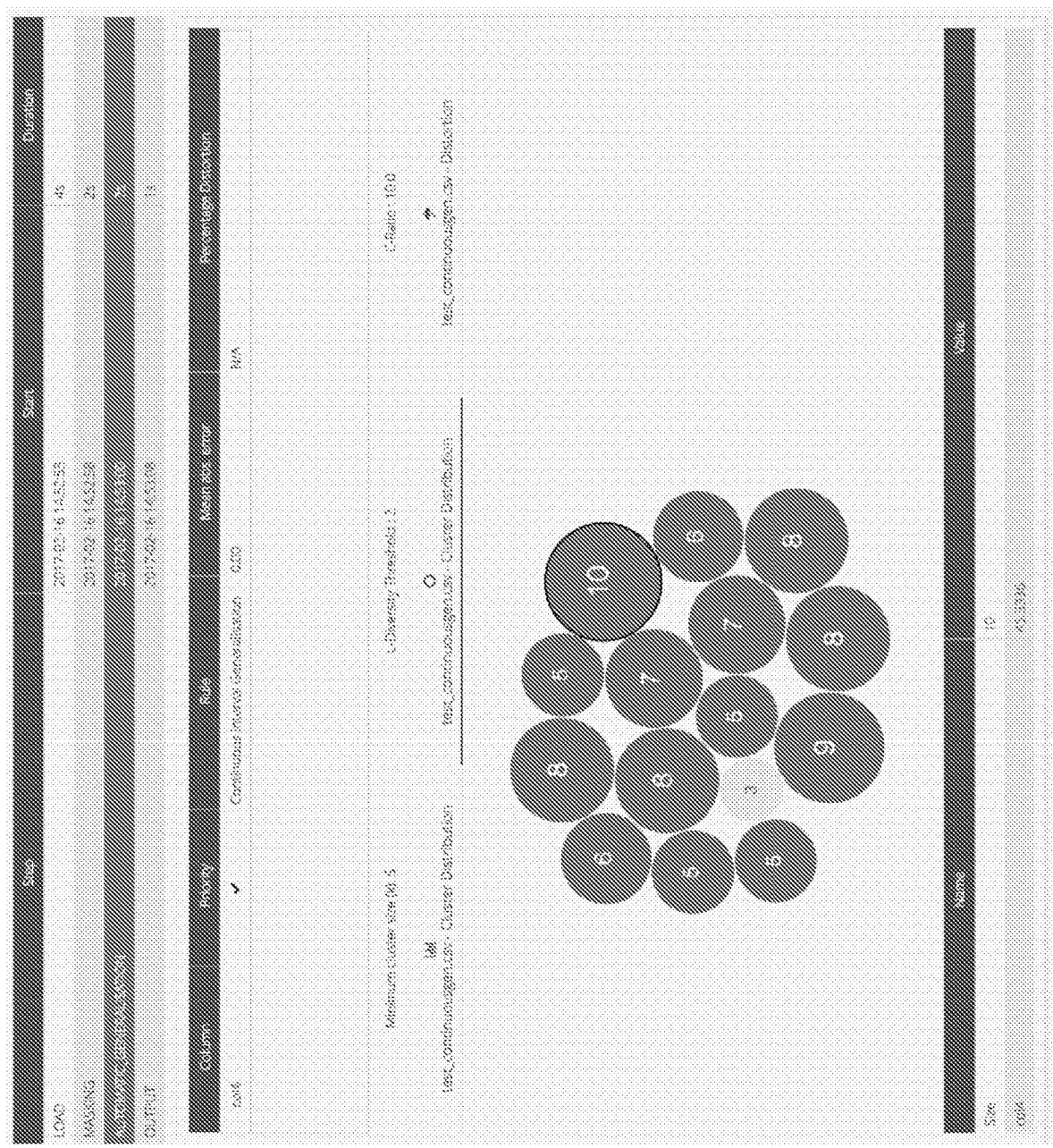
FIG. 34 shows an example of a cluster size bubble chart displayed to an end-user.

FIGS. 33 and 34 each show an example of a cluster size bubble chart displayed to an end-user. The cluster size bubble chart visualises the sizes and counts of clusters in the output. Each dot corresponds to a cluster of records grouped by their quasi-identifier values. The size of the bubble scales with the size of each cluster. The number in the bubble (displayed if the bubble is large enough to hold text) is the size of the cluster. By clicking on a cluster the user can examine the quasi-identifier values of the cluster. Bubbles shown in grey do not meet the minimum cluster size. For these groups, it is ensured that the values of the cluster are not revealed. The option to display the values of the quasi attributes is disabled.

These charts give an overview of how much the generalisation specialized the quasi-identifier columns. If the bubbles are all small (between k and 2*k), that means the generalisation is close to optimal and the output will be generalised less, as shown in FIG. 34. If the diagram has certain very large bubbles then that means the generalisation is further from optimal and the output will be generalised more, as shown in FIG. 33.

6. Automatic Privacy Analysis of Raw Data & Guided Policy Setup

This section describes Publisher's features for automatically detecting sensitive, quasi-identifying, or identifying columns. These features allow the program to assist the user in properly configuring the anonymisation of input datasets and, additionally, in identifying new datasets to anonymise. Publisher takes several approaches to detecting sensitive, quasi-identifying, or identifying columns including using metadata, measuring correlation with known columns, and using machine learning.

Publisher effectively combines sensitive data discovery, policy management, and anonymisation to increase the value of each. This operates in both directions: sensitive data discovery informs, and is also informed by policy and anonymisation activity, so each is improved by the other.

1) Identifying and classifying sensitive data, including identifiers, quasi-identifiers and sensitive values, based on the data and metadata about it, as well as policy management user activity, and anonymisation activity. This is done by:

Analysing the data itself, informed by:
  The format and structure of the data records in a column;
  The characteristics of the distribution of that data in the dataset—eg a dates of birth will follow a different distribution to last login date, a quasi-identifier will typically have lower cardinality than a unique identifier;
  The context in which data appears—eg a date field in an ecommerce transaction dataset is more likely to be a purchase date than it is a birthdate, but a date field in a customer table stored alongside address other primary information is more likely to be a date of birth;
  The relationships between different datasets—eg do two data files share variables allowing those datasets to be linked, thereby changing the privacy risk. As an example, you might have three files, each containing a system generated unique identifier (or a token), and one quasi-identifier. Each one on its own would be low risk since a single quasi-identifier is not enough to identify an individual. However, when linked by the identifier, the combination of files does pose a more significant privacy risk.

Analysing metadata about the variable: its name, its source, descriptive data about it coming from the file or from external metadata stores, its date of update, access controls applied to the data.

In addition, learning from user behaviour in managing this and similar data with the Privitar application, namely:
  Analysing how other this data has been classified and managed in other privacy policies—if there exist policies requiring a column to be tokenised, that is a strong indicator that it is sensitive;
  Considering the similarity of a dataset to other data which users have indicated is sensitive through their classification of that data in a privacy policy. This is rather like learning domain knowledge using recommendations for data privacy: since a user judged that data resembling your data was sensitive or identifying, it's more likely that your data is sensitive or identifying;
  Reading metadata and data lineage information generated from the anonymisation process, in order to tell the difference between sensitive data, and very realistic anonymised data of the same structure. Since the tokenisation process produces fields of the same structure as the original, and the generalisation process preserves the data distributions, anonymised data looks very like raw sensitive data, and the metadata recording that it has been anonymised is necessary.

Once quasi-identifiers have been discovered, identify the privacy risk by evaluating the k-distribution of the data.

Evaluate how privacy risk and data sensitivity is reduced by anonymisation.

These pieces of information may be assembled into rich input to a rules engine or a machine learning classifier.

2) Guiding policy management based on identification of sensitive data

Provide default policy configuration based on the sensitivity classification learned about a dataset, including suggesting appropriate action for fields identified as primary identifiers, quasi-identifiers or sensitive fields (ie all of the above).

Inform policy configuration by considering other policies for this data.

Inform policy configuration by considering other policies for similar data.

Alert the user to inconsistency of approaches, where policies conflict.

6.1 Automatic File Scanning for Policy Creation Assistance

When a Schema is extracted directly from a data object, or if an example data object conforming to an existing Schema is available, Publisher can offer help in creating a general Policy for any instance of the Schema by analysing the values in the dataset itself.

To aid Policy creation, Publisher compiles and stores metadata about which columns in the tables contain identifiers, quasi-identifying attributes, and potentially sensitive personal information. This information can then be presented to a user creating a Policy, to ensure that all identifiers, quasi-identifiers and sensitive columns are appropriately handled by the Policy. Publisher also assesses various types of risk in the columns (detailed below), which are also useful hints when defining a Policy.

At a lower level, the kind of information that is collected comprises attribute names, frequently occurring attribute values, average, variance and skewness (second and third order moments) of the attributes distribution, minimum, maximum and average correlation, as well as links with other attributes and attribute cardinality. This information is collected over time. As more information is obtained, it can be used to suggest Policy configuration automatically for newly encountered data, based on Policies that exist and the similarity of the new data values to the stored metadata. In this case, the user has the option in the Publisher UI to accept or reject the suggestion.

Given a dataset, for each column in each table Publisher calculates the probability that the attribute represented by the column is either sensitive or contains directly or indirectly identifying information for the data subject. The data must be organised such that a row in the table corresponds to the data subject that should be protected from re-identification.

The processes applied are:
Identify Primary Identifiers;
Assessment of Proposed Quasi-identifiers;
Identify Sensitive Columns;
Assess Linkage Attack Risk with an Auxiliary Dataset Registry;
Assess Identification Risk;
Assess Sensitive Attribute Disclosure Risk.
These are described in the following sections.

6.1.1 Identification of Primary Identifiers

Publisher measures the cardinality of columns. Those with a high cardinality, i.e. attribute cardinality close to the total number of rows, are likely to be identifying attributes as they are unique for each data subject.

Secondly, Publisher compares column names are with a list of HIPAA constants to detect columns that contain typical personal identifiers such as:
NAME
GEOGRAPHIC_SUBDIVISION
DATE
TELEPHONE_NUMBER
FAX_NUMBER
EMAIL_ADDRESS
SOCIAL_SECURITY_NUMBER
MEDICAL_RECORD_NUMBER
HEALTH_PLAN_BENEFICIARY_NUMBER
ACCOUNT_NUMBER
CERTIFICATE_NUMBER
VEHICLE_IDENTIFIER
DEVICE_IDENTIFIER
URL
IP
BIOMETRIC_IDENTIFIER
PHOTOGRAPH To match column names with the provided list of template identifier attribute names the Levenshtein distance between two strings is calculated. Publisher also considers substrings, so that, for example, "account number" is found to be similar to "current account number".

Thirdly, Publisher takes values from previously known sources of identifiers and finds similarity between those sources and the new data in question. A key source is the content of Publisher Token Vaults, which are known to contain identifiers. A second source is other columns in the dataset that have been assigned a tokenisation rule. If new data contains a significant overlap with a known list of identifiers, it is more likely to be an identifier itself.

Publisher calculates the overlap between one column and another either:
  Using the Jaccard index, which is the cardinality of the intersection of the columns divided by the cardinality of the union of columns (where the columns are taken as sets). This index is straightforward but inefficient to calculate. For performance, Publisher may approximate the Jaccard index using the "hashing trick", which hashes each value into a range of values (e.g. 0 to $2^{24}-1$), and maintains a bitstring of the same length, and flips the bit from 0 to 1 only if one of the values is hashed to that index. Publisher can then efficiently approximate the Jaccard distance using the popcount of the AND of the two bitstrings over the popcount of the OR of the two bitstrings.
  By calculating the cardinality of the intersection of columns divided by the cardinality of the smaller of the two columns (again where the columns are taken as sets). Similarly, Publisher may approximate this using the hashing trick—to approximate this metric, it takes the popcount of the AND of the two bitstrings over the greater of the two bitstrings' popcounts.

Fourthly, Publisher uses a set of patterns representing common formats to identify the presence of standard identifier types such as passport numbers, email addresses and telephone numbers. These textual pattern descriptions are included with Publisher. The patterns may be implemented as regular expressions or as more sophisticated 'fuzzy' matching approaches.

Last, Publisher scans unstructured columns (for example, log files, chat/email messages, call transcriptions or contracts) for substrings that are equal to values in other columns marked as identifying.

Publisher can compare any of these metrics with a threshold to determine whether or not to inform the user of that the new column is potentially identifying.

6.1.2 Assessment of Proposed Quasi-Identifiers

Publisher will evaluate the privacy risks for a set of potential quasi-identifying attributes suggested by the user before the dataset is scanned.

The user should select potential candidates based on the following criteria:
  The exact (or close approximate) value of the attribute for an individual contained in the dataset can be obtained from a secondary, auxiliary data source.
  The attribute is not necessarily unique for the individual but there is a variance of labels contained in the data.

Publisher provides a UI that gives the user sufficient guidance to make an informed choice about the potential set of quasi-identifiers:
1. The user is encouraged to select all columns that are known to be linkable to the individual data subject through publicly available information.
2. Metadata automatically obtained by Publisher will be used to highlight columns for known, typically quasi-identifying information such as date of birth, age, or postal codes. This is based on HIPAA names and analysis of textual patterns (regular expressions, etc) in the data values.

As the selection of quasi-identifiers requires domain-specific knowledge this task is not fully automated in Publisher but clear guidance and automated suggestions are provided.

6.1.3 Identification of Sensitive or Quasi-Identifying Columns

Machine Learning Approach

Publisher supports a machine learning approach to identifying sensitive or quasi-identifying columns. Publisher constructs a set of training data using the column names and value sets of all datasets that pass through the system, and labels them according to whether they were marked as "sensitive" or not by the user, and separately, whether they were marked as "quasi-identifying" or not by the user. Publisher can randomly subsample the value sets in order to limit the size of the training set.

Then, several machine learning approaches can be used to build a model that can score an unknown column as sensitive or non-sensitive (or similarly, quasi-identifying or non-quasi-identifying). For instance, the following features may be used:
  The number of distinct values.
  The mean, median, mode, min, max and variance of the numeric values.
  The type of the value (decimal, integer, string, date).
  The column name.
  Length of column name.
  The n-grams of the column name (where underscores are considered as breaks between words).
  Entropy of the value set.

Possible training algorithms include the following:
Support vector machines, handling numerical features in the following way:
One-hot encode the column type.
Omit column name.
Omit n-grams of the column name.
Nearest-neighbour algorithms, using the following distance metrics:
Difference for numeric features.
Levenshtein difference for string features (e.g. column name).
Fraction of overlapping elements for sets of strings (e.g. n-grams of column name) or cardinality of overlapping elements.
Boosted decision trees.

Feature dimensionality reduction algorithms such as Principal Component Analysis (PCA) can also to preprocess the features before running the training algorithm.

If the output score of the sensitive vs. non-sensitive model is above a certain threshold, Publisher can prompt a user suggesting that the column may be sensitive. It can do the same for the quasi-identifying vs. non-quasi-identifying model.

Correlation Approach

Sensitive columns can also be detected via high correlation with other columns in the same dataset that have been marked as quasi-identifying. See the section below about inter-column correlation detection.

Metadata Approach

If the metadata store has configured information about which column names or (table name, column name) pairs refer to sensitive attributes, Publisher can retrieve this information and determine whether columns are sensitive based on matching table and column names.

Substring Approach for Unstructured Columns

Publisher scans unstructured columns (for example, log files, chat/email messages, call transcriptions or contracts) for substrings that are equal to values in other columns marked as sensitive.

6.1.4 Assess Linkage Attack Risk with an Auxiliary Dataset Registry

Publisher supports detecting quasi-identifiers by maintaining a database of public datasets and looking for columns in supplied datasets that are shared with a public dataset. To power this feature, Publisher must be provided with many public datasets (for instance, public housing records or public census listings). Publisher has a portal to upload these datasets.

The user may upload datasets that they know to be related to the datasets they hold: for instance, a company holding HR data may upload an extract of publicly available LinkedIn data (e.g. a data extract of names, job titles, and years of employment). Additionally, Privitar hosts a library of standard datasets, such as census and housing registry datasets. Publisher can download these from Privitar's hosting site.

Once Publisher has the datasets, it can conduct column similarity measures (see elsewhere in this section) to determine whether any of the columns in the public dataset are similar to columns in the dataset being anonymised. If there is a similar column that has not been marked as quasi-identifying, the user can be prompted to check whether that the column is quasi-identifying. The user can be provided with a link to the relevant public dataset.

This process can be done prior to anonymisation, in the Policy setup stage. Alternatively, it can be done retroactively. Using the metadata maintained about published datasets, Publisher can periodically scan published files to determine whether their non-quasi columns can be linked to public datasets.

The retrospective mode is useful in the case that new datasets become publicly available. The datasets can be uploaded to Publisher and then existing published datasets can be scanned to determine whether they have become at risk of linkage from the new public sources.

6.1.5 Assess Identification Risk in Raw Data

Once a likely set of quasi attributes has been expressed in Publisher, a scan is conducted to cluster the records, and the minimum cluster size k found in the dataset is reported, along with the average, median, minimum and maximum cluster size of the raw dataset. Publisher can also display a privacy-preserving histogram of cluster sizes. These are useful measures for the privacy risks inherent to the input dataset, given the selected quasi-identifiers.

The probability of re-identification of a record in the dataset can be measured as 1 divided by the cluster size of this record. The maximum risk of re-identification is reported as 1 over the minimum cluster size and the average risk as 1 over the average cluster size. Publisher reports these values too.

6.1.6 Assess Sensitive Attribute Disclosure Risk in Raw Data

Once a likely set of quasi-identifying and sensitive attributes has been expressed in Publisher, the risk of sensitive attribute disclosure will be assessed by calculating the minimum l-diversity for each sensitive attribute when all records are clustered by their combination of quasi-identifiers.

The probability of sensitive attribute disclosure for a record in the dataset is given as 1 divided by the number of distinct sensitive values in the same equivalence class. The maximum risk of sensitive attribute disclosure is reported as 1 over the minimum l-diversity. The average risk of sensitive attribute disclosure is given as 1 over the mean number of distinct sensitive values averaged over all quasi-identifier clusters. Publisher reports these values.

6.2 Sensitive Data Discovery in Structured and Unstructured External Datasets

The techniques described in this document are also used in Publisher's features for 'sensitive data discovery'. This means inspecting a large number of files in a Hadoop cluster, and analysing them to identify which of the files contain identifiers, quasi-identifiers, sensitive values and the risk types as described in this document. The implementation techniques are similar to those outlined elsewhere in the document, for example using a Token Vault as a source of examples of identifiers or quasi-identifiers.

Publisher analyses structured and unstructured files. Structured files are processed as described in the document, that is, taken as collections of columns.

Unstructured files (for example, log files, chat/email messages, call records or contracts) are scanned for substrings that are known identifiers, known sensitive values or have similar textual patterns to those (see the section 'Identification of Primary Identifiers' for more).

Once such an issue has been identified, Publisher suggests appropriate actions depending on the objects found. Such actions include replacing identifiers with tokens in-place; deletion of data; tightening of access restrictions; and creation of safe (masked, tokenised or generalised) copies of data.

Publisher keeps a database that contains, for each file, the issues found. The database is updated either by a scheduled scan, or in response to file-update events generated by the cluster itself.

Publisher uses a summary visualisation to communicate to a user the overall 'privacy health' of a cluster, where privacy health refers to a summary of the classification of data objects in the cluster as:
- unscanned,
- scanned with risks found,
- scanned with no risks found, and
- safe (meaning an object with explicit protection applied, such as the output of a Publisher Job).

The privacy health of a cluster is the proportions of data objects with each of these classifications.

Figure 35A:
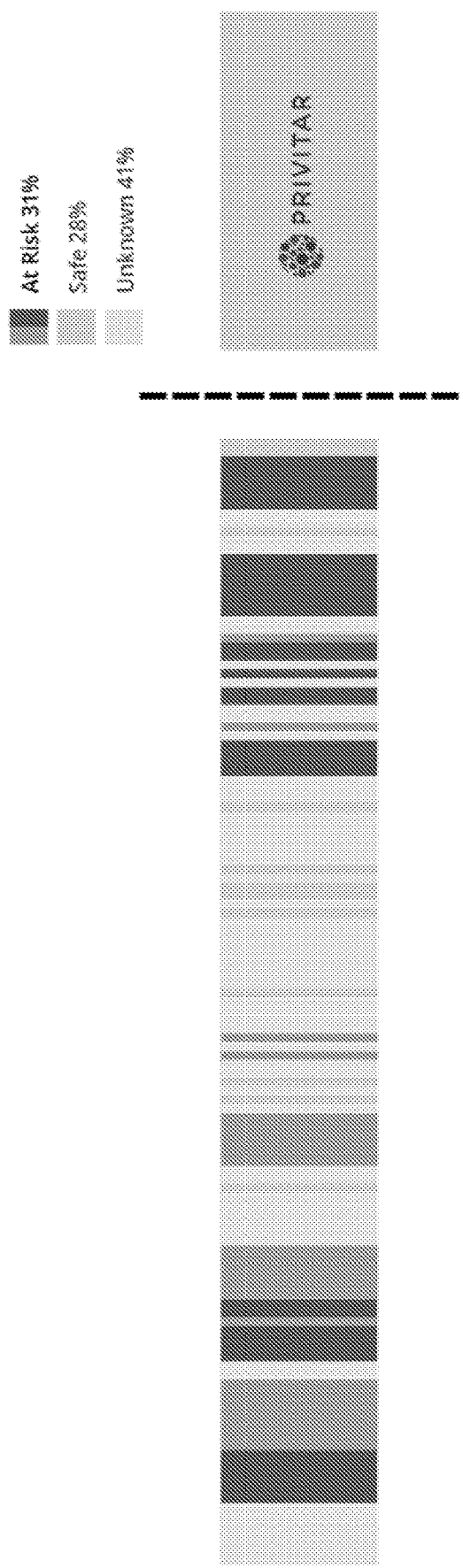
FIG. 35A shows a visualisation depicting the Sensitive data discovery.
Figure 35B:
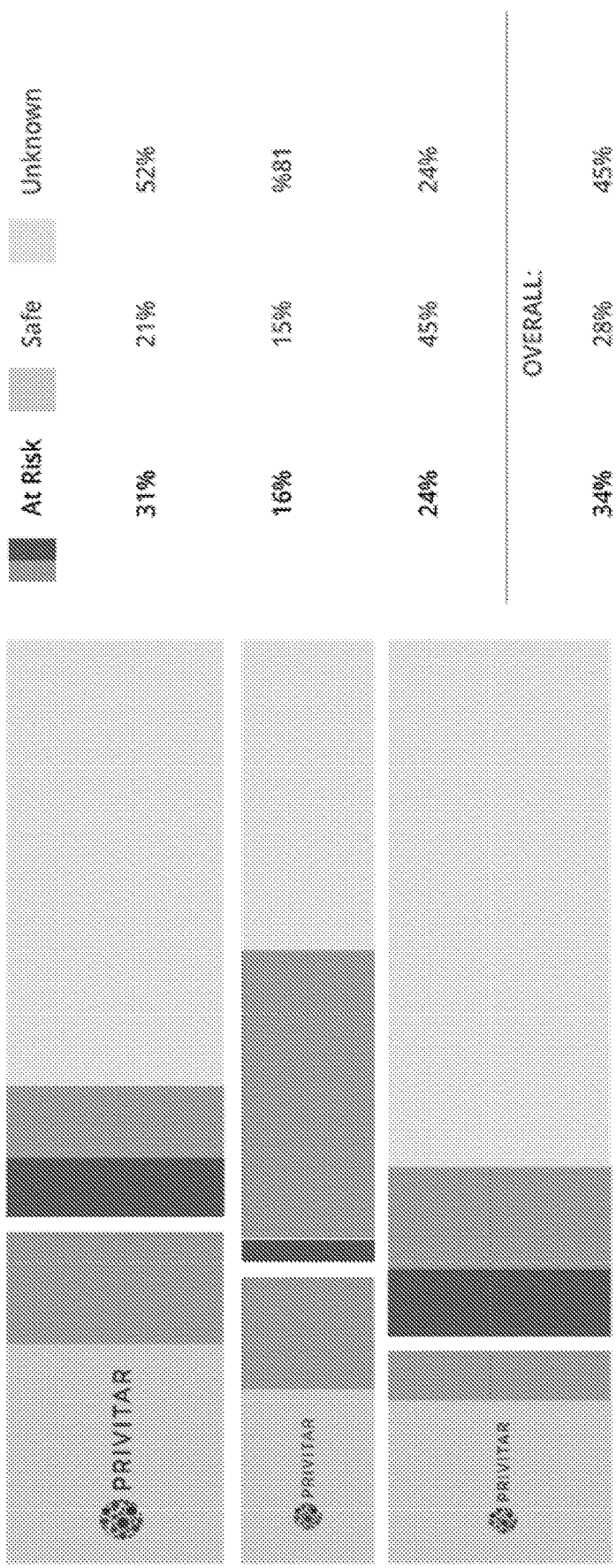
FIG. 35B shows a visualisation depicting the Sensitive data discovery.
Figure 35C:
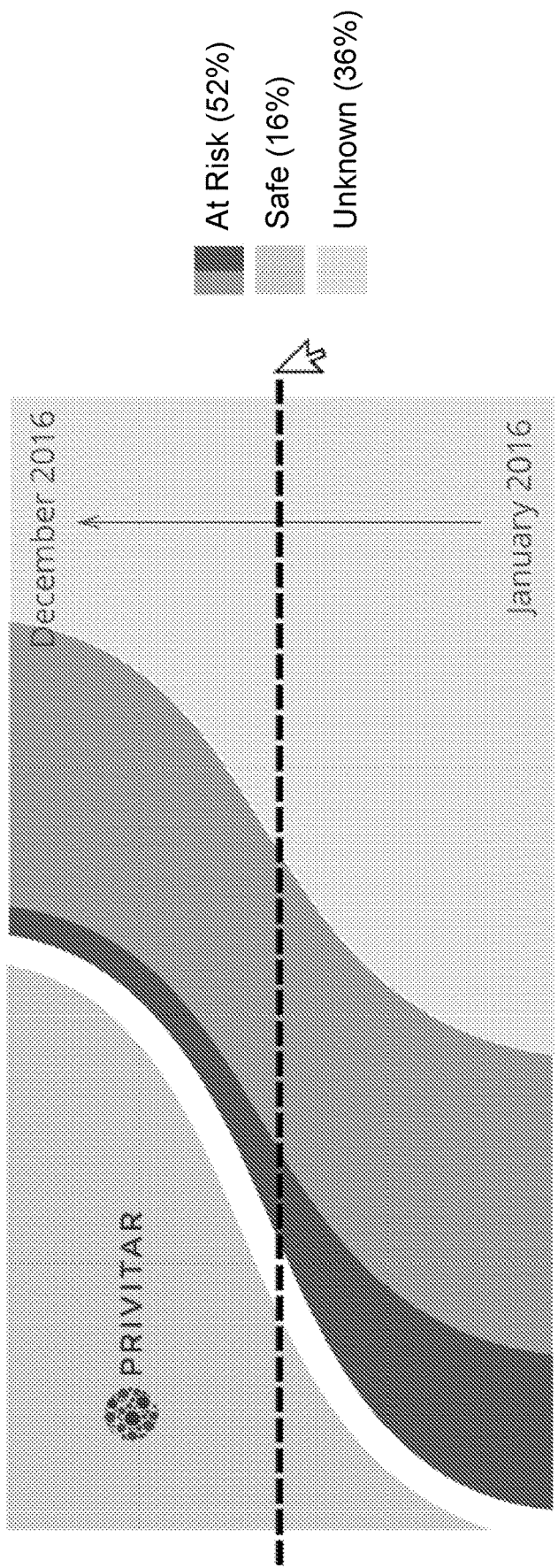
FIG. 35C shows a visualisation depicting the Sensitive data discovery.

FIGS. 35A, 35B and 35C depict such a visualisation. FIG. 35A shows the files as bars next to each other, where the width of the bar is the size of the file and the color of the bar is the privacy status of the file. The files that have been output by Privitar are specially marked because these are of lower privacy risk. FIG. 35B shows a similar diagram, but for many Hadoop clusters, with one level of diagram per cluster that has been scanned, and with all files of the same privacy status grouped together. FIG. 35C shows the difference in privacy risk in a cluster between two points in time.

From the visualisation, actions can be invoked on the displayed objects. In the cases where the user opts to address an issue by creating a safe copy, the user can be transferred directly to the Publisher UI where a partially pre-populated configuration is created ready for use. Once finalised, the Job is run in the same way as any Publisher Job.

6.3 Outlier Detection

Heavy outliers are at a significantly higher risk of statistical disclosure than the average data subject. An outlier is a record in the dataset whose quasi-identifier values deviate so much from the other observations that it is unique and thus easily detectable.

Furthermore, anonymisation through generalisation will introduce much higher distortion into the data when trying to generalise the outlier's quasi-attributes to group the record with other records in the dataset.

If, for example, the quasi-identifier age follows a normal distribution with mean 40 and standard deviation 10, and one person in the dataset has age 102, she is at a high risk of re-identification in the raw dataset and the generalisation algorithm needs to distort the attribute value by a large amount to find the closest age category this value will fit in and to achieve k-anonymity in the output dataset.

Publisher's analysis of a dataset includes outlier detection by unsupervised outlier detection techniques, such as chi-squared statistical tests and deviation-based approaches, to highlight outlier records and ask users whether they would like to suppress these records. Note that the outlier detection runs only on the quasi-identifier and sensitive columns of the table—the other columns are not included in the outlier analysis.

6.4 Correlation Detection

Publisher measures the Pearson's correlation between columns. Then, when a user marks a column as quasi-identifying and there is another column that is highly correlated to it, Publisher may prompt the user to ask whether this other column is quasi-identifying as well.

To determine correlations for non-null numeric columns we will compute pearson correlation coefficients (PCC). If a column contains null values we will compute pearson correlation between 0 and 1 (for null or non-null respectively), and also the PCC for the non-null values. For categorical columns the user can provide an ordering so that a numeric representation can be derived. Where an ordering cannot be established the product will use ANOVA to determine the correlation between ordinal and nominal columns, and $\chi^2$ for nominal vs nominal columns. High cardinality nominal columns are not considered for this analysis.

7. Use Cases

This section describes ways that organisations can use Publisher to protect their sensitive data.

7.1 Anonymising Data for Development and Testing

Many organisations have internal processes that run on their sensitive datasets. Like any software, these internal processes are frequently changed and, when they are changed, must be tested to avoid crashes and errors. Developers could use real sensitive data to test their systems, but this incurs privacy risk, because it involves creating new copies of sensitive data and providing it to more individuals. Masking, generalising, or perturbing this data before sharing it with developers provides a layer of defense against privacy breach while retaining the utility of the data for testing. In particular, the organisation can use Publisher to:
- Replace ID columns with random integers that match the specification.
- Replace names with randomly selected names from a Lookup list.
- Replace email addresses with strings that look like email addresses.
- Generalise numerical values to bins of 10.

7.2 Anonymising Data for Internal Data Science Teams

Many organisations have data science teams that wish to train predictive models for business purposes. Sometimes the essential data for model training is sensitive data. As above, the data scientists could train models off of raw data, but this would incur privacy risks. An organisation can use the automatic generalisation features of Publisher to create a dataset that preserves as much utility as possible about the variables they want to model.

For instance, say the organisation possesses historical mortgage data which includes some customer information (e.g. age, home region) about the borrower and whether they ultimately defaulted or not. The organisation can configure Publisher to consider the customer information columns as quasi-identifying, and the default column as interesting. The organisation can also specify a value for k. Publisher's autogen can automatically generalise the customer information columns to the point where k-anonymity is achieved. The resulting dataset retains useful information about the relationships between the customer information and the default status, but is resistant to re-identification. Thus it can be provided to data scientists who can use it to train useful models but cannot re-identify people in the dataset and discover whether they defaulted on a mortgage.

7.3 Collecting Data from Many Parties and Sharing it Back

Multiple parties with limited trust wish to collaborate and pool their data, in order to benchmark against peers, perform aggregate analysis across a sector, or simply across larger scale statistics to enable more detailed analysis. Each party wishes to enjoy the benefit of access to the complete dataset, while not wishing to reveal sensitive elements of their own data.

Privitar enables this safe pooling by enabling a central aggregator to collect the data from each party and then make the pooled data available to each party in a privacy-preserving manner. Where each party's data contains information about common individuals or entities, SecureLink oblivious matching may be used to join these records without revealing the sensitive identifier.

Pooled data can be shared privately either by anonymising the raw data with Privitar Publisher and sharing the anonymised copy, or by exposing the aggregate data through a differentially private query interface. A contributor can compare their own raw data against the pooled data—which is valuable in performing benchmarking, but each must be prevented from learning sensitive data about another party by, for example, subtracting its own data from the pooled dataset. Prvitar's tools to provide aggregation and generalisation, and differential privacy, protect against this.

7.4 Assessing Privacy Risk in a Data Lake

Many organisations have vast data lakes with thousands to tens of thousands of tables. They need to periodically assess their data to confirm that their security and privacy protocols are working. However, manual review of each table is error-prone and inefficient.

An organisation can use Publisher to scan files in the data lake and detect which columns have columns that appear sensitive, identifying, or quasi-identifying. An organisation can then use this information to find data with privacy risk. Using Publisher's automatic scanning abilities allows organisations to review their data in a both faster and more comprehensive way.

For instance, say an employee at a Telecommunications company makes a copy of a set of customer geolocation traces. He places this copy in an unusual directory and then leaves the company so the file is forgotten. When the security team uses Publisher to scan the data lake for privacy risk, it detects that the file has both identifiers (user IDs) and data that looks sensitive (location traces). It alerts the users about this file, and they can then delete this file.

Publisher also identifies sets of files which may each bear low privacy risk in isolation, but high risk in combination. For example, three files which each contain a random or system generated unique identifier and a quasi-identifier, are relatively safe in isolation. However, if the records are joined on the system-generated identifier, then even thought that identifier is meaningless, some or all of the records may become identifiable through the combination of quasi-identifiers.

APPENDIX 1

Lens Algorithms and an Example of a Tracker Attack

A: Calculations for Specifying Resolution Features

Description of Procedure: Confidence Interval to Epsilon

Lens's noisy results use noise from a Laplace distribution centered at 0. To calculate the magnitude of noise, a parameter "epsilon", signifying the amount of privacy budget to spend, is required. More budget means less noise.

Inputs:
 CONFIDENCE—float between 0 and 1 representing probability, where 1 is 100% probability.
 INTERVAL—distance from center to end of confidence interval. E.g. if you want +/−10, it's the value 10 (not 20).
 RANGE—range of continuous variable (for sums and averages).

Calculations

The scaleFromConfidenceInterval( ) is a simple method that uses the CDF equations of the Laplace or Gaussian distribution (depending on which distribution is being used to add noise) to find the scale of a distribution centered at 0 such that a number sampled from the distribution is CONFIDENCE probability within +/−INTERVAL.

Epsilon is calculated in a different way depending on whether it is a COUNT, SUM, or AVERAGE query.

COUNT:
  scale:=scaleFromConfidenceInterval(CONFIDENCE, INTERVAL)
  epsilon:=1/scale
 SUM:
  scale:=scaleFromConfidenceInterval(CONFIDENCE, INTERVAL)
  epsilon:=RANGE/scale
 AVERAGE:
  Note: Averages pose a difficulty. Because they are calculated as NoisySum( )/Count( ), the noisiness of the result is equivalent to the noisiness of the sum divided by count. However, the count is not public knowledge, and may leak privacy. So what we do is to get a rough estimate of the count in order to use in further calculations. This is an approximate calculation.
  noisycount:=result of count query with same filter clauses and epsilon hard coded (for instance, 0.1, though configurable. This epsilon will be extra, overhead budget that is required for average queries).
  if noisycount<5 (5 is a hard coded threshold—configurable): fail—say that the query cannot be completed due to too few samples.
  scale:=scaleFromConfidenceInterval(CONFIDENCE, INTERVAL)
  epsilon:=RANGE/(scale*noisycount)

Outputs
 Epsilon or fail

Description of Procedure: % Accuracy to Epsilon

Description: A feature to allow the user to specify "I want my answer to within 1% accuracy" which means that (up to a certain probability) the noisy answer is within +/−X where X is 1% of the true answer. Example: The user asks for the answer within 1% accuracy. The true answer is 100. We expect (up to a certain probability) the answer to be between 99 and 101.

Inputs:
 CONFIDENCE—float between 0 and 1, 1 being the most confident.
 INTERVAL_PROPORTION—float close to 0. Fraction of the true answer to use as a confidence interval.
 RANGE—range of continuous variable (for sums and averages).

Calculations

Note: because the conversion depends on the true answer (a secret), we are left with a chicken-and-egg problem: we need a differentially private version of the answer to do the conversion, to know how much to spend on getting the answer. We solve this by starting with a hard coded (e.g. 0.1) amount of epsilon.

noisyanswer:=result of noisy answer to the query with epsilon hard coded at 0.1 (this is extra, overhead budget required).
 if noisyanswer==0: fail—say that the query cannot be completed due to a real answer of 0, and suggest using the confidence interval feature instead.
 interval:=abs(noisyanswer*INTERVAL_PROPORTION)
 epsilon:=follow "Confidence interval to epsilon" procedures with (CONFIDENCE, interval, RANGE) as inputs.
 N.B. For average queries, this takes an additional 0.1 budget.

Outputs
 Epsilon or fail

B: Example of a Python Code Query

```
def func(row_iterator):
    """Train a Linear Regression model to predict salary from
        HR attributes"""
    import random
    import pandas as pd
    from sklearn.linear_model import LinearRegression
    from sklearn.cross_validation import train_test_split
    from sklearn.feature_extraction import DictVectorizer
    def encode_onehot(data, cols):
        """
        One-hot encoding is applied to columns specified in a
            pandas DataFrame.
```

Modified from: https://gist.github.com/kljensen/5452382

```
"""
vec=DictVectorizer( )
mkdict=lambda row: dict((col, row[col]) for col in cols)
vecData=pd.DataFrame(vec.fit_transform(data[cols].ap-
    ply(mkdict, axis=1)).toarray( ))
vecData.columns=vec.get_feature_names( )
vecData.index=data.index
#replace
data=data.drop(cols, axis=1)
data=data.join(vecData)
return (data, vecData, vec)
#load and transform data
df=pd.DataFrame([x.split(",") for x in list(row_iterator)],
    columns=[u'index', u'salary', u'grade',
    u'location', u'gender', u'dateofbirth',
    u'yearsofemployment'])
df, _, _=encode_onehot(df, ["grade", "gender", "loca-
    tion"])
#train model
model=LinearRegression(fit_intercept=False)
X=df.filter(regex="grade|gender=Male").values
y=df.loc[:, "salary"].values.flatten( )
X_train, X_test, y_train, y_test=train_test_split(X, y,
    test_size=0.33)
model=model.fit(X_train, y_train)
#output
colnames=df.filter(regex="grade|gender=Male").col-
    umns
colcoefs=model.coef_
return colcoefs
```

C: Example of a Tracker Attack

Stopping tracker attacks is a central feature of Lens. The following tracker attack example is pulled from the article "An Introduction to Differential Privacy" on InfoQ.com (https://www.infoq.com/articles/differential-privacy-intro).

Consider the aggregate query:

"SELECT AVG(salary) WHERE name='Troy Brown';".

This query would conduct an average over one record (we assume there is only one Troy Brown) and thus retrieve an individual value from the dataset and breach individual privacy.

An initial defense against these queries was minimum query set sizes. A minimum query set size is a constraint that seeks to ensure that aggregate queries cannot leak information about individuals. Given some configured threshold number T, it ensures that every aggregate query is conducted on a set of at least T records. A minimum query set size would block aggregate queries that targeted fewer than T individuals. For instance, if T=2, it would block the query above.

Using minimum query set sizes prevents certain attacks, but does not come with a privacy guarantee and, in practice, can be circumvented by skilled attackers. The attacks that can continue to succeed in spite of minimum query set sizes are called tracker attacks. For instance, the attacker could accomplish the above attack with the set of queries below, which are a tracker attack:

"SELECT SUM(salary);".

"SELECT SUM(salary) WHERE name !='Troy Brown';".

Or even, if we know Troy Brown's age (45) and position (WR) uniquely identify him, this set of queries, which are also a tracker attack:

"SELECT SUM(salary) WHERE position='WR';".

"SELECT SUM(salary) WHERE position='WR' AND age !=45;

Each of these tracker attacks demonstrated above can be used to breach the privacy of individuals through an aggregate query interface.

Appendix 2
Summary of Key Concepts and Features

This Appendix 2 section of the patent specification is a summary of the key concepts and features that are implemented in the Privitar system.

As noted above, the Privitar system is organised around three core technologies, and this Appendix 2 is organised into three sections, one for each core technology:

Section I. Privitar Publisher: scans datasets to identify sensitive data or identifying datasets, and enables the anonymisation of sensitive or identifying datasets by processing that data to produce a safe copy.

Section II. Privitar Lens: prevents access to the raw dataset, but enables privacy preserving aggregate queries and computations, and uses differentially private algorithms to reduce or prevent the risk of identification or disclosure of sensitive information Section III. Privitar Securelink: a way for data to be joined against a common identifier (such as a social security number), while protecting that common identifier and ensuring that it is not revealed in the matching process or the resulting joined dataset. The joined dataset may then be anonymised using Privitar Publisher, or made available for privacy preserving analysis using Privitar Lens.

All aspects of Privitar can be implemented in a fully scalable cloud computing infrastructure.

Note that different concepts or approaches and features may be combined with one another. For simplicity, we have organised features as relating to a specific higher-level feature or concept; however, this is generally a preferred implementation only and the skilled implemented will appreciate that features should not be interpreted as being limited to the specific context in which they are introduced but may be independently deployed throughout the entire Privitar system.

As a general point, each high level concept or approach is non-abstract and tied to the defined hardware of a computer-based system. Further, each concept or approach or lower-level feature can be combined with all other concepts, approaches or lower-level features, except where their fundamental incompatibility would be apparent to the reader of ordinary skill in the art.

Note also that the purpose of this Appendix 2 is to bring together in one section all of the core concepts or approaches and features of the entire Privitar platform, to enable the reader to efficiently and holistically understand the Privitar platform. The scope of invention or innovation is however determined by the appended claims, as interpreted under applicable law. Inclusion within, or exclusion from, this Appendix 2, should therefore not be seen as a definitive indication of the patentable innovative or inventive concepts and features of the Privitar platform.

Appendix 2
Section I: Privitar Publisher
Key Concepts and Features

This Section A organises the key concepts and features of Privitar Publisher as follows:

A. Policy

B. Tokenisation (including token generation and obfuscation)

C. Generalisation

D. Automatic Privacy Analysis of Raw Data & Guided Policy Setup

Privitar Publisher scans datasets to identify sensitive data or identifying datasets, and enables the anonymisation of sensitive or identifying datasets by processing that data to produce a safe copy.

A.1 Policy

We can generalise the core Policy approach as a method in which a computer-based system processes a sensitive dataset and publishes a derivative dataset such that privacy is preserved in the derivative dataset, in which the system:

(a) generates a set of rules that define the privacy protections to be applied to sensitive or personal data objects;

(b) enables a user, such as a privacy officer, to define a Policy, being one or more specific rules that apply to one or more data objects;

(c) enables a user to then select a Policy to apply to specific data objects; and (d) the Policy is executed and applied to specific data objects.

A.2 Optional Policy features include the following:

The method is implemented in a scalable distributed system.

Defining a Policy is done via a central management system.

Rules are re-useable across different Policies

Each rule encapsulates a single operation to be performed on one or more of the input data columns of the sensitive dataset.

Some rules are 'Masking' rules that either redact or obscure the underlying input value Some rules are 'Tokenisation' rules that replace the underlying input values with generated tokens that stand in for the real data values.

Some rules are 'Generalisation' rules that reduce the precision of the underlying input values.

Some rules support 'Watermarking' in which a digital watermark is included in the anonymised data.

The digital watermark encoded into the anonymised data is a known probability distribution of numbers or IDs.

Different Policies are selected according to the requirements of different use cases or purposes.

A data object is a table of multiple rows and columns

A Policy comprises one or more specific rules that act on or apply to one or columns in a table;

The system stores the configuration of many Policies and/or Schemas.

The configuration includes: user information such as role of the user, the Schema of each data object and information about each Policy created by the user.

The system stores an audit log which includes every configuration object created by a user and any change or update to the configuration.

A Policy is devised to capture regulatory and/or ethical privacy control in a standardised format.

System supports having multiple Policies for different uses of the same Schema,

Any data object that conforms to a given Schema can be anonymised or otherwise privacy protected by use of a compatible Policy Multiple Policies can transform the same Schema to allow the output to be customised for different downstream consumers, who may require different anonymisation treatments.

A Policy is a configuration object that is persistent to serve as a standard for processing of data it is compatible with.

A Policy encapsulates reproducibility of processing on multiple data objects over time.

A Policy is re-useable to give consistency between different use cases.

Different Policies re-use some of the same rules to give consistency between different but related use cases.

A Policy provides a single point of management, review and reporting.

A Policy is described, managed and created centrally, to provide an organisation's privacy officer with one or more of the following via a single user-friendly interface: a single overview of what data is protected and by what methods; ability to add new data sources; ability to apply protection measures that have been standardised across an organisation to multiple data sources; ability to manage access control to the whole configuration in a centralised way; ability to reuse existing tokens in a consistent manner, to allow new data to be joined or appended to data already processed, including repeated batch processes such as nightly data loads.

System applies a rule to each value of a column when processing a data object to implement a Policy.

The system stores metadata which relates to information on a job that has been run, the number of rows processed, the rules applied to each column and how the columns were perturbed.

A job refers to a Policy, an environment, and data objects that are compatible with the Policy's schema.

A job can be run either automatically or at a scheduled time.

A job can be run more than once, such as when a policy is updated and/or when a data object is updated.

Progress of a job can be monitored through a user-interface.

For at-rest files, the system submits a distributed computing process to a distributed storage or compute environment or a cluster computing framework, such as Apache Spark, thus exploiting a parallel-processing capability of the environment or cluster to apply rules to columns in a distributed way, on very large input data.

For streaming sources, Publisher uses a transformation agent in the appropriate message pipeline to make the transformations described by a Policy's Rules on the components of messages as they are processed through the pipeline Privacy protections applied by the system can be consistent, such that applying a given Policy, whenever processing a given raw input value, always produces the same output token, even in subsequent re-runs or when processing different data objects.

Privacy protections applied by the system can be inconsistent, such that applying a given Policy, whenever processing a given raw input value, may produce a different output token, even in subsequent re-runs or when processing identical objects.

Rules are stored in and shared from one or more Rules libraries.

When defining new Policies, the system assists the privacy officer in determining which rules to apply to data objects by annotating the data sources in question with summary information obtained from external metadata stores, including one or more of the following: data type, data classification, whether data is identifying or not, whether data is quasi-identifying or not, sensitivity, visibility/permitted audience, risk/exposure estimates, data expiration date, and access control requirements.

The system separates access permissions for different types of configuration activity into roles which determine the actions that each user may perform.

The roles and their associated responsibilities are one or more of the following: (i) Administrator; to configure system setup, and create and edit Schemas; (ii) Author to create and edit Policies and Jobs; (iii) Operator to execute Jobs; (iv) Investigator to perform reverse token lookup; (v) the system user to invoke jobs and other operations via API calls.

In the event of a breach, and for other investigations, the system supports the process by allowing identification of the Policy that was used to generate a particular output data object by keeping a log of changes made to its configuration objects, so when an investigator needs to establish which Policy was in effect at the time of the production of the file, the relevant Job and Policy can be recovered.

The system takes a specification from a classification system and selects the applicable Policy or rules using that specification.

A Policy is applied to data objects depending on an external classification that defines different levels of data sensitivity or privacy The system extracts metadata from the data object and
- (a) a data object is accepted as an input;
- (b) the data object metadata is looked up from a metadata store and the system returns the description of the data object, the description includes properties for each column such as datatype, sensitivity and/or audience;
- (c) the returned description is in turn used to find a compatible rule for each column;
- (d) the compatible rules are returned to the user, the user can in turn verify, choose or edit the compatible rule, or defined a new rule according to the requirement of different use cases or purposes.

A.3 Some further features, of a more general character:

The system operates on tabular datasets, including tabular datasets with variable numbers per row or missing values for some columns for some rows.

The system operates on tabular datasets that hold blanks and/or missing values.

The system integrates with a distributed storage and compute environment

The system is installed on an "edge node", which means a host that is not one of the cluster nodes, but is on the same network as the cluster and can interact with the cluster over a network interface Schemas are modelled in Publisher as a set of named Tables, each of which consists of a set of named columns of values A dataset supports one or more of the following data type: string, numerical data, date or a complex structure such as an array or a map.

The system converts the complex structure such as array or map into a set of ordinary columns.

in the map case, by creating one column per possible key
in the array case, by creating one column per index in the array The above features are each optional and can be freely combined with one another in a manner that will be clearly apparent to the person skilled in the art; this approach applies equally to the enumerated lists of concepts, approaches and features in the rest of this specification.

Another aspect is a cloud computing infrastructure that implements the computer implemented methods and features defined above.

B.1 Tokenisation

Tokenisation involves token generation and also obfuscation; obfuscation is the replacement of raw values in the data by tokens. Some key advantages to Privitar Publisher's tokenisation process include the following:
central policy management
easier to manage consistent tokenisation across datasets
scalable execution across a distributed system B.2 Token generation We generalise the core token generation approach as a method in which a computer-based system implements consistent tokenisation for large datasets in a distributed storage and compute environment, or cluster, comprising separate nodes, in which consistent tokenisation comprises a token generation phase and an obfuscation phase, and where token generation creates a unique token for every distinct input value, the method comprising the following steps:
- (a) generating a set of 'Tokenisation' rules that replace the underlying input values with generated tokens that stand in for the real data values;
- (b) enabling a user, such as a privacy officer, to define a Policy, including one or more specific Tokenisation rules that apply to one or more data columns;
- (c) enabling a user to then select a Policy to apply to specific data objects; and
- (d) executing the Policy on specific data objects.

Optional features for token generation:
both input files and a token vault are split over multiple nodes; the method then comprises the following token generation steps:
- (i) nodes discard any duplicate input values that have been previously tokenised; then
- (ii) at each node, a random token is generated and assigned to each non-discarded input value;
- (iii) at each node, the input value and vault value maps are 'inverted' and shuffled around the cluster to group them by token;
- (iv) at each node, for each token that has a single input value mapped to it, this pairing is finalised and is persisted into a token vault;
- (v) all the nodes are checked and for each token that has more than one input value mapped to it, then one of those input values is assigned the winner, the pairing of the token and the winner is persisted to the token vault, and steps (ii) to (vi) are repeated for the input values not assigned with a token until each distinct input value is assigned a unique token.

The token generation process defined above can be combined with the obfuscation process defined below.

B.3 Obfuscation

We generalise the obfuscation approach as a method in which a computer-based system implements consistent tokenisation for large datasets in a distributed storage and compute environment, or cluster, in which a token vault is used to replace input values with tokens in a cluster comprising separate nodes; in which consistent tokenisation comprises a token generation phase and an obfuscation phase, the method comprising the following obfuscation steps:
- (i) each node determines the set of distinct values present on its portion of an input file;
- (ii) each node creates, from each distinct value, a pair consisting of the value and the node ID;
- (iii) (value, id) pairs from step (ii) and (value, token) pairs from the token vault are shuffled so that the elements with the same value co-reside on the same node;
- (iv) each node creates a (value, id, token) tuple from each (value, id) pair by appending the token mapped to by the value in the set of (value, token) pairs, resulting in a set of (value, id, token) tuples;
- (v) each (value, id, token) tuple is shuffled to the node that corresponds to its id value;
- (vi) each node uses the (value, id, token) tuples it has to process the original file and replace values with tokens.

Optional features: (these apply to both token generation and obfuscation)

Tokenisation is applied consistently across different datasets.

The method is scalable and is implemented in a scalable distributed system.

Each distinct underlying input value maps to only one unique generated token.

The dataset is too large to hold either the entire contents of the input or the entire contents of the vault or mapping table in memory on a single host, hence requiring a distributed storage and compute environment A token vault stores data for a rule that defines the privacy protection to be applied to sensitive or personal data columns.

An end-user defines a policy, being one or more specific rules that apply to one or more data objects.

Tokenisation includes adding a digital watermark to the tokenised column value.

B.4 Derived tokenisation

We generalise a specific tokenisation process, which we have earlier in this specification described as 'derived' tokenisation, as a method of implementing consistent tokenisation for large datasets in a distributed storage and compute environment, or cluster, comprising separate nodes, where tokenisation replaces underlying input values with generated tokens, and both input files and token vaults are split over multiple nodes;

the method comprising the following step: (i) the token for a given input value is generated using a pseudo-random number generator (PRNG) that is seeded with a value derived from the input value.

Optional features:

Each distinct underlying input value maps to only one unique generated token.

The random number generator is seeded with a value derived from the input value by: (i) encrypting the input value using a key, e.g. from the customer's KMS; (ii) breaking the resultant ciphertext into N-byte blocks and XORing them together, resulting in a final N byte block that is used as the seed for the PRNG, where N is the number of bytes required to seed the PRNG; (iii) Deriving the initialisation vector for the encryption cipher using the identifier of the rule (for example, by concatenating it with itself until it is the right size), so that the same input value appearing in different rules will produce different seeds.

A separate map of 'collisions' is maintained in addition to the vault.

If two different inputs generate seeds that result in the generation of the same token, one of them is added to the collisions map and assigned a non-derived value using an unseeded PRNG.

This collisions map is sent to each node in its entirety.

Each node consults this map when a token is requested for an input: if the input appears in the map then the token from the map is returned; otherwise a token is derived using the ciphertext-seeded PRNG.

The entire collisions map is sent to each node during the obfuscation process, and each node can process its data independently, with no shuffling of data around the cluster necessary.

The PRNG is used in a randomized algorithm that creates a random token, for instance a process that selects a random element from a pre-defined list.

The method is scalable and is implemented in a scalable distributed system.

Tokenisation includes adding a digital watermark to the tokenised column.

C.1 Generalisation

Privitar Publisher may perform statistical generalisation to achieve k-anonymity and l-diversity while offering visibility of, and fine grained control over, the distortion of each transformed quasi-identifier, and allows tuning of the approach to maximise the utility of a dataset for a specific purpose.

C.2 We can re-state this as a method in which a computer-based system processes a sensitive dataset and publishes a derivative dataset such that privacy is preserved in the derivative dataset by generalising data values to less specific values by transforming columns in a table of data such that the derivative dataset achieves a required level of k-anonymity and l-diversity;

(a) in which the system accepts a configuration information about which columns to generalise ('quasi-identifying columns') and (b) in which the configuration information is chosen to optimise the utility of the derivative dataset according to the requirement of different use cases or purposes.

Optional Features:

The user-determined configuration information defines parameters of the generalisation for one or more quasi-identifying columns.

The user-determined configuration information defines the resolution or precision or distortion for one or more quasi-identifying columns.

The utility refers to how similar to the sensitive dataset the derivative dataset is: e.g. the more similar the two datasets are, the higher the utility is. We define utility as "how much valuable relationships are preserved in the data", or stated otherwise, "to what extent the relationships between the quasi-identifiers and the interesting variables are preserved".

Similarity between the sensitive dataset and the derivative dataset is measured by calculating the distortion between the sensitive dataset and derivative dataset.

The method is scalable and is implemented in a scalable distributed system.

C.3 Privitar Publisher may implement manual generalisation, with global recoding of variables. We can therefore further define the optional features as follows:

the user manually generalises one or more quasi-identifying columns.

the system uses global recoding so that transformations are consistent across rows in the table.

the user defines the configuration that leads to a specific k and/or l-diversity.

the user manually defines a required level of k-anonymity and l-diversity.

k-anonymity and l-diversity are achieved by suppressing the clusters that do not achieve the user-defined k-anonymity and l-diversity after being manually generalised.

C.4 Privitar Publisher may implement automated generalisation, performing 'top-down' specialisation (see section C.5 below) to achieve k- and l, tunable to control the distortion of each quasi-identifiers. We can therefore further define the optional features as follows:

The system accepts a user-determined value of 'k' for each table and 'l' for each sensitive column The process of generalisation specifies a fixed, maximum or minimum resolution for one or more quasi-identifying columns in the derivative dataset.

The configuration information includes the prioritisation of one or more columns.

The system chooses the levels of generalisation of quasi-identifier columns such that the quasi-identifier columns with strong relationships to the prioritized columns are generalised less. For numeric columns the user can configure the resolution the system should try to achieve, or enter arbitrary numeric intervals which the system then uses when it generalises;

For date columns, the system can generalise as a numeric, or apply a default or custom date hierarchy;

For categorical column, the user defines a hierarchy for the categorical column, and the generalisation is done by organising the values in the user-defined hierarchy; the columns may get more generalised by going up in the user-defined hierarchy, or may get less generalised by going down in the user-defined hierarchy.

C.5 In C.4 above, we specified that the Publisher platform performs 'top-down' specialisation. We elaborate here on the features that may define a 'top-down' process:

The system automatically generalises some or all of the data in the sensitive dataset so that the derivative dataset achieves the required level of k-anonymity and/or l-diversity, and in which the system uses a 'top-down' process in which every quasi-identifying attribute starts as fully generalised, and then gets repeatedly specialized.

The system uses local and not global recoding, so that transformations do not need to be consistent across rows in the table.

The system implements generalisation for large datasets in a distributed storage and compute environment, or cluster-computing framework, such as Apache Spark, using a 'top-down' process in which every quasi-identifying attribute starts as fully generalised, and then gets repeatedly specialized; and in which the system constructs a tree data structure in which each node in the tree contains (1) a set of dataset rows and (2) a value for each of the quasi-identifier columns.

The following five-step process may be used:
  (1) Start with an initial node containing all the dataset rows. In this node, all the quasi identifiers have the fully generalised values.
  (2) 'Split' the node by each of the quasi-identifiers to produce sets of candidate children.
  (3) Evaluate each candidate set of child nodes to determine: (a) whether the child nodes are 'valid', meaning meet the configured K and L-diversity thresholds; and (b) the 'info gain' with respect to the configured 'interesting' columns.
  (4) Select the set of valid child nodes with the highest info-gain and add them to the tree.
  (5) Repeat the process on each child node until it is not possible to split further without violating k or l.

C.6 Privitar Publisher may combine the manual (see C.4) and also the automatic (see C.5) approaches; this can be expressed in a Policy (See A.1).

We can specify this as follows: The system uses a hybrid approach where the user is able to manually generalise one or more quasi-identifying columns and then the system automatically generalises some or all of the data in the sensitive dataset so that the derivative dataset achieves the required level of k-anonymity and/or l-diversity; and in which the system uses a 'top-down' process in which every quasi-identifying attribute starts as fully generalised, and then gets repeatedly specialized.

Manual generalisation means an end-user manually generalises quasi-identifying columns. This may involve global recoding of variables.

Automatic generalisation means the system automatically generalises quasi-identifying columns, the system uses the top-down approach and the local recoding of variables.

Privacy protections applied to the sensitive dataset can be expressed in a Policy.

C.7 Privitar Publisher may operate on large datasets by executing efficiently on a parallel compute cluster. We can re-state this as follows: the methods defined at C.2 to C.6 above may be performed on large datasets in a distributed storage and compute environment, or cluster, comprising separate cluster nodes.

C.8 Privitar Publisher may generalise location areas. We can define this as a method including a preprocessing step that analyses a map, for example by analysing shapefiles describing a map of territories, and that produces a planar graph where the nodes are the location territories and there are edges between nodes if the territories abut; the system looks for nodes in the planar graph that have less than k records, and merges each of those nodes with one of the neighbouring and repeats this process until all nodes satisfy k-anonymity.

Merging may be done by one or more of the following non-exclusive list of approaches: merging with the most populous neighbour, merging with the least populous neighbour, merging with the neighbour with the longest common boundaries, merging with the neighbour that will result in a combined pair with the smallest area, merging a neighbour such that the combined pair that has the smallest diameter, or merging with a neighbour which best meets a weighted combination of these factors.

C.9. Privitar Publisher may facilitate fine-grained control of top-down specialization to achieve k and l, including configurable strategies for each quasi-identifier column in order to minimise data distortion. Quantification and visualisation of this data distortion can be provided.

We may re-state this as a method in which a computer-based system processes a sensitive dataset and publishes a derivative dataset such that privacy is preserved in the derivative dataset by generalising data values to less specific values by transforming columns in a table of data, such that the derivative dataset achieves a required level of k-anonymity and l-diversity;

in which (a) the system accepts a user-determined configuration information about which columns to generalise ('quasi-identifying columns') and about associated configuration parameters for each quasi-identifying column, in which the configuration parameters include a required resolution, precision or distortion for zero, one or more quasi-identifying columns in the derivative dataset; and
  (b) the system uses a 'top-down' process in which every quasi-identifying attribute starts as fully generalised, and then gets repeatedly specialized.

Optional features:

The required resolution is one of the following: a fixed resolution, a maximum resolution or a minimum resolution.

The system prioritizes minimising the data distortion of quasi-identifying columns which have strong relationships with user-determined 'interesting' columns'.

The method is scalable and is implemented in a scalable distributed system.

We can give further detail to the top-down process as follows:

The system may automatically generalise some or all of the data in the sensitive dataset so that the derivative dataset achieves the required level of k-anonymity and/or l-diversity, and in which the system uses a 'top-down' process in which every quasi-identifying attribute starts as fully generalised, and then gets repeatedly specialized.

The system may implement generalisation for large datasets in a distributed storage and compute environment, or cluster-computing framework, such as Apache Spark, using a 'top-down' process in which every quasi-identifying attribute starts as fully generalised, and then gets repeatedly specialized; and in which the system constructs a tree data structure in which each node in the tree contains (1) a set of dataset rows and (2) a value for each of the quasi-identifier columns.

A five-step process may be used, as follows:
(1) Start with an initial node containing all the dataset rows. In this node, all the quasi identifiers have the fully generalised values.
(2) 'Split' the node by each of the quasi-identifiers to produce sets of candidate children.
(3) Evaluate each candidate set of child nodes to determine: (a) whether the child nodes are 'valid', meaning meet the configured K and L-diversity thresholds; and (b) the 'info gain' with respect to the configured 'interesting' columns.
(4) Select the set of valid child nodes with the highest info-gain and add them to the tree.
(5) Repeat the process on each child node until it is not possible to split further without violating k or l.

C.10 Privitar Publisher may enable top-down specialization to achieve local recoding instead of global recoding; this gives finer-grained generalisation. The system uses local and not global recoding, so that transformations do not need to be consistent across rows in the table, although they can be consistent across rows in the table.

C.11 Privitar Publisher may guarantee l-diversity. The system checks each potential set of child nodes for l-diversity, and will not conduct a split if it would lead to a non l-diverse node, although it may partially combine.

C.12 The Privitar Publisher platform may offer splitting options (median or midpoint). The system may analyse which quasi-identifier to specialize (or "split") next as part of the generalisation process, it enables the user to select either a numeric midpoint splitting strategy, or a numeric median splitting strategy.

C.13 The Privitar Publisher platform may provide categorical column generalisation, with direct matches in a normal string or regexes in tree. For categorical columns, the system generalises according to a tree-structure hierarchy of related terms, in which leaf nodes in the hierarchy partially match text in a column by using direct matches or regular expression, i.e. where the leaf nodes uses a condensed representation.

C.14 The Privitar Publisher platform may provide a 'catch-all' replacement. A preprocessing step checks whether each value in a column matches a leaf node in the hierarchy and if no match is found, the value is replaced with a "catch-all" value. The catch-all value may appear in the hierarchy.

C.15. The Privitar Publisher platform may handle derived columns. A user determines that a column is derived from another or a pre-processing step checks whether one column is derived from another (e.g. date of birth and age) and if so, then only one column is generalised, and the other is recomputed from the generalised column. The system may highlight outlier records and then ask users whether they would like to suppress these records.

C.16 The Privitar Publisher platform may combine generalisation with suppression of outlier records as a means to achieve k while minimising distortion, by preferentially suppressing outliers in the univariate or joint distributions of the quasi-identifiers whose resolution is being preserved with highest priority, if that leads to better eventual resolution. The system may preferentially suppresses rows which are outliers in the quasi-identifiers whose resolution is being preserved with highest priority, if that leads to better eventual resolution. The outliers may be in the univariate and joint distributions of the quasi-identifiers C.17 The Privitar Publisher platform may provide visualizations and a distortion measure. The system may display the generalisation rule and data distortion for each column. The system provides a tool to evaluate changes due to the anonymisation in which a histogram of a generalised column is overlaid with a histogram representing the original column.

C.18 The Privitar Publisher platform may output a cluster-size bubble chart. The system may output a bubble chart to an end-user which graphically represents the sizes and counts of clusters, where each dot corresponds to a cluster of records grouped by their quasi-identifier values and the area of the dot is proportional to the size of the cluster.

C.19 The Privitar Publisher platform may implement top-down specialization to achieve k and l that preserves the relationships between the quasi-identifiers and any set of interesting columns. We can re-state this more generally as a method in which a computer-based system processes a sensitive dataset and publishes a derivative dataset such that privacy is preserved in the derivative dataset by generalising data values to less specific values using a 'top-down' process in which every quasi-identifying attribute starts as fully generalised, and then gets repeatedly specialized;

and in which the system accepts a user-determined configuration information defining any "interesting" columns whose relationships with quasi-identifying columns should be preserved and the system accepts the definition of zero, one, or more interesting columns of categorical or numerical data.

The method may be implemented in a scalable distributed system.

C.20 The Privitar Publisher platform may handle numeric interesting columns as follows: If the selected priority column is numeric, the values are automatically sorted into discrete ranges or bins and the information gain calculation is based on the resulting categories. Numeric includes dates or elapsed time.

C.21 The Privitar Publisher platform may handle several interesting columns, including a combination of numerical and categorical columns, as follows: If several columns are marked by the user as interesting, the system will concatenate the values of all those columns for each row and treat the resulting value as the interesting value for this record.

C.22 The Privitar Publisher platform may handle 'No' interesting columns as follows: if no interesting column is selected by the user, the systems alternates splitting evenly among the quasi-identifying columns, and for each round of splitting, a different column is selected to split on. An alternative approach is for each round of splitting to select a quasi-identifier column at random to split on.

C.23 The Privitar Publisher platform may provide a top-down specialization algorithm to achieve k and l that improves data utility. We can re-state this as a method in which a computer-based system processes a sensitive dataset and publishes a derivative dataset such that privacy is preserved in the derivative dataset by generalising data values to less specific values using a 'top-down' process in which every quasi-identifying attribute starts as fully generalised, and then gets repeatedly specialized;

in which the system enables the derivative dataset to achieve a required level of k-anonymity and l-diversity.

Optional features are that:

The system may implement generalisation for large datasets in a distributed storage and compute environment, or cluster-computing framework, such as Apache Spark, using a 'top-down' process in which every quasi-identifying attribute starts as fully generalised, and then gets repeatedly specialized; and in which the system constructs a tree data structure in which each node in the tree contains (1) a set of dataset rows and (2) a value for each of the quasi-identifier columns;

A five-step process may be used, as follows:
(1) Start with an initial node containing all the dataset rows. In this node, all the quasi identifiers have the fully generalised values.
(2) 'Split' the node by each of the quasi-identifiers to produce sets of candidate children.
(3) Evaluate each candidate set of child nodes to determine: (a) whether the child nodes are 'valid', meaning meet the configured K and L-diversity thresholds; and (b) the 'info gain' with respect to the configured 'interesting' columns.
(4) Select the set of valid child nodes with the highest info-gain and add them to the tree.
(5) Repeat the process on each child node until it is not possible to split further without violating k or l.

The method may be implemented in a scalable distributed system.

C.24 The Privitar Publisher platform may improve 'utility' by providing for the partial recombination of child nodes to enable resplitting. More specifically, child nodes may be partially recombined and then split further to enable further specialisation. Invalid child categories may be combined with other invalid categories and, if necessary, valid categories in order to form valid categories. These combined categories are assigned the same value as the parent category and cannot be split further. However, the sibling nodes can now be split further, allowing further specialisation. When this recombination is performed, the categories are combined smallest first in the case of hierarchical categories and with adjacent categories in the case of numeric categories (in order to form contiguous intervals).

C.25 The Privitar Publisher platform may provide a 'Look-ahead info gain' capability. Specifically, when the system analyses which quasi-identifier to specialize (or "split") next as part of the generalisation process, it may calculate the info gain by looking ahead over multiple (e.g. two or three or more) stages of candidate splits, picking the next candidate split associated with the highest info gain over these multiple stages.

C.26. The Privitar Publisher platform may provide for minimising the impact of NULLS (which term includes missing values/blanks). NULLS in continuous columns are specifically handled. In more detail, at each node, the system notes whether the node contains NULLs or not and maintains this in a variable called N; if there are more than k NULLs in the node, it will split the NULLs into one child and the non-NULLs into the other child, marking N=true and N=false respectively; and if there are fewer than k NULLs, then the non-NULLs are split normally and the NULLs are merged in with one of the children and this child is marked N=true and the rest are marked N=false; the process is then repeated for further splits to ensure that only one final node possesses values which can be NULL.

C.27. The Privitar Publisher platform may implement generalisation to achieve k and l that defends against sensitive attribute disclosure for non-categorical data types. We can re-state this more generally as follows: A method in which a computer-based system processes a sensitive dataset and publishes a derivative dataset such that privacy is preserved in the derivative dataset by generalising data values to less specific values;

in which the system enables the derivative dataset to achieve a required level of k-anonymity and l-diversity;

and is configured to protect against the disclosure of sensitive attributes for non-categorical data types.

Generalisation uses a 'top-down' process in which every quasi-identifying attribute starts as fully generalised, and then gets repeatedly specialized. The method is scalable and is implemented in a scalable distributed system.

C.28 The Privitar Publisher platform may enable defending against sensitive attribute disclosure for numeric variables. Specifically, sensitive continuous variables may be protected from sensitive attribute disclosure by one or more of the following:

Discretize the variable into bins and require l-diversity as if it were a categorical variable Require a minimum range in the sensitive column in each anonymity set Sort the values into ascending order and compute percentiles, and then require a minimum difference between the value at one percentile (such as the $20^{th}$ percentile) and the value at another percentile (such as the $80^{th}$ percentile)

Require a minimum difference between the inverse cumulative distribution function (CDF) of the lowest value and inverse CDF of the highest value in each anonymity set.

A combination of the above requirements.

Numeric variables, include dates and times and elapsed times can be handled. Dates and times may also be treated as numerical variables or as categorical variable.

C.29 The Privitar Publisher platform may defend against sensitive attribute disclosure in location generalisation. The system may take a user-provided list of locations or points of interest and ensures that every generalised location area contains at least a minimum number of locations or points of interest.

C.30 The Privitar Publisher platform may provide a scalable implementation of top-down specialization to achieve k anonymity and l-diversity in a distributed computing environment that splits as far as necessary in a distributed computing model and then shifts to a local computing model. We can re-state this as a method in which a scalable, distributed computer-based system processes a sensitive dataset and publishes a derivative dataset such that privacy is preserved in the derivative dataset by generalising data values to less specific values using a 'top-down' process in which every quasi-identifying attribute starts as fully generalised, and then gets repeatedly specialized;

in which the system enables the derivative dataset to achieve a required level of k-anonymity and l-diversity;

and in which the system constructs a tree data structure, with splitting occurring in the distributed environment and then continuing locally.

The system may implement generalisation for large datasets in a distributed storage and compute environment, or cluster-computing framework, such as Apache Spark, using a 'top-down' process in which every quasi-identifying attribute starts as fully generalised, and then gets repeatedly specialized; and in which the system constructs a tree data structure in which each node in the tree contains (1) a set of dataset rows and (2) a value for each of the quasi-identifier columns.

A five-step process may be used, as follows:
(1) Start with an initial node containing all the dataset rows. In this node, all the quasi identifiers have the fully generalised values.
(2) 'Split' the node by each of the quasi-identifiers to produce sets of candidate children.
(3) Evaluate each candidate set of child nodes to determine: (a) whether the child nodes are 'valid', meaning meet the configured K and L-diversity thresholds; and (b) the 'info gain' with respect to the configured 'interesting' columns.
(4) Select the set of valid child nodes with the highest info-gain and add them to the tree.
(5) Repeat the process on each child node until it is not possible to split further without violating k or l.

The method may be implemented in a scalable distributed system.

C.31 The Privitar Publisher platform may provide for shifting from a distributed computing model to a local computing model after a certain point—the point is reached when the workload fits into a certain memory size.

The system may perform distributed splitting of nodes until it calculates that the data for a leaf node would fit in the memory of a single process and at that point the system stops splitting the node and continues splitting those nodes that are still too big until it reaches a point where each of the leaf nodes would fit in the memory of a single process.

When this point is reached, each leaf node in the tree is assigned an ID and the dataset is repartitioned into as many partitions as there are leaf nodes, assigning rows to partitions based on the ID of the leaf node that contains them.

After repartitioning, the data for each node has been moved to its own partition, so the system then runs the same top-down specialisation 'locally'—that is, the top-down operations can proceed on the data locally on one of the machines, with all the data for the partition held in local memory.

C.32 The Privitar Publisher platform may provide for sub-sampling to improve performance. If the dataset does not fit in cluster memory, the system takes a sub-sample of the data that does fit in cluster memory and uses that to calculate the splits to the 'repartition point'.

C.33 The Privitar Publisher platform may provide for doing the top-down specialization to achieve local recoding instead of global recoding; this supports parallel processing because it reduces the need for co-ordination between nodes.

The system may use local and not global recoding, so that transformations do not need to be consistent across rows in the table.

C.34 The Privitar Publisher platform may support Dynamic Splitting. Specifically, the system may support splitting a continuous variable into a dynamic number of subintervals, where the user configures a maximum number of children M, and Publisher automatically calculates the number of children, using q, the number of quasi-identifying attributes, and k, the k-anonymity parameter.

C.35. The Privitar Publisher platform may provide for bounding execution time or stopping early. The system may enables the user to stop the specialization algorithm early and output data that is more private but with lower resolution. The system may report the current average cluster size at the current specialisation reached by the algorithm.

C.36. The Privitar Publisher platform may provide a system that enforces k-anonymity on streaming data. Stated more generally, this is a method in which a computer-based system processes a streaming data sensitive dataset and publishes a derivative dataset such that privacy is preserved in the derivative dataset by generalising data values to less specific values;
in which the system enables the derivative dataset to achieve a required level of k-anonymity.

The streaming data may be one of the following: a micro-batch data, or event streaming data.

One key aspect is the "latency-utility" which governs how long the program waits before publishing records. Some further background may be helpful here: Data can be processed event by event, or in micro batches (in which events are collected into small groups). This is usually done for efficiency (to reduce the number of network calls). Privitar Publisher can optimise for two things latency (how long to wait until the record is anonymised) and minimum distortion. We can reduce distortion by accumulating more records before generalising (and then taking into account the distribution of values in the group), but that increases latency, so there is a trade-off.

More specifically, the system may guarantee k-anonymity and l-diversity on streaming data where not all of the data values are known at the point where each data value must be generalised, and the system supports a configurable "latency-utility" parameter which governs how long the program waits before publishing records.

The detailed process is as follows: Find the k−1 other records that form the best or approximately best cluster among the records being held. Best is defined as lowest total distortion. The best cluster can be identified by trying all combinations, or the approximate best cluster can be identified through a greedy algorithm which does the following: start with a cluster of size 1 consisting of the record whose time is up; add the record to the cluster that results in the cluster with the lowest total distortion; continue adding records in this way until a cluster of size k is reached.

Then measure whether this cluster of records would help the overall generalisation. To measure this, compare the total distortion that each of the records would have in the new cluster versus being split out optimally among the existing clusters; if the creation of the new cluster would help, generalise and publish the k records; otherwise, find the best existing cluster for the record whose time is up, generalise it accordingly, and publish this record only.

D. Automatic Privacy Analysis of Raw Data & Guided Policy Setup

D.1 Privitar Publisher may effectively combine sensitive data discovery, policy management, and anonymisation to increase the value of each. This operates in both directions: sensitive data discovery informs, and is also informed by policy and anonymisation activity, so each is improved by the other.

We can generalise as follows: A method in which a computer-based system automatically (i) detects sensitive or identifying data; (ii) applies or suggests policy rules that define the privacy protections to be applied to sensitive or identifying data; and (iii) anonymises or otherwise privacy protects sensitive or identifying data;

and in which the results of sensitive or personal data detection influences and improves the design or selection of policy rules and/or anonymisation/privacy protection processes; and the design or selection of policy rules and/or anonymisation/privacy protection processes influences and improves the results of sensitive or personal data detection.

Another formulation is a system for automatically detecting potentially sensitive, quasi-identifying, or identifying columns of input datasets and for configuring the anonymisation of the input datasets;

in which (a) the detection of the potential sensitive, quasi-identifying, or identifying columns of the input datasets assists a user in the configuration of the input datasets and/or in identifying new datasets to anonymise; and (b) the configuration by the user of the anonymisation of the input datasets assists in the detection of potential sensitive, quasi-identifying, or identifying columns.

D.2 Privitar Publisher may identify and classify sensitive data, including identifiers, quasi-identifiers and sensitive values, based on the data and metadata about it, as well as policy management user activity, and anonymisation activity. Related, optional features include the following:

The system automatically processes data by (i) classifying it as sensitive, quasi-identifying or identifying by analysing the data and any related metadata applied to it; and (ii) applies policy rules that define the privacy protections to be applied to the data; and (iii) anonymises or privacy protects the data.

the system automatically classifies one or more columns of the input datasets as either sensitive, quasi-identifying or identifying columns.

the configuration by the user of the anonymisation comprises the definition by the user of a policy specifying the privacy protections to apply to specific data objects, in which a policy is one or more specific rules that apply to one or more data objects.

the system analyses the data, the metadata and/or policies that relates to the input datasets.

The analysis of the data is based on:

The format and structure of the data records in a column

The characteristics of the distribution of that data in the dataset—e.g. dates of birth will follow a different distribution to last login date; a quasi-identifier will typically have lower cardinality than a unique identifier.

The context in which data appears—e.g. a date field in an ecommerce transaction dataset is more likely to be a purchase date than it is a birthdate, but a date field in a customer table stored alongside address other primary information is more likely to be a date of birth.

The relationships between different datasets—e.g. do two data files share variables allowing those datasets to be linked, thereby changing the privacy risk. As an example, you might have three files, each containing a system generated unique identifier (or a token), and one quasi-identifier. Each one on its own would be low risk since a single quasi-identifier is not enough to identify an individual. However, when linked by the common column, the combination of files does pose a more significant privacy risk The data is organised such that a row in the table corresponds to the data subject that should be protected from re-identification, and for each column in each table the system then calculates the probability that the attribute represented by the column is either sensitive or contains directly or indirectly identifying information for the data subject.

D.3 Auxiliary dataset: the system maintains a database of public datasets and then looks for columns in the input datasets that are similar to one or more public datasets.

D.4 Using previously processed datasets: the system takes values from previously known sources of identifiers and finds similarity between those sources and the input datasets which it is analysing for the detection of potential identifiers, potential quasi-identifying attributes, or potentially sensitive personal information, and presents this to a user creating a Policy. As noted above, a Policy is one or more specific rules that define the privacy protections to be applied to sensitive or personal data objects, and a specific Policy is selected according to the requirements of a specific use case or purpose.

D.5 Using correlation with existing quasi-identifier columns: when assessing whether a column is potentially quasi-identifying, the system analyses the correlation with existing, known quasi-identifying columns.

D.6 Identification of Primary Identifiers: when assessing whether a column is potentially identifying, the system implements one or more of the following techniques: measures the cardinality of columns; analyses column names against a list of names associated with personal identifiers; takes values from previously known sources of identifiers and finds similarity between those sources and the new data in question; uses a set of patterns representing common formats to identify the presence of standard identifier types; scans unstructured columns (for example, log files, chat/email messages, call transcriptions or contracts) for substrings that are equal to values in other columns marked as identifying; and the system compares any of these metrics with a threshold to determine whether or not to inform the user that the new column is potentially identifying.

D.7 Using the token vault with unstructured columns: the system accesses a token vault as a source of examples of identifiers to enable detection of instances in unstructured columns, where the token vault persistently stores all mappings between each raw input value and its respective unique, computed token.

D.8 Using the token vault the system accesses a token vault as a source of examples of identifiers to enable detection of instances in structured columns by calculating the overlap between one column and another.

D.9 Outliers: the system analyses a dataset using unsupervised outlier detection techniques, such as chi-squared statistical tests and deviation-based approaches, to highlight outlier records and then ask users whether they would like to suppress these records.

D.10 Privitar Publisher may analyse metadata about the variable: its name, its source, descriptive data about it coming from the file or from external metadata stores, its date of update, access controls applied to the data.

The system analyses metadata associated with the sensitive or personal data, the metadata including one or more of the following: name, its source, descriptive data about it coming from the file or from external metadata stores, its date of update, access controls applied to the data.

The system compiles and stores metadata about which columns in the tables contain potential identifiers, potential quasi-identifying attributes, and potentially sensitive personal information.

D.11 Privitar Publisher may learn from user behaviour in managing this and similar data with the Privitar application.

The system analyses how data has been classified and managed in other privacy policies—e.g. if there exist policies requiring a column to be tokenised, that is a strong indicator that it is identifying.

Considering the similarity of a dataset to other data which users have indicated is sensitive through their classification of that data in a privacy policy. (This is rather like learning domain knowledge using recommendations for data privacy: since a user judged that data resembling your data was sensitive or identifying, it's more likely that your data is sensitive or identifying).

Reading metadata and data lineage information generated from the anonymisation process, in order to tell the difference between sensitive data, and very realistic anonymised data of the same structure.

Since the tokenisation process produces fields of the same structure as the original, and the generalisation process preserves the data distributions, anonymised data looks very like raw sensitive data, and the metadata recording that it has been anonymised is necessary.

D.12 Once quasi-identifiers have been discovered, Privitar Publisher evaluates the privacy risk by evaluating the k-anonymity of the data.

The system automatically processes data by (i) classifying it as sensitive, quasi-identifying or identifying and then (ii) determines privacy risk by evaluating the k-anonymity of sensitive, quasi-identifying or identifying data.

D.13 Privitar Publisher may evaluate how privacy risk and data sensitivity is reduced by anonymisation: The system automatically anonymises or otherwise privacy protects data and then evaluates how privacy risk has been reduced by that anonymisation or privacy protection.

D.14 Information may be assembled into rich input to a rules engine or a machine learning classifier.

Machine learning or a rules engine applied to sensitive columns: the system uses machine learning approaches or a rules engine to build a model that can output to a user a score for an unknown column being sensitive or non-sensitive.

Machine learning or a rules engine applied to ideating and quasi-identifying columns: the system uses machine learning approaches or a rules engine to build a model that can output to a user a score for an unknown column being identifying or non-identifying or quasi-identifying or non-quasi-identifying.

The following features may be used in either machine learning process: Any information that could indicate sensitivity or that data in a column is identifying or quasi-identifying, for example:

The number of distinct values
The mean, median, mode, min, max and variance of the numeric values
The type of the value (decimal, integer, string, date)
The column name
Length of column name
The n-grams of the column name (where underscores are considered as breaks between words)
Entropy of the value set
Metadata
Policies
jobs
Data lineage
Join all of the above
Label D.15 Privitar Publisher guides policy management based on identification of sensitive data. We can generalise as follows: A method in which a computer-based system automatically (i) detects sensitive or personal data; (ii) applies or suggests policy rules that define the privacy protections to be applied to sensitive or personal data; and (iii) anonymises or otherwise privacy protects sensitive or personal data; and in which the system guides the configuration or creation of the policy rules based on the sensitive or personal data.

The system may provide a default policy configuration based on the sensitivity classification learned about a dataset, including suggesting appropriate action for fields identified as primary identifiers, quasi-identifiers or sensitive fields (ie all of the above). The system may inform policy configuration by considering other policies for this data and/or for similar data. The system may alert the user to inconsistency of approaches, where policies conflict. The system may compile and store metadata about which columns in the tables contain potential identifiers, potential quasi-identifying attributes, and potentially sensitive personal information and presents this to a user creating a Policy, where the Policy is one or more specific rules that define the privacy protections to be applied to sensitive or personal data objects, and a specific Policy is selected according to the requirements of a specific use case or purpose.

Other aspects for this Section I are a software system that implements the computer implemented methods defined above; a dataset that has been generated using the computer implemented methods defined above; and a cloud computing infrastructure that implements the computer implemented methods as defined above.

Appendix 2

Section II: Privitar Lens

Key Concepts and Features

A.1 Privitar Lens prevents access to raw datasets, but enables privacy preserving aggregate queries and computations, and uses differentially private algorithms to reduce or prevent the risk of identification or disclosure of sensitive information.

A.2 Privitar Lens provides single gateway access for privacy. We can generalise it as follows: A privacy preserving query method and system for querying a database in which a single access point for configuration of the query system is provided, and in which the system's privacy controls are configured by a data holder from this single access point, and in which the database is queried by a data analyst from this single access point.

Optional features:

System is configurable while it is running.
Data holder has the ability to control, audit and/or monitor all activities of the query system.
Data holder is able to approve or deny a query that is classified as malicious while the system is running.
A graphical user interface for the data holder is implemented as a software application.
A graphical user interface for the data analyst is implemented as a software application.

Other aspects are a cloud computing infrastructure providing a privacy preserving system as defined above and a method of accessing cloud-hosted resources, including the step of accessing a privacy preserving system as defined above.

A.3 Privitar Lens may support feature extraction. We can generalise this to a privacy-preserving query system in which a query creates a new dataset from an existing dataset and in which an analyst is able to query both the new and old dataset.

Optional features:

System defined above in which the creation of the new dataset does not return any query results. The output row values in the new dataset are transformations, combinations or arbitrary functions (ie 'features') of one or more values in the input row and the process is called 'feature extraction'. Because the creation of new dataset exposes none of the original data, there are no privacy risks in giving the analyst access to this new dataset.

The new dataset is an extension of the original dataset (e.g. logically with new columns added) and it shares all privacy properties with the original dataset.

Privacy property above is one or more of the following: total privacy budget, remaining privacy budget, budget rate limit, query rate limit.

System defined above in which only the analyst that has created the new dataset is able to query the new dataset.

System defined above in which the dataset contains a time series data.

System defined above in which the feature extraction function takes as input the list of every row for a specific individual, and outputs one row of features.

System defined above in which there is a property associated with the time series data that defines a multiplicative factor (see A.11 below) to apply to noise added to queries on this data; and this factor is not applied when querying on the features extracted from the time series data.

A cloud computing infrastructure can provides the privacy preserving system defined above.

A.4 Privitar Lens may provide a dummy dataset. Generalising, we have a query interface system in which a dummy dataset with properties that are user configurable to match an original dataset is constructed, and in which different levels of properties are associated with increasing privacy risk.

Optional features:
Each level releases more pieces of information than the preceding level
We can specify what each level exposes:
A level releases the proportion of missing values of one or more columns.
A level releases the proportion of NULL values of one or more columns.
A level releases the ranges of one or more continuous columns.
A level releases the ranges of one or more integer columns.
A level releases the common options of one or more categorical columns.
A level releases all the options of one or more categorical columns.
A level releases univariate distributions one or more columns, in which value counts are used to represent the distribution for categorical variables and histograms with a certain number of bins (configurable by the data holder) are used to represent the distribution for continuous variables.
Hybrid continuous/categorical columns are analysed, and value counts above a configurable threshold are handled as categorical and the rest are handled as continuous.
An analyst is able to query the dummy dataset without using any privacy budget.
An analyst is able to view rows.
The dummy dataset is downloadable onto another source.
A cloud computing infrastructure provides a query interface system as defined above.

A.5 Privitar Lens may support the implementation of malicious query detection rules.

We can generalise this to a privacy-preserving query system in which rule-based detection of malicious queries is combined with noise addition to query results.

Optional features:
Detection is implemented in a pre-processing stage.
Data holder is automatically notified on detection.
Data holder is able to view the query.
The system classifies a query as either malicious or benign based on a privacy configuration.
The system is able to modify a malicious query such that the malicious query returns privacy-preserving results.
The system is able to run one or more additional queries in order to detect a malicious query.
The system returns the query results with metadata relating to the query and/or the noise addition.
A cloud computing infrastructure providing a privacy preserving system as defined above.

A.6 Privitar Lens may support specifying the resolution of noisy queries. We can generalise this to a differential privacy process in which an answer reported by a privacy preserving query system is within or approximately within a percentage or other measure of the true answer;
and in which an analyst specifies the desired resolution by specifying that defined percentage or other measure and the privacy preserving query system then automatically generates the answer to that defined percentage or other measure.

Optional features:
The system supports specifying the desired resolution as a confidence interval or a confidence interval expressed as a percentage of the true answer.
If a desired confidence interval is specified for an average query, the system spends some 'privacy budget' to get an approximate count of records to be averaged, and uses this count to convert confidence interval to budget and runs the average query with that budget.
The system reports the percentage chance or other measure that the reported answer is within the defined percentage or other measure.
The system spends some 'budget' to get an approximate value of the true answer, then uses this approximate value to calculate an approximate amount of budget to spend to result in the desired resolution, and reruns the query with that amount of budget.
Confidence interval is converted to budget using a Laplace or Gaussian CDF cumulative distribution function.
A cloud computing infrastructure implements a differential privacy process as defined above.

A.7 Privitar Lens may support presenting information about noise addition. We generalise this to a privacy-preserving query system for average queries (e.g. SQL "AVERAGE" queries), with noise added to query results and where the exact count is not known, and in which an approximate count is calculated, and the noise distribution of the sum is then divided by this calculated approximation to get to an approximation of the noise distribution of the average.

Optional features:
The approximate count is calculated by using an amount of privacy budget.
Displaying to an end-user the approximation of the noise distribution of the average.
A cloud computing infrastructure providing a privacy-preserving query system as defined above.

A.8 Privitar Lens may distinguish between private vs. public columns. Generalising, we have a privacy-preserving query system in which dataset columns are classified into either 'public' or 'private' categories.

Optional features:

Classification of the dataset columns is performed by a user

Queries are pre-processed to determine if they concern only public columns; no noise is added to query results and no privacy budget is used and no other privacy protection is applied if the query concerns only columns determined to be public.

Public columns do not contain privacy risk.

A cloud computing infrastructure providing a privacy-preserving query system as defined above.

A.9 Privitar Lens may support query generalisation. We can generalise this to a privacy-preserving query system in which generalisation is applied on the fly to queries in a pre-processing stage.

Optional features:

The pre-processing stage alters queries using a combination of filters.

A cloud computing infrastructure providing a privacy-preserving query system as defined above.

A.10 Privitar Lens may support activity visualization. More generally, we have a privacy-preserving query system in which a user-interface graphically depicts information leakage as a function of time.

Optional features:

This is implemented in real-time.

A cloud computing infrastructure providing a privacy-preserving query system as defined above.

A.11 Privitar Lens may support an extension to time series data. More generally, we have a privacy-preserving query system in which the maximum number of rows corresponding to a single person, in a dataset such as a time series dataset, is calculated, and this number is used in a multiplicative factor applied to increase the magnitude of noise added to all queries.

A cloud computing infrastructure providing a privacy-preserving query system as defined above.

A.12 Privitar Lens may support showing a user their own data without privacy protection. We can generalise this to a privacy-preserving query system in which data owned by a data analyst is identifiable and a query from an analyst is analysed to determine if that query relates only to that data; and where it does, then no privacy protection is applied to that data.

A cloud computing infrastructure providing a privacy-preserving query system as defined above.

A.13 Privitar Lens may support an interface that returns statistical conclusions but hides the intermediate values. We can generalise this to a privacy preserving query system which comprises receiving a statistical test query and outputting statistical query result combined with noise addition, and in which intermediate values in the calculation of the query results are not returned.

Other aspects for this Section II are a software system that implements the computer implemented methods defined above; a dataset that has been generated using the computer implemented methods defined above; and a cloud computing infrastructure that implements the computer implemented methods as defined above.

Appendix 2

Section III: Privitar Securelink

Key Concepts and Features

A.1 Privitar Securelink is a way for data to be joined against a common identifier (such as a social security number), while protecting that common identifier and ensuring that it is not revealed in the matching process or the resulting joined dataset. The joined dataset may then be processed, anonymised or generalised using Privitar Publisher, or made available for privacy preserving analysis using Privitar Lens.

A.2 We can define it generally as follows: A computer implemented method for securely sharing datasets that include information and an original unique ID associated with each individual, where the datasets originate from several different data contributors and are to be shared with a central party or recipient, while concealing or masking the original, unique ID;

in which each contributor encrypts and sends the original unique ID to an intermediary party, together with the information associated with each individual;

the intermediary party performs a homomorphic crypto operation that deterministically but irreversibly maps the encrypted original, unique IDs to an encrypted and obscured form, and sends that encrypted and obscured data to a central or recipient party;

the central party (i) decrypts the encrypted and obscured data received from the intermediate party to generate unique IDs that are one-to-one mapped to but cannot be used to recover each original, unique ID and then (ii) joins together the information for each individual from each contributor.

A.3 Other optional features include the following:

the original unique ID, once encrypted, is never sent in the clear

The intermediary party generates and raises the ciphertext to the power of a secret, random number exponentiation key, k, to generate the encrypted and obscured form and the central party decrypts this to generate $m^K$, where m is the original unique ID and the decisional Diffie-Hellman decisional assumption implies that it is cryptographically hard for the central party to generate m using $m^K$.

The intermediary party conducts this operation on the ciphertexts exploiting the fact that ElGamal encryption is homomorphic under exponentiation The central party generates an elliptical curve parameter set and shares that with all contributors and the intermediary party; private and public key pairs are then generated at the central party and the intermediary party and these public keys are shared with each data contributor; each data contributor then converts each original unique ID m to a point on an elliptical curve and encrypts that with both public keys to generate pairs of points; these encrypted points are then sent to the intermediary party for partial decryption with its private key, and obscuring with the secret exponentiation key, k.

The key generation, encryption and decryption operations are based on the ElGamal encryption system.

The central and intermediary party sign their public key with their private key and share these signatures with the contributors, proving that they have obeyed the key generation protocol.

The method eliminates the requirement for the sharing of a unique ID for an individual that is also shared between some or all data contributors, and that is also used by the central party.

An individual has more than one original unique ID such as address, email, and postcode.

An individual's original unique IDs are joined together

Biometric signatures are used as original unique ID such as voice signatures, digitised fingerprints, retina scans or iris scans.

An original, unique ID is a combination of multiple identifiers, and it is the combination of identifiers that is unique.

Each contributor includes with the information sent to the intermediary a schema, or structural description of the information, and the Intermediary is able to use the schema from each contributor to identify columns in the data that correspond to the original, unique IDs.

The information associated with each individual, that is sent from each contributor to the intermediary, is encrypted.

Original unique IDs are stored in a column in the datasets held by a contributor.

Each contributor uses the same unique ID for an individual, or more than one original unique ID with a common identifier.

the information that is joined together for each individual from each contributor is anonymised or generalised to less specific values to preserve privacy and is then published publication is by a computer-based system processes a sensitive dataset and publishes a derivative dataset such that privacy is preserved in the derivative dataset by generalising data values to less specific values by transforming columns in a table of data;

in which the system enables a user to (a) define the required level of k-anonymity and/or l-diversity, and the system then automatically generalises some or all of the data in the sensitive dataset so that the derivative dataset achieves the required level of k-anonymity and/or l-diversity, and also enables the user to (b) manually configure how to generalise each column in the table.

the anonymised or generalised form of data is then shared back with one or more of the contributors the sharing back is done by a privacy preserving query system for querying a database in which a single access point for configuration of the query system is provided, and in which the system's privacy controls is configured by a data holder from this single access point, and in which the database is queried by a data analyst from this single access point.

Each contributor is independent of all other contributors and cannot share personal information, with other contributors.

Each contributor is a different bank or other financial institution and the datasets include personal financial information.

Each contributor is a different holder of medical data and the datasets include medical information.

Each contributor is a different telecommunications service provider and the datasets include call-related information.

Each contributor is a different internet service provider and the datasets include internet or web browsing-related information.

Each contributor is a different social network and the datasets include social network-related information.

Each contributor holds geo-location information for multiple individuals

Each contributor holds sensitive personal information for different individuals.

The central party is a governmental organisation

The central party data mines the information for multiple individuals, without being able to identify any specific individual.

The central party assumes the role of the intermediary party

The method provides a representation of the dataset(s) in an aggregate form wherein the representation prevents any original unique ID for any individual to be re-generated.

Wherein the representation further provides a comprehensive view of information held by the dataset(s) that specifically relates to health, pension, financial or education data.

Other aspects for this Section III are a software system that implements the computer implemented methods defined above; a dataset that has been generated using the computer implemented methods defined above; and a cloud computing infrastructure that implements the computer implemented methods as defined above.

NOTE

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented method for securely sharing datasets that include information and an original unique ID associated with an individual, where the datasets originate from several different data contributors and are to be shared with a central party or recipient, while concealing or masking the original, unique ID;

in which each contributor randomly encrypts the original, unique ID and sends the encrypted original unique ID to an intermediary party, together with the information associated with each individual, so that each data record or batch or data release will contain a different encrypted form of the original unique ID associated with that individual, in which the encryption is performed with both a public key of the central party and a public key of the intermediary party;

the intermediary party performs a homomorphic crypto operation that deterministically but irreversibly maps the encrypted original, unique ID to an encrypted and obscured form that differs for each contributor, and sends that encrypted and obscured data to a central or recipient party in which the homomorphic crypto operation uses a blind homomorphic operation, and in which the intermediary party uses the same exponentiation key k for all contributors when performing the homomorphic crypto operation;

the central or recipient party (i) decrypts using its private key the encrypted and obscured data received from the intermediate party to recover obscured unique IDs that are one-to-one mapped to but cannot be used to recover the original, unique ID and then (ii) joins together the information for the individual from each contributor.

2. The method of claim 1 in which the original unique ID, once encrypted, is never sent in the clear.

3. The method of claim 1 in which the intermediary party generates and raises the ciphertext to the power of a secret, random number exponentiation key, k, to generate the encrypted and obscured form and the central party decrypts this to generate $m^K$, where m is the original unique ID and the decisional Diffie-Hellman assumption implies that it is cryptographically hard for the central party to generate m using $m^K$.

4. The method of claim 1 in which key generation, encryption and decryption operations are based on an ElGamal encryption system and the intermediary party conducts the operation on the ciphertexts exploiting the fact that ElGamal encryption is homomorphic under exponentiation.

5. The method of claim 1 in which the central party generates an elliptical curve parameter set and shares that with all contributors and the intermediary party; private and public key pairs are then generated at the central party and the intermediary party and these public keys are shared with each data contributor; each data contributor then converts each original unique ID m to a point on an elliptical curve and encrypts that with both public keys to generate pairs of encrypted points; these encrypted points are then sent to the intermediary party for partial decryption with its private key, and obscuring with the secret exponentiation key, k.

6. The method of claim 5 in which the central and intermediary party sign their public key with their private key and share these signatures with the contributors, proving that they have obeyed the key generation protocol.

7. The method of claim 1 in which the method eliminates the requirement for the sharing of a unique ID for an individual that is also shared between some or all data contributors, and that is also used by the central party.

8. The method of claim 1 in which an individual has more than one original unique ID such as address, email, and postcode.

9. The method of claim 8 in which an individual's original unique IDs are joined together.

10. The method of claim 1 in which biometric signatures are used as original unique ID such as voice signatures, digitised fingerprints, retina scans or iris scans.

11. The method of claim 1 in which an original, unique ID is a combination of multiple identifiers, and it is the combination of identifiers that is unique.

12. The method of claim 1 in which each contributor includes with the information sent to the intermediary party a schema, or structural description of the information, and the intermediary party is able to use the schema from each contributor to identify columns in the data that correspond to the original, unique IDs.

13. The method of claim 1 in which the information associated with each individual, that is sent from each contributor to the intermediary party, is encrypted.

14. The method of claim 1 in which original unique IDs are stored in a column in the datasets held by a contributor.

15. The method of claim 1 in which each contributor uses the same unique ID for an individual, or more than one original unique ID with a common identifier.

16. The method of claim 1 in which the information that is joined together for each individual from each contributor is anonymised or generalised to less specific values to preserve privacy and is then published.

17. The method of claim 1 in which publication is by a computer-based system that processes a sensitive dataset and publishes a derivative dataset such that privacy is preserved in the derivative dataset by generalising data values to less specific values by transforming columns in a table of data.

18. The method of claim 17 in which the system enables a user to (a) define the required level of k-anonymity and/or l-diversity, and the system then automatically generalises some or all of the data in the sensitive dataset so that the derivative dataset achieves the required level of k-anonymity and/or l-diversity, and also enables the user to (b) manually configure how to generalise each column in the table.

19. The method of claim 18 in which the anonymised or generalised form of data is then shared back with one or more of the contributors.

20. The method of claim 19 in which the sharing back is done by a privacy preserving query system for querying a database in which a single access point for configuration of the query system is provided, and in which the system's privacy controls is configured by a data holder from this single access point, and in which the database is queried by a data analyst from this single access point.

21. The method of claim 1 in which each contributor is independent of all other contributors and cannot share personal information, with other contributors.

22. The method of claim 1 in which each contributor is:
a different bank or other financial institution and the datasets include personal financial information, or
a different holder of medical data and the datasets include medical information, or a different telecommunications service provider and the datasets include call-related information, or
a different internet service provider and the datasets include internet or web browsing-related information, or
a different social network and the datasets include social network-related information.

23. The method of claim 1 in which each contributor holds geo-location information for multiple individuals and/or holds sensitive personal information for different individuals.

24. The method of claim 1 in which the central party is a governmental organisation.

25. The method of claim 1 in which the central party data mines the information for multiple individuals, without being able to identify any specific individual.

26. The method of claim 1 in which the central party assumes the role of the intermediary party.

27. The method of claim 1 which provides a representation of the dataset(s) in an aggregate form wherein the representation prevents any original unique ID for any individual to be re-generated.

28. The method of claim 1 in which the representation further provides a comprehensive view of information held by the dataset(s) that specifically relates to health, pension, financial or education data.

29. A software system that implements the computer implemented methods defined above in claim 1.

30. A cloud computing infrastructure that implements the computer implemented methods as defined above in claim 1.

31. The method of claim 1 in which the original unique ID for the individual is never seen by the intermediary or the central or recipient party, and yet the central or recipient party is able to join together the information for the individual from each contributor.

32. The method of claim 31 in which the original unique ID for the individual is never seen, never stored and neither transmitted or held transiently during processing in the clear.

* * * * *